United States Patent [19]

Bierma et al.

[11] Patent Number: 5,758,149
[45] Date of Patent: May 26, 1998

[54] SYSTEM FOR OPTIMALLY PROCESSING A TRANSACTION AND A QUERY TO THE SAME DATABASE CONCURRENTLY

[75] Inventors: Michael J. Bierma, New Brighton; Sheng-te Chiang, Circle Pines; Thomas P. Cooper, New Brighton, all of Minn.; James A. Elke, Phornton, Colo.; Katsuhiko Kihara, Yokohama, Japan; John R. Jordan, St. Paul, Minn.; Lester Y. Lee, Arden Hills, Minn.; Lee-Chin Liu, Plymouth, Minn.; James R. Mettling, Forest Lake, Minn.; James M. Plasek; Ralph E. Sipple, both of Shoreview, Minn.; Jennifer J. Smith, Plymouth, Minn.; Ronald Q. Smith, St. Paul, Minn.; Rajeev P. Tandon, Blaine, Minn.

[73] Assignee: Unisys Corporation, Blue Bell, Pa.

[21] Appl. No.: 406,265

[22] Filed: Mar. 17, 1995

[51] Int. Cl.[6] .............................. G06F 17/00; G06F 15/00
[52] U.S. Cl. .............................. 395/608; 395/603; 395/604; 395/616; 395/439; 395/440; 395/456
[58] Field of Search .............................. 395/610, 601, 395/615, 603, 604, 608, 616, 439, 456, 440; 364/DIG. 1

[56] References Cited

U.S. PATENT DOCUMENTS

| | | | |
|---|---|---|---|
| 4,648,036 | 3/1987 | Gallant | 364/300 |
| 4,870,568 | 9/1989 | Kahle et al. | 364/200 |
| 4,876,643 | 10/1989 | McNeill et al. | 364/200 |
| 4,925,311 | 5/1990 | Neches et al. | 364/200 |
| 4,993,030 | 2/1991 | Krakauer et al. | 371/40.1 |
| 5,148,432 | 9/1992 | Gordon et al. | 371/10.1 |
| 5,179,702 | 1/1993 | Spix et al. | 395/600 |
| 5,280,612 | 1/1994 | Lorie et al. | 395/600 |
| 5,287,473 | 2/1994 | Mohan et al. | 395/425 |
| 5,287,496 | 2/1994 | Chen et al. | 395/600 |
| 5,317,727 | 5/1994 | Tsuchida et al. | 395/600 |
| 5,317,731 | 5/1994 | Dias et al. | 395/600 |
| 5,325,525 | 6/1994 | Shan et al. | 395/600 |
| 5,333,305 | 7/1994 | Neufeld | 395/575 |
| 5,345,585 | 9/1994 | Iyer et al. | 395/600 |
| 5,367,675 | 11/1994 | Cheng et al. | 395/600 |
| 5,410,693 | 4/1995 | Yu et al. | 395/600 |
| 5,423,037 | 6/1995 | Hvasshod | 395/600 |
| 5,448,727 | 9/1995 | Annevelink | 395/600 |
| 5,457,793 | 10/1995 | Elko et al. | 395/600 |
| 5,495,606 | 2/1996 | Borden et al. | 395/600 |

OTHER PUBLICATIONS

"Parallel Query and Transaction Processing", Mike Ferguson Information Database, 1993, pp. 18–27.

Chan, A. et al. "The Implementation of an Integrated Concurrency Control and Recovery Scheme," Jun. 1992, Orlando.

The Tandem Performance Group, "A Benchmark of Non-Stop SQL on the Debit Credit Transactions," 1988, Chicago.

Stearns, R.E., et al. "Distributed Database Concurrency Controls Using Before–Values," Apr. 1981, Ann Arbor.

Bayer, R., et al. "Parallelism and Recovery in Database Systems," Jun. 1980, vol. 5, No. 2, pp. 139–156.

*Primary Examiner*—Thomas G. Black
*Assistant Examiner*—Jean R. Homere
*Attorney, Agent, or Firm*—Charles A. Johnson; Mark T. Starr

[57] ABSTRACT

A system for concurrent processing of queries and transactions against a shared database. The system includes multiple processors wherein a processor is available for processing queries and another processor is available for concurrently processing transactions. A query buffer is established for performing the query search while the data accessed by transactions is available in a database cache. Control logic in a database management system distinguishes between transactions and queries and initiates file-read control for reading the file containing the database. File-read control contains logic for logical sequential reading and logical non-sequential reading of the file. Control structures provide a means for control over the load that the query is allowed to place on the system.

35 Claims, 40 Drawing Sheets

DISK-CHANNEL-IOP TABLE

| DISK ID. | CHANNEL ID. | IOP ID. |
|---|---|---|
| | | |
| | | |

FIG. 18  676

CHANNEL MANAGEMENT TABLE

| CHANNEL ID. | MAX. I/O REQUESTS | I/O REQ. COUNT |
|---|---|---|
| | | |
| | | |

FIG. 19  678

IOP MANAGEMENT TABLE

| IOP ID. | MAX. I/O REQUESTS | I/O REQ. COUNT |
|---|---|---|
| | | |
| | | |

FIG. 20  680

I/O DISK AREA DESCRIPTOR  690

| DISK IDENTIFIER |
|---|
| DISK RELATIVE WORD ADDRESS |
| FILE RELATIVE WORD ADDRESS |
| DISK AREA LENGTH |
| I/O PACKET POINTER |
| NEXT I/O DISK AREA DESCR. POINTER |
| COMBINED POINTER |

FIG. 22

| FIG.26A | FIG.26D |
| FIG.26B | |
| FIG.26C | |

FIG.26

| FIG.28A |
| FIG.28B |
| FIG.28C |

FIG.28

| FIG.30A |
| FIG.30B |

FIG.30

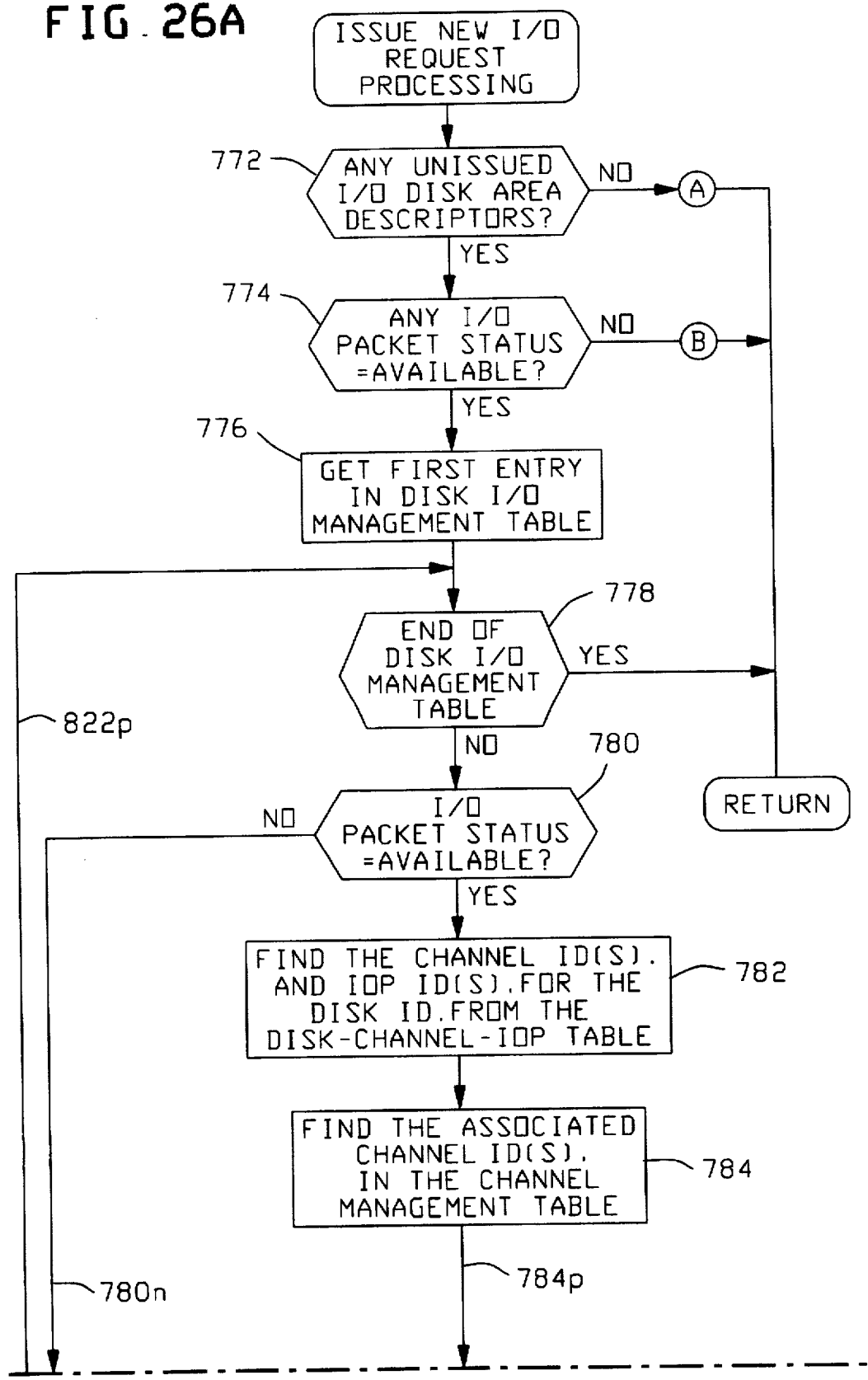

SYSTEM FOR OPTIMALLY PROCESSING A TRANSACTION AND A QUERY TO THE SAME DATABASE CONCURRENTLY

CROSS-REFERENCE TO CO-PENDING APPLICATIONS

The following related co-pending patent applications are assigned to the assignee of the present application:

Outboard File Cache System, Ser. No. 08/174,750, to Cooper et al., filed on Dec. 23, 1993;

Extended Processing Complex for File Caching, Ser. No. 08/173,459, to Byers, et al., filed on Dec. 23, 1993;

System for Parallel Reading and Processing of a File, to Cooper, et al., filed concurrently with the present application; and System For Optimally Storing A Data File For Enhanced Query Processing, to Braseth, et al., filed concurrently with the present application.

BACKGROUND

1. Field of the Invention

This invention relates generally to transaction processing systems and more particularly to systems for concurrent processing of transactions and queries against a single database.

2. Background Description

Businesses today recognize the importance of analyzing the information generated in their day-to-day operations for purposes of formulating plans for tomorrow's business. For example, the effectiveness of a current marketing campaign may be gauged according to the level of business activity. Therefore, it is likely that businesses will demand the most up-to-date information and demand that the information be immediately accessible. The most up-to-date business information may be desired because it may provide the best basis for formulating a business plan. Immediate accessibility is a requirement because competitive business pressures may require a rapid response.

One source of day-to-day business information is a database supporting a transaction processing system. The transaction database provides a repository for the most up-to-date information available. A useful example is an airline reservation system. The airline reservation database may provide insight to the flying habits of the airline's customers. While a wealth of useful information may be contained in the transaction database, gaining access to the information for the purpose of business planning may be extremely costly.

For the remainder of this specification, a particular request for access to a database will be classified as either a "transaction" or a "query." In a business example, a transaction might be a request for a seat reservation on a particular flight. In contrast, a query might be a request for all passengers who have specified vegetarian meals within the past year. A transaction typically involves access to a relatively small number of records of the database, whereas a query may involve access to thousands, or even millions of records. The duration of a transaction may be as short as a small fraction of a second. The duration of a query, on the other hand, may be minutes or even hours, depending upon the query and the size of the database. It has been recognized that if both transactions and queries are processed against a single copy of the database, performance for both tasks will inevitably suffer.

Prior art transaction processing systems were engineered to handle the day-to-day business operations for a company. Emphasis was placed on maximizing transaction processing throughput and guaranteeing secure and reliable data. Therefore, allowing the processing of queries against a transaction database while transactions were being processed might have a devastating effect on transaction processing throughput. For example, booking an airline reservation may take minutes if a query is in process. Attempts to marry transaction and query processing have been varied.

One approach for a system that allows concurrent transaction and query processing system entails periodically making a copy of the transaction database and then processing queries against the copy database rather than the "live" transaction database. This eliminates most impacts to the transaction processing throughput due to data and input/output contention. However, this approach is expensive in terms of the additional storage required for the copy database. The approach also suffers from the drawback of processing queries against the copy database that does not contain the most recent updates. Obtaining more recent update information would require more frequent copying of the live database. This, however, is expensive in terms of input-output processing and may impact the transaction rate.

A second approach is seen in U.S. Pat. No. 5,317,731, to Dias, et al. (hereinafter, Dias). Dias uses a snapshot technique to support concurrent transaction and query processing. Multiple logical versions of database pages are maintained. For the purpose of this specification, a "page" is the logical unit of storage that is managed by a Database Management System (DBMS) for storing one or more records. An out-of-date page is referenced by query while the most up-to-date page is referenced by transactions. Thus, at the time of the query, the data may be old. Periodically, a query version of the database is created. This is referred to as creating a snapshot. A further drawback is that processing time is expended each time a snapshot is performed, thereby adversely impacting transaction processing throughput.

Processing a query against a large database may be very time consuming. The duration of the query may be minutes or hours because millions of records may be processed from multiple database files. Traditional query optimization techniques seek to minimize the number of records processed but do not provide parallel processing of the remaining records. Recent innovations in parallel processing have added the ability to divide the work among multiple processing units, wherein a portion of the database is associated with each of the processing units. One consequence of this approach is that all the processing units are tied up for the duration of the query processing, even if no portion of the records are on that processing unit.

SUMMARY OF THE INVENTION

It would therefore be desirable to have a system that provides concurrent processing of transactions and queries against a single copy of the transaction database without significantly impacting transaction processing throughput. It would further be desirable for such a system to have enhanced query processing performance.

It is an object of the invention to concurrently process transactions queries against a shared database.

A further object is to concurrently process transactions and queries against a shared database without significantly impacting transaction processing throughput.

Another object is to perform a fast non-indexed search of a database file.

A further object is to perform a fast indexed search of a database file.

Yet another object is to provide data from a database to a query processor at a rate that approaches or exceeds the rate at which the query process can search the data.

A further object of the invention is to control the input/output load that a query is allowed to place on a system for concurrent processing of queries and transactions against a shared database.

Another object is to concurrently process multiple queries against multiple databases where the databases are concurrently being updated by transactions.

The foregoing and other objects are attained in a system for performing concurrent processing of database queries and transactions against a single copy of a database. The system includes a data processing system having a memory. A database management system that is operable on the data processing system provides access to a database that is stored in a database storage subsystem.

The system includes a query processor for processing queries against the database and a transaction processor for processing transactions against the database. The database management system distinguishes whether a database access request is a transaction or a query. For a query, a query buffer is established in the memory. The query buffer is dedicated to temporarily storing portions of the database that are referenced by the query. The query processor performs a search that is defined by the query on the portions of the database that are present in the query buffer.

Transaction are processed by the transaction processor against portions of the database that are present in a database cache that is established in the memory. The query buffer and database cache are in addressably distinct areas of the memory, thereby providing concurrent processing of queries and transactions against the same database.

A nonvolatile cache that is coupled to the data processing system provides another level of caching for the database. The nonvolatile cache provides a fault tolerant store for portions of the database, thereby providing fast access to portions of the database that are present in the nonvolatile cache and addressed by transactions. This minimizes the input-output requests to the database storage subsystem in processing transactions. Two advantages are gained. First query performance is enhanced because there is less contention for access to the database storage subsystem by the query processor and the transaction processor. Second, the impact on transaction processing performance by processing queries against the same database is reduced because queries are processed mainly against the data in the database storage subsystem and transactions are processed against the data in the nonvolatile cache. The most recent updates to the database are provided to the query processor by merging updated data from the nonvolatile cache with the data read from the database storage subsystem.

In another aspect of the invention, the database storage subsystem consists of multiple disks, wherein the database is stored across the multiple disks. This configuration permits the database to be read in parallel in processing a query. The parallel reading of the database provides data to the query processor at a rate that approaches or exceeds the rate at which the query processor can search the data. This substantially reduces the time required to process the query.

Control is provided to limit the load that the query processor may place on the input-output resources of the system. The input-output load control provides the capability to limit the impact that processing of a query may have on the transaction processing rate.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 18 illustrates the content of the Disk-Channel-IOP Table;

FIG. 19 illustrates the content of the Channel Management Table;

FIG. 20 illustrates the content of the IOP Management Table;

FIG. 22 illustrates the content of an I/O Disk Area Descriptor;

DETAILED DESCRIPTION

Figure 1:
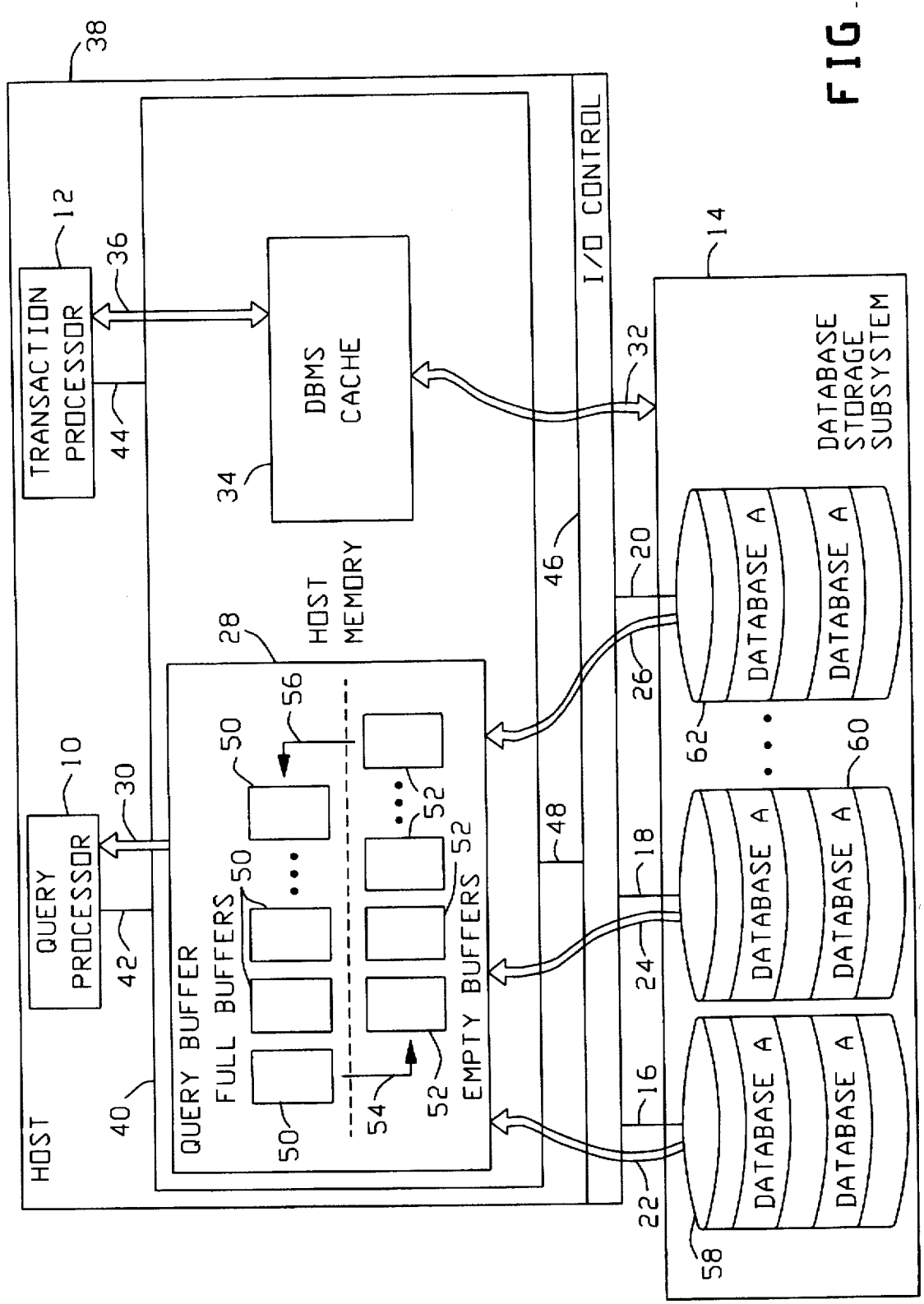
FIG. 1 is a functional block diagram of a first exemplary system that supports concurrent processing of transactions and queries against a shared database.

FIG. 1 is a functional block diagram of a first exemplary system that supports concurrent processing of transactions and queries against a shared database. The system also provides improved query processing performance. Concurrent processing of transactions and queries is supported with two processors, Query Processor 10 and Transaction Processor 12. Transactions and queries are processed against the same Database A which is stored in a Database Storage Subsystem 14. Multiple Input/Output (I/O) Channels, referenced as 16, 18, and 20 provide parallel I/O of Database A, where Database A is stored on multiple devices that are accessible via the multiple I/O Channels. Lines 22, 24, and 26 illustrate the parallel flow of data from the Database Storage Subsystem 14 to a Query Buffer 28. Line 30 illustrates the flow of data from the Query Buffer to the Query Processor. The parallel I/O over Channels 16, 18, and 20 provides data in the Query Buffer 28 at a rate that is fast enough to keep the Query Processor 10 busy performing the search (without waiting for input data) according to the specified query, thereby providing improved query performance. The size of the Query Buffer and the number of parallel I/O requests that are issued allow control over how much the I/O demands of the Query Processor affect the transaction processing throughput for transactions processed by the Transaction Processor.

Line 32 illustrates the bi-directional flow of data between the Database Storage Subsystem 14 and the Database Management System (DBMS) Cache 34. The Transaction Processor 12 processes transactions against portions of Database A in the DBMS Cache. Line 36 illustrates the bi-directional flow of data between the Transaction Processor and the DBMS Cache.

The system includes an exemplary Host 38, which is a data processing system that includes multiple instruction processors. A 2200 Series data processing system from Unisys Corporation could serve as a suitable Host. The instruction processors are labeled as Query Processor 10 and Transaction Processor 12. Dual instruction processors provide a desired level of performance for concurrent processing of transactions and queries. The Transaction Processor may be dedicated to processing transactions while the Query Processor is dedicated to processing queries. While the system is illustrated with a Host that includes multiple processors with a shared memory, those skilled in the art will recognize that other hardware architectures, such as parallel and distributed systems could be adapted to achieve the results of the present invention and fall within the scope of the claims set forth herein.

Query Processor 10 and Transaction Processor 12 are respectively coupled to a shared Memory 40 via Lines 42 and 44. The manner of coupling could be either a direct or bussed connection. Lines 42 and 44 provide read and write access to the respective units.

The Database Storage Subsystem 14 is coupled to the I/O Control 46 section of the Host 38 via the Channels 16, 18, and 20. I/O Control is coupled to the Memory 40 via Line 48. Line 48 may provide either bussed or direct access to the Memory for the I/O Control. Coupling Line 48 permits I/O Control to read from and write to Memory.

Query control software manages the Full Buffers 50 and the Empty Buffers 52. The data in the Full Buffers is searched according to the query while data from Database A is being written to the Empty Buffers. Processing of the Full Buffers by the Query Processor 10 is asynchronous to the filling of the Empty Buffers by the I/O Control 46 and therefore may proceed substantially in parallel. When all the data in a Full Buffer has been searched, the Buffer is returned for use as an Empty Buffer as indicated by directional Line 54. Similarly, when an Empty Buffer becomes filled with data, it is provided as a Full Buffer for searching according to the query.

The exemplary Database Storage Subsystem consists of multiple magnetic Disks, respectively referenced as 58, 60, and 62. One or more portions of Database A are stored on the multiple Disks. It is preferable that the Database be stored on as many Disks which are coupled to the Host 38 via as many I/O Channels as feasible. This allows greater parallelism in the reading of the Database from the Database Storage Subsystem, thereby providing data to the Query Processor as fast as the Query Processor can search the data.

Figure 2:
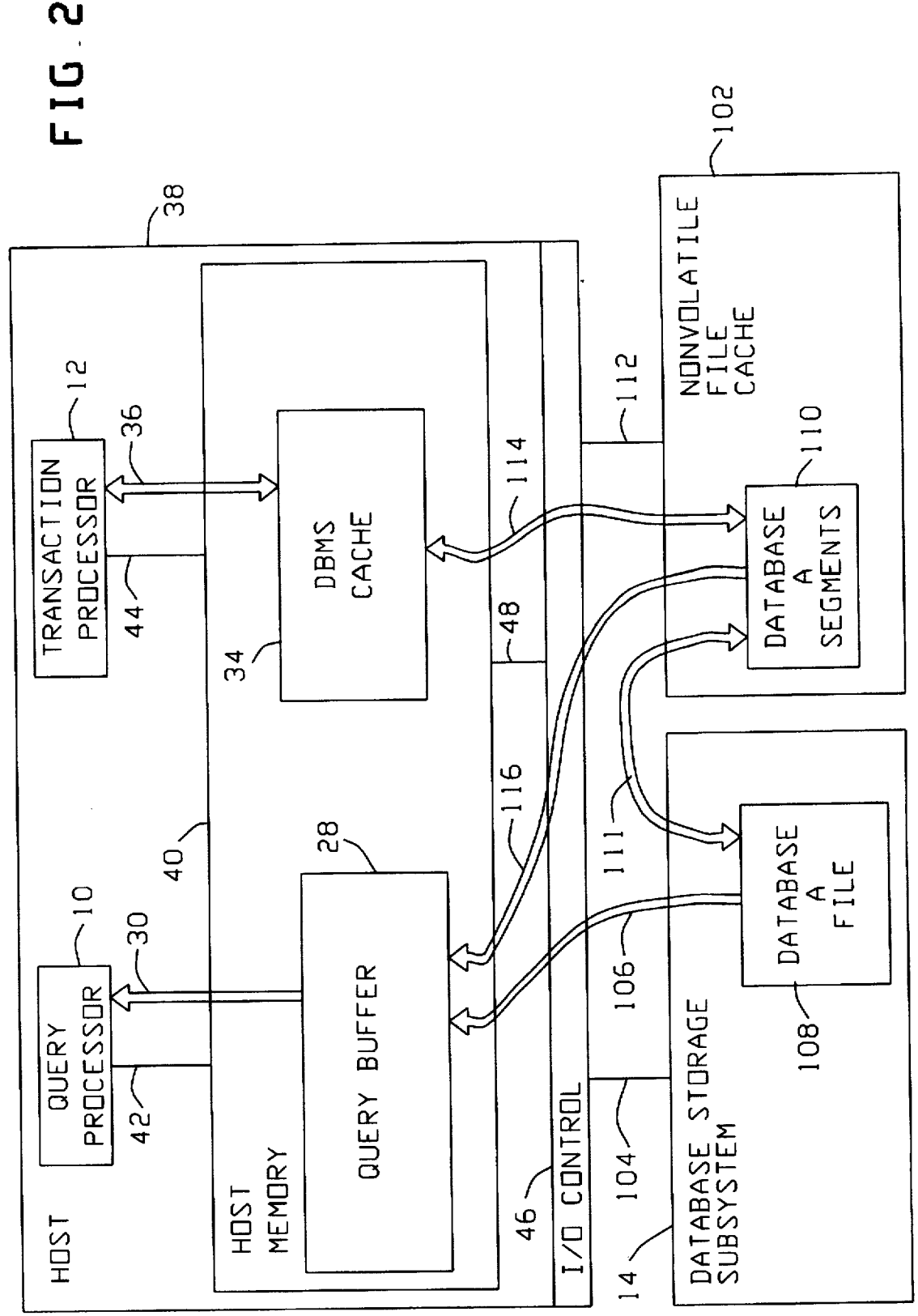
FIG. 2 is a functional block diagram of a second exemplary system that supports concurrent processing of transactions and queries against a shared database.

FIG. 2 is a functional block diagram of a second exemplary system that supports concurrent processing of transactions and queries against a shared database. The system provides improved transaction processing performance with the availability of a Nonvolatile File Cache 102. A description of an exemplary Nonvolatile File Cache may be found in co-pending patent applications, Ser. No. 08/174,750, entitled, Outboard File Cache System, and Ser. No. 08/173, 459, entitled, Extended Processing Complex for File Caching. The Extended Processing Complex (XPC) is a commercially available product from Unisys Corporation which provides the functionality of the exemplary Nonvolatile File Cache.

Line 104 shows the coupling of the Database Storage Subsystem 14 to the Host 38. Line 104 preferably consists of multiple I/O Channels such as shown in FIG. 1. Line 106 illustrates the flow of data from Database A file 108 to the Query Buffer 28.

The Nonvolatile File Cache 102 caches portions of Database A File 108 in its cache storage, thereby providing enhanced file access times when access to a portion of a file is requested and the requested portion is not in the DBMS Cache 34. Database A Segments 110 illustrates the cached portions of the Database A file. The term "segment" refers to the unit of allocable file storage by the file system software of the exemplary system. The term segment is used to refer to a unit of file storage allocated by a file management system, whereas a "page" is a unit of storage allocated by the DBMS for storing one or more records. Line 111 illustrates the bi-directional flow of data between the Nonvolatile File Cache 102 and the Database Storage Subsystem 14.

Enhanced file access time translates into increased transaction processing throughput. The Nonvolatile File Cache is coupled to the I/O Control section 46 of the Host 38 via Line 112. Preferably, the coupling Line 112 is physically distinct from coupling Line 104. Bi-directional Line 114 illustrates the flow of data between the DBMS Cache and the Nonvolatile File Cache. References to portions of the Database A file that are not in the DBMS Cache are directed to the Nonvolatile File Cache. If the requested portion is present in the Nonvolatile File Cache, the portion is transferred to the DBMS Cache. If a high hit rate is achieved in the DBMS Cache and in the Nonvolatile File Cache in processing transactions, I/O to the Database Storage Subsystem is minimized. This allows a high throughput rate for transactions and allows most of the I/O via coupling Line 104 to be for the Query Processor 10.

Line 116 illustrates the flow of data from the Nonvolatile File Cache 102 to the Query Buffer 28. Portions of Database A that are present in the Nonvolatile File Cache are merged with corresponding portions of Database A read from the Database Storage Subsystem 14. The merging of data from the Nonvolatile File Cache permits the most recent updates to Database A resulting from transactions processed by the Transaction Processor 12 to be considered by the Query Processor 10 in processing a query.

Figure 3:
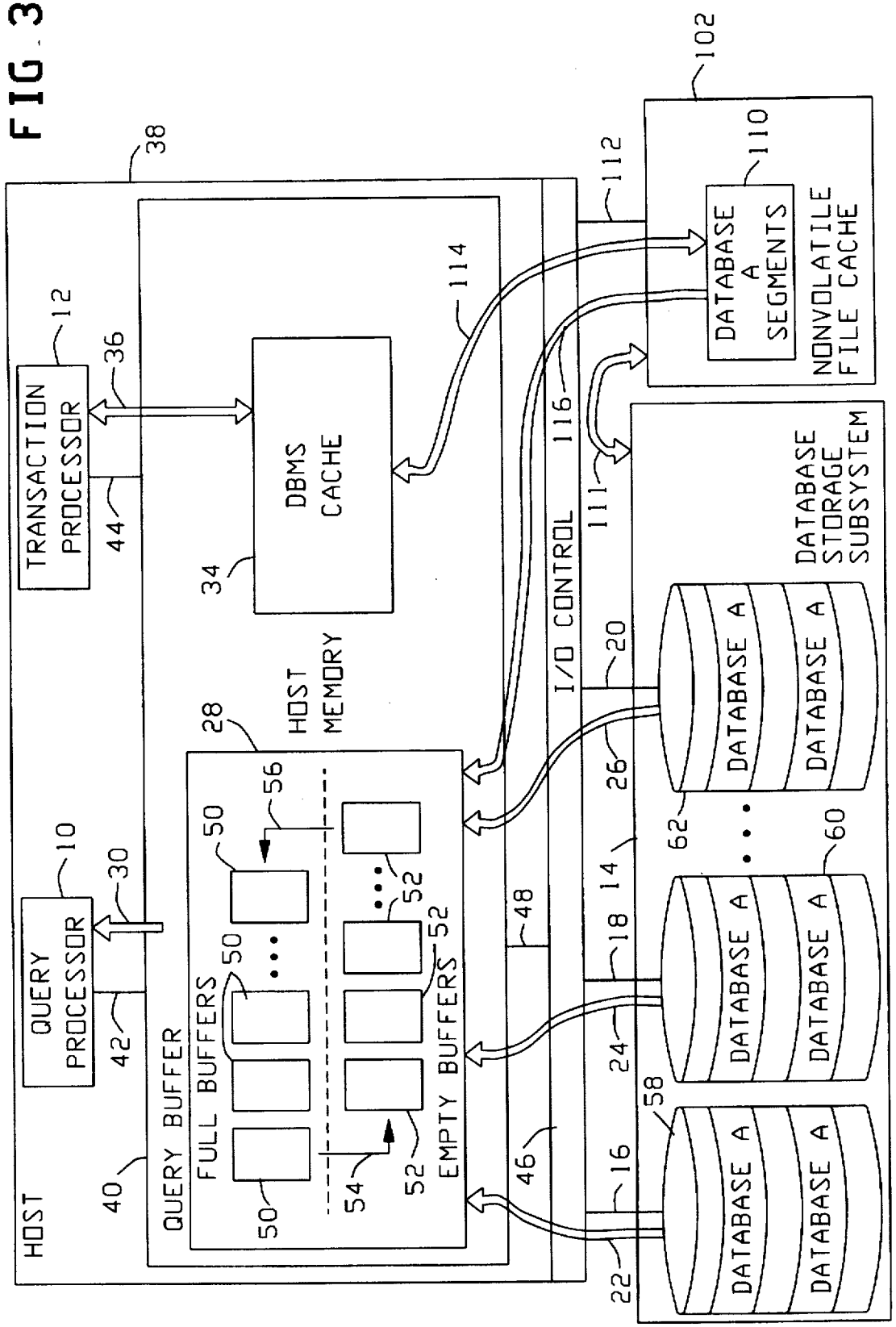
FIG. 3 is a functional block diagram of a third exemplary system that supports concurrent processing of transactions and queries against a shared database.

FIG. 3 is a functional block diagram of a third exemplary system that supports concurrent processing of transactions and queries against a shared database. The system provides enhanced query performance with minimal impact to the transaction processing throughput rate. The striping of Database A across multiple Disks 58, 60, and 62 on multiple distinct I/O Channels 16, 18, and 20 provides data from Database A at a rate which is fast enough to keep Query Processor 10 busy. I/O requests are issued asynchronous to the processing of the query by the Query Processor. This combination results in a fast query execution.

The impact of processing a query on the rate of transaction processing throughput is minimized by having a second processor available to process the query and by having available a Nonvolatile File Cache 102. The Nonvolatile File Cache minimizes the contention between the Transaction Processor 12 and the Query Processor 10 for I/O resources. Contention is minimized because most of the portions of Database A that are referenced by transactions processed by the Transaction Processor are either present in the DBMS Cache 34 or in the Nonvolatile File Cache.

Figure 4:
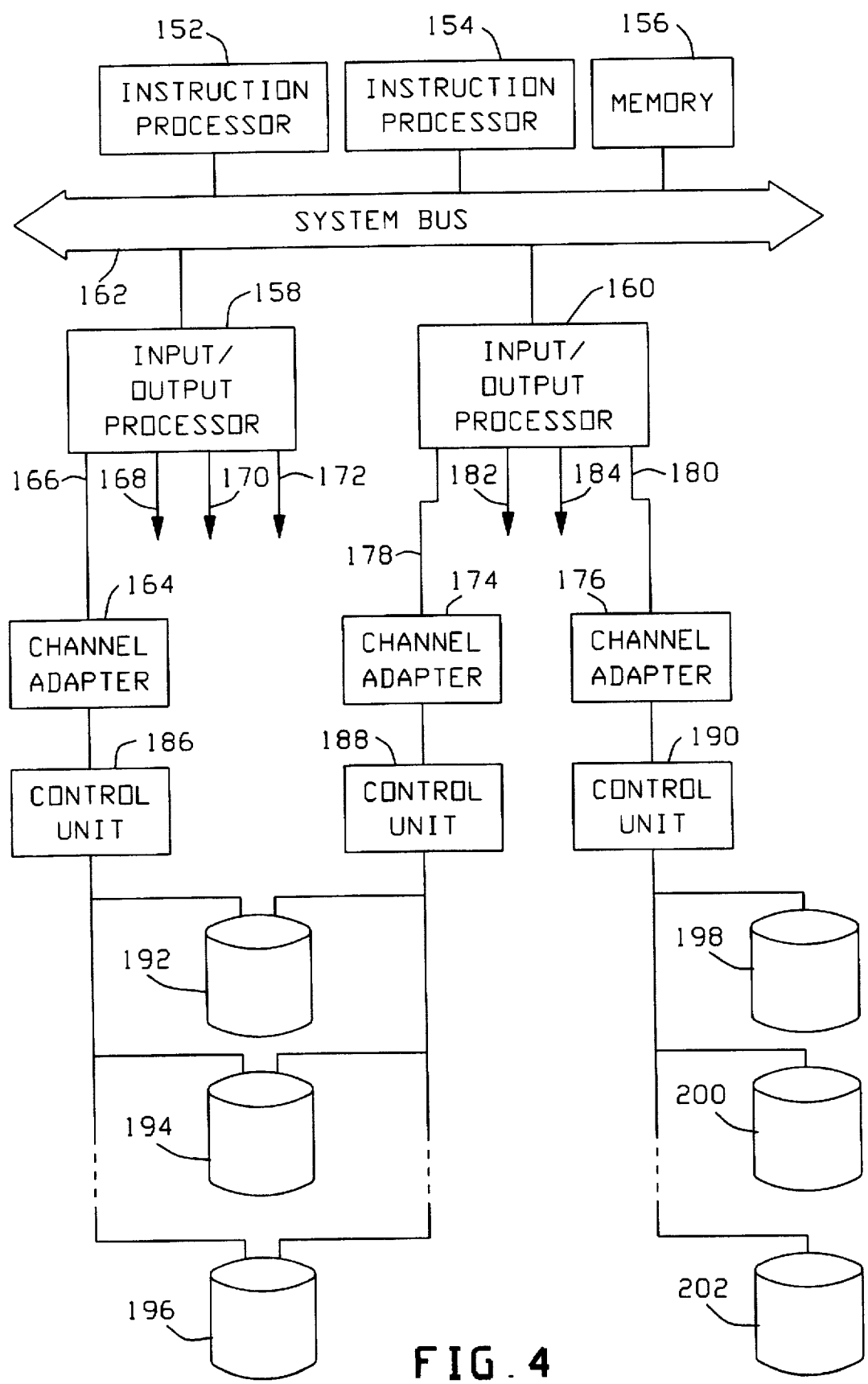
FIG. 4 is an exemplary Host system architecture along with multiple disk storage subsystems.

FIG. 4 is an exemplary Host system architecture along with multiple disk storage subsystems. The 2200/500 Series data processing system that is commercially available from Unisys adheres to such a system architecture. The system includes two Instruction Processors referenced as 152 and 154, a Memory 156, and two Input/Output Processors (IOPs) 158 and 160, coupled to a System Bus 162. Software executing on the Instruction Processors may initiate Input/Output (IO) requests to either of the IOPs. The IOPs control the flow of data input to and output from the system and have access to the Memory 156.

Each of the IOPs has four ports available for I/O channels. Channel Adapter 164 is coupled to IOP 158 via Line 166. Lines 168, 170, and 172 are shown to illustrate additional IO channels. IOP 160 is shown coupled to two Channel Adapters, 174 and 176, via Lines 178 and 180. Lines 182 and 184 illustrate the additional IO channels available on IOP 160. A Channel Adapter provides an interface for an IOP to devices accessible according to a specific protocol, such as Block Mux or SCSI. The exemplary Channel Adapters illustrate Block Mux channels. Other types of IO channels could be used in accordance with the present invention.

Each of the Channel Adapters 164, 174, and 176 coupled to its respective Control Unit, 186, 188, and 190. Each Control Unit provides access to its respective string of disks. Control Units 186 and 188 both provide access to Disks 192, 194, and 196. Thus, Disks 192, 194, and 196 are accessible via IOP 158 in combination with Channel Adapter 164, and accessible via IOP 160 in combination with Channel Adapter 174. Control Unit 190 provides access to Disks 198, 200, and 202.

Figure 5:
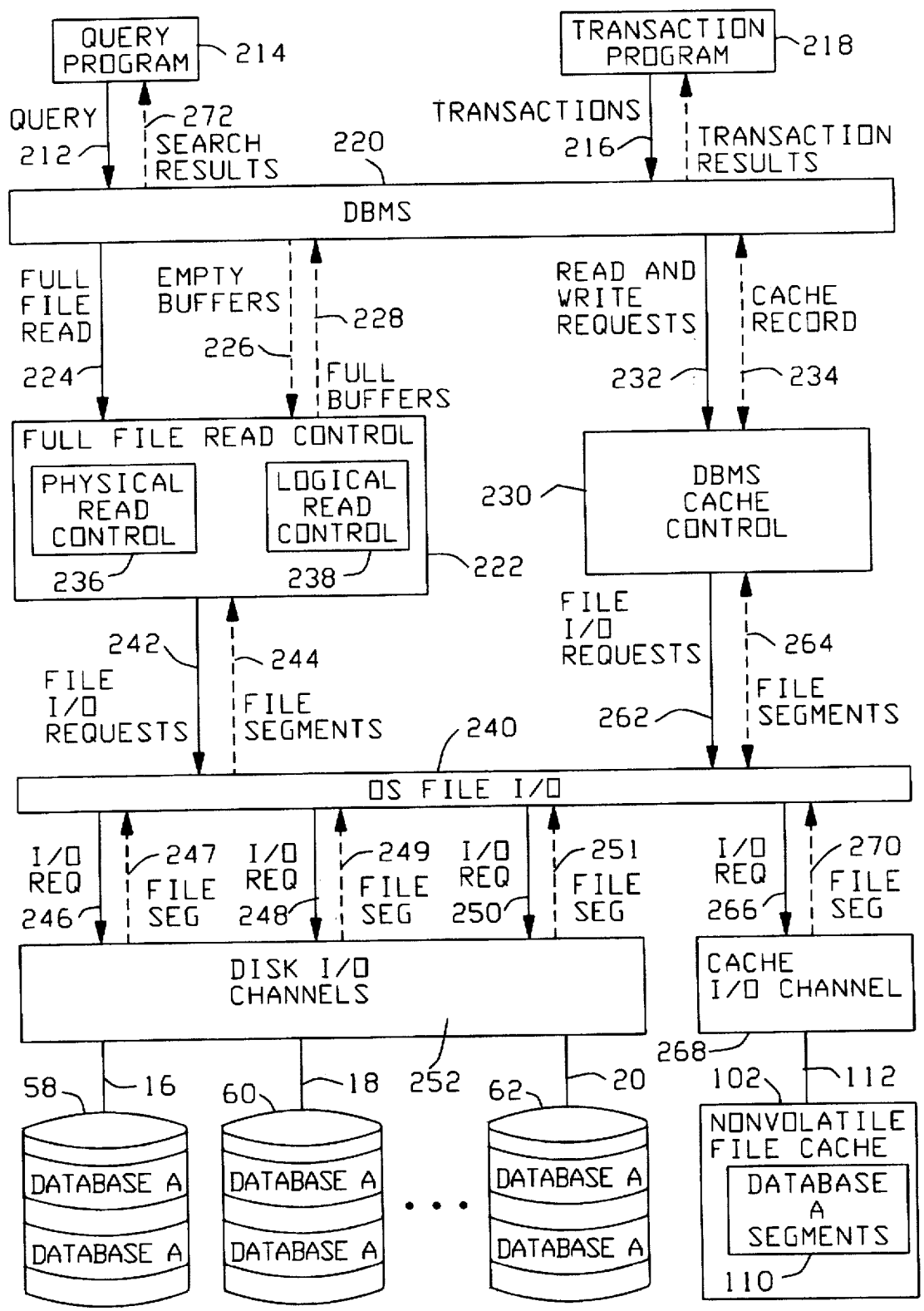
FIG. 5 is a data-flow diagram that illustrates the flow of data between the software components and the database storage devices in a system that provides concurrent processing of queries and transactions against a shared database.

FIG. 5 is a data-flow diagram that illustrates the flow of data between the software components and the database storage devices in a system that provides concurrent processing of queries and transactions against a shared database. Solid directional lines represent a request or passing of control, and dashed directional lines represent the flow of data in response to processing a request. For query processing, control and data flow are illustrated on the left side of the FIG., and for transaction processing, control and data flow are illustrated on the right side of the FIG. For ease of illustration, only one query and one transaction are shown. The Database A that is referenced by the query and transaction is stored on Disks 58 and 62 (in addition to the intervening Disks represented by the ellipsis). Various portions of Database A are cached in the Nonvolatile File Cache 102.

A database Query 212 is initiated by a Query Program 214, and a Transaction 216 is initiated by a Transaction Program 218. Both the Query and Transaction are directed to the Database Management System (DBMS) 220 for processing. The DBMS is a software component that coordinates the processing of both transactions and queries against a shared Database A. The DBMS distinguishes whether a particular request for access to a Database A constitutes a transaction or a query. To simplify the discussion at this point, a query may be thought of as a request that results in the reading and searching of a very large number of records of a Database A, and a transaction as a request that results in the reading, and perhaps updating, of a very limited number of records of Database A. For processing a query, the DBMS initiates a function of Full File Read Control 222 as shown by Line 224 to read all, or a major portion, of the file comprising Database A. At this point it should be noted that the terms database, table, and file may be used interchangeably throughout this specification. The particular term used will usually depend on the context. At a system level the term database is used, at the DBMS level the term table is used, and at the operating system level, the term file is used. Empty Buffers 52 are provided to the Full File Read Control as shown by Line 226, and Full Buffers 50 are returned to the DBMS for query searching as shown by Line 228. For transactions, read and write requests are directed to the DBMS Cache Control 230 component of the DBMS as shown by Line 232. Cached records of Database A are read and written by the DBMS as shown by Line 234.

Full File Read Control includes two control components, Physical Read Control 236 and Logical Read Control 238. The particular control component initiated is determined by the DBMS 220. For non-indexed searches of a Database A, the Physical Read Control is initiated. Physical Read Control reads specified segments of a file without regard to the logical relationship between the specified segments. The Logical Read Control is initiated when an indexed search of the Database is required. The Logical Read Control reads segments of the Database in their logical order.

File I/O requests are directed to the Operating System (OS) File I/O software 240 as shown by Line 242. In return, segments of the file that comprise Database A are returned to Full File Read Control 222. Line 244 shows segments being returned. It should be noted that the segments are actually written directly to the Memory 40 by the IOPs 158 or 160. Multiple File I/O Requests are issued by the Full File Read Control which result in the OS File I/O software initiating multiple I/O requests over the multiple Channels 16, 18, and 20. Lines 246, 248, and 250 respectively illustrate the I/O requests being issued for the multiple Channels, and Lines 247, 249, and 251 respectively illustrate the return of segments of Database A. The Disk I/O Channel block 252 represents the components that provide a unique data path to the coupled Disk, such as the IOPs 158 and 160, Channel Adapters 164, 174, and 176, and Control Units 186, 188, and 190.

Query processing performance is improved in two ways. First, the striping of Database A permits multiple I/O requests to be issued and processed in parallel. This results in Database A being read into the Query Buffer 28 at a very high rate. Second, while the DBMS is performing the search defined by the query on data that has been returned in Full Buffers 50, Empty Buffers 52 are being filled with data.

Concurrent with Full File Read Control issuing I/O requests, DBMS Cache Control 230 issues I/O requests for segments of Database A when a cache-miss occurs and when segments need to be written to Disk 58, 60, or 62. Line 262 shows the issuing of I/O requests by the DBMS Cache Control, and Line 264 shows the bidirectional flow of file segments.

The Nonvolatile File Cache 102 minimizes the contention for I/O resources between the I/O associated with Query 212 and the I/O associated with the Transactions 216. A high hit rate for File I/O Requests 262 with respect to Database Segments A 110 in the Nonvolatile File Cache 102 results in the OS File I/O 240 issuing fewer I/O requests to the Disk I/O Channels 252 for Transactions. Line 266 shows I/O requests issued via the Cache I/O Channel 268 to the Nonvolatile File Cache. Line 270 shows bi-directional flow of file segments to and from the Nonvolatile File Cache.

The exemplary system provides the Query Program 214 with search results, as shown by Line 272, that contain the most recent updates to Database A resulting from the concurrent processing of Transactions 216. Given the parallel processing of I/O and query processing by the DBMS 220, the search results will be at most, only a few updates out-of-date. Updates to portions of Database A that occurred after the portions have been provided to the DBMS for searching would not be reflected in the search results. However, the most recent updates to a portion of Database A are present in the file segments returned to Full File Read Control 222. This is accomplished by performing a read of segments of Database A from the Nonvolatile File Cache 102 and merging the results with corresponding segments read from the Disks 25, 60, or 62.

Figure 6:
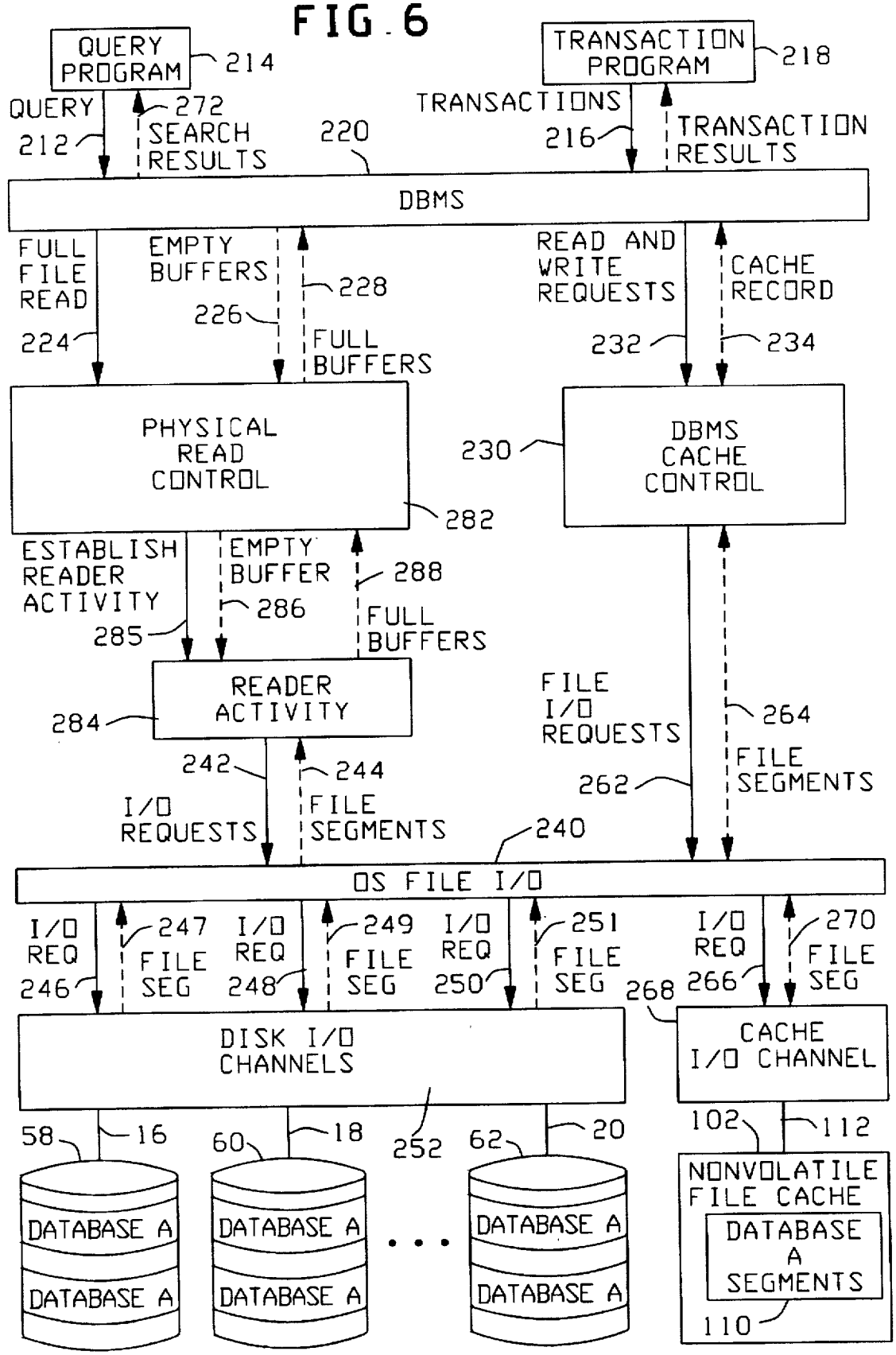
FIG. 6 is a data-flow diagram that illustrates the flow of data between the software components and the database storage devices in a system that provides concurrent processing of queries and transactions against a shared database.

FIG. 6 is a data-flow diagram that illustrates the flow of data between the software components and the database storage devices in a system that provides concurrent processing of queries and transactions against a shared database. FIG. 6 is similar to FIG. 5, except that the Full File Read Control 222 has been expanded to illustrate further control components. The two additional components are Physical Read Control 282 and the Reader Activity 284. The Reader Activity is established as an independent process by the Physical Read Control. Line 285 shows the establishment of the Reader Activity. Physical Read Control and the Reader Activity exchange Empty Buffers 52 and Full Buffers 50 as shown respectively by Lines 286 and 288. The independent Reader Activity allows the searching of the DBMS 220 to be performed in parallel with the processing of the I/O requests 246, 248, and 250.

Figure 7:
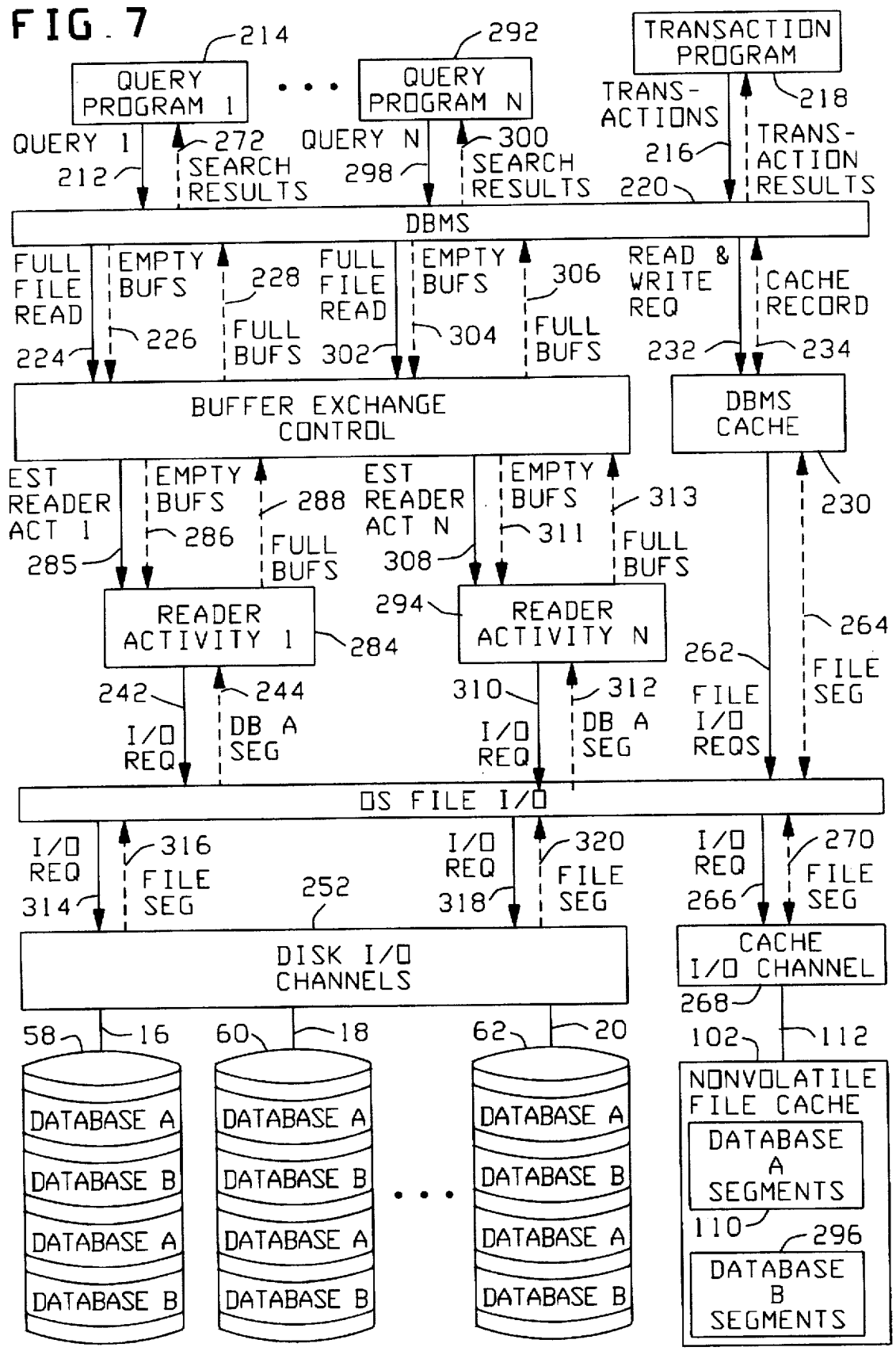
FIG. 7 is a data-flow diagram that illustrates the flow of data between the software components and the database storage devices in a system that provides concurrent processing of multiple queries and transactions against shared databases.

FIG. 7 is a data-flow diagram that illustrates the flow of data between the software components and the database storage devices in a system that provides concurrent processing of multiple queries and transactions against shared databases. The system of FIG. 7 is similar to that of FIG. 6. However, FIG. 7 includes multiple Query Programs, 214 and 292, multiple Reader Activities, 284 and 294, and an additional Database B. Database B is also striped across multiple Disks 58, 60, and 62. Some segments of the file comprising Database B are also cached in the Nonvolatile File Cache 102 as shown by Block 296.

Query Program N 292 initiates Query N with the DBMS 220 as shown by Line 298 and search results are returned to Query Program N as shown by Line 300. The present invention enforces a limit of one query per Database or file. Queries to distinct Databases or files are processed concurrently, however, the I/O requests to the particular Channels and Disks are controlled to prevent the queries from locking out transactions.

The DBMS 220 initiates a full Database B read as shown by Line 302. Physical Read Control manages multiple queries. A set of Empty Buffers 52 that is distinct from the Empty Buffers provided for processing Query 1 is provided for processing Query N. Line 304 shows the Empty Buffers being provided to Physical Read Control. Line 306 shows Full I/O Buffers being returned to the DBMS.

Line 308 shows the establishment of Reader Activity N 294. Reader Activity N initiates I/O Requests for reading segments from Database B as shown by Line 310 to the OS File I/O 240. Line 312 shows the return of segments for Database B. Line 314 represents the collection of I/O Requests on Lines 246, 248, and 250. Similarly, Line 316 represents the return of segments of Database A via the collection of Lines 247, 249, and 251. I/O Request Line 318 represents a similar collection of I/O requests generated for Database B for the respective Channels 16, 18, and 20, and Line 320 represents a similar return of segments for Database B. A distinct set of Empty Buffers 52 and Full Buffers 50 is established for processing Query N as shown by Lines 311 and 313.

Figure 8:
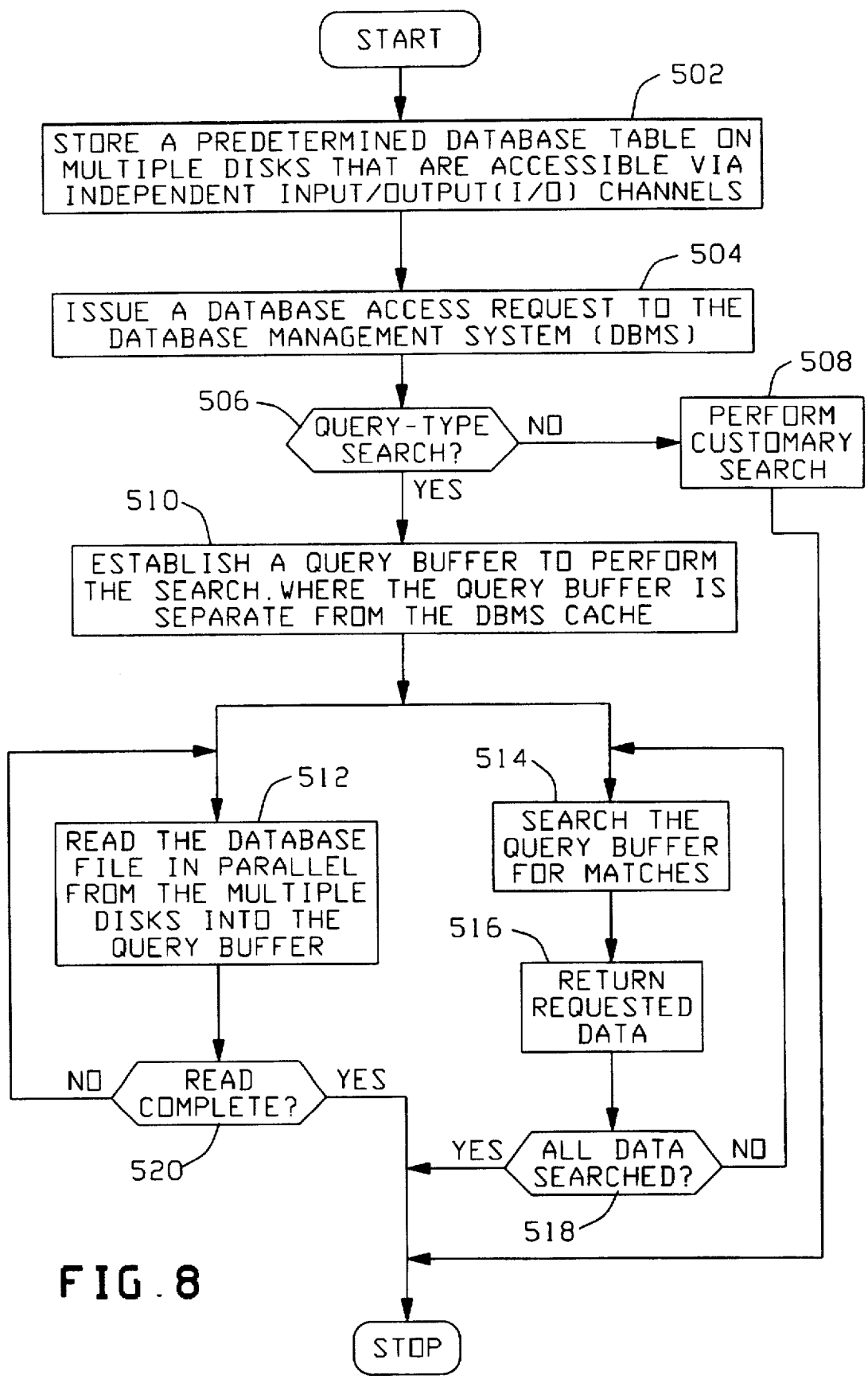
FIG. 8 is a flowchart of the overall processing for performing concurrent processing of queries and transactions against a shared database.

FIG. 8 is a flowchart of the overall processing for performing concurrent processing of queries and transactions against a shared database. The process described in FIG. 8 permits the fast processing of a query while allowing control of the I/O resources used in processing the query such that transaction processing is not severely impacted. Two of the fundamental steps of the process consist of storing the database on multiple Disks 58, 60, and 62, (also referred to as "striping") and performing the query search in a Query Buffer 28 that is separate from the DBMS Cache 34. Striping the Database allows the Database to be read very quickly. The dedicated Query Buffer provides a momentary snapshot of consistent data. The Query Processor is kept busy searching the Query Buffer at the same time that the Database is being read from the Disks.

Step 502 specifies storing the Database on multiple Disks 58, 60, and 62 on multiple Channels 16, 18, and 20. The objective of striping the Database is to allow for reading the Database at a rate that is equal to or greater than the Query Processor 10 can search the data. At Step 504 a request is issued to the DBMS 220 for access to Database A. The requested access may be classified as either a transaction or a query. Processing of transactions is performed as in prior art systems, and decision Step 506 directs control to Step 508 for performing the specified search.

For a query, control is directed to Step 510. Further details on how a query is detected will be discussed later in this specification. At Step 510, a Query Buffer 28 is established for use by the Query Processor 10. The Query Buffer is distinct from the DBMS Cache 34. Transactions are processed against the DBMS Cache 34 and queries are processed against data in the Query Buffer, which exists only for the duration of the query. After the Query Buffer is established, two processing loops proceed substantially in parallel.

Step 512 reads the Database into the Query Buffer 28. Multiple I/O requests are initiated over the multiple Channels 16, 18, and 20. As the data becomes available in the Query Buffer 28, the Query Processor may immediately perform the search specified by the query. Because the Database is striped, it may be read at a rate that is fast enough to keep the Query Processor busy. That is, the Query Processor should not have to wait for data to be searched. Step 514 specifies searching the Query Buffer for records that satisfy the query. At the same time that the Query Buffer is being searched by the Query Processor, additional I/O requests may be issued by the Reader Activity 284. Any records that are found are returned at Step 516. If there is still more expected to be searched, decision Step 518 returns control to Step 514. Step 520 tests whether the read of the Database is complete. If not, control is returned to Step 512 to issue more I/O requests.

The DBMS 220, such as the software that comprises the RDMS 2200 and UDS 2200 software products of Unisys Corporation, has been modified to utilize the Full File Read control 222 for processing queries. In addition, a new table level locking mode that is referred to as Access Mode, has been added. An Access Mode lock allows the user to direct the DBMS to execute the search using no locking for data protection. This allows optimal transaction and query processing concurrency, as well as optimal query processing speed.

The Access Mode lock is utilized by a Query Program 214 prior to initiating a query. An Access Mode lock behaves like a retrieval lock, that is the query program is restricted from performing any updates to the table prior to issuing an unlock command to the DBMS 220. However, a table that is locked in Access Mode allows retrieval of records that are locked by other programs that could be updating the table. Therefore, a query may result in a "dirty" read of a table, that is the same row of a table may be read twice, some records may be missed, and some of the records read may contain uncommitted data.

The Access Mode lock is compatible with all other table locking modes except Exclusive Retrieval and Exclusive Update. Other programs are prohibited from locking a table in Exclusive Retrieval or Exclusive Update mode when the table is already locked in Access Mode. Furthermore, the Access Mode lock may not specify the modes of Protected, Shared, or Exclusive. If a cursor is defined over a table that is locked in Access Mode, then the cursor will not be allowed to fetch the Last, Prior, or Current records in the table.

Figure 9:
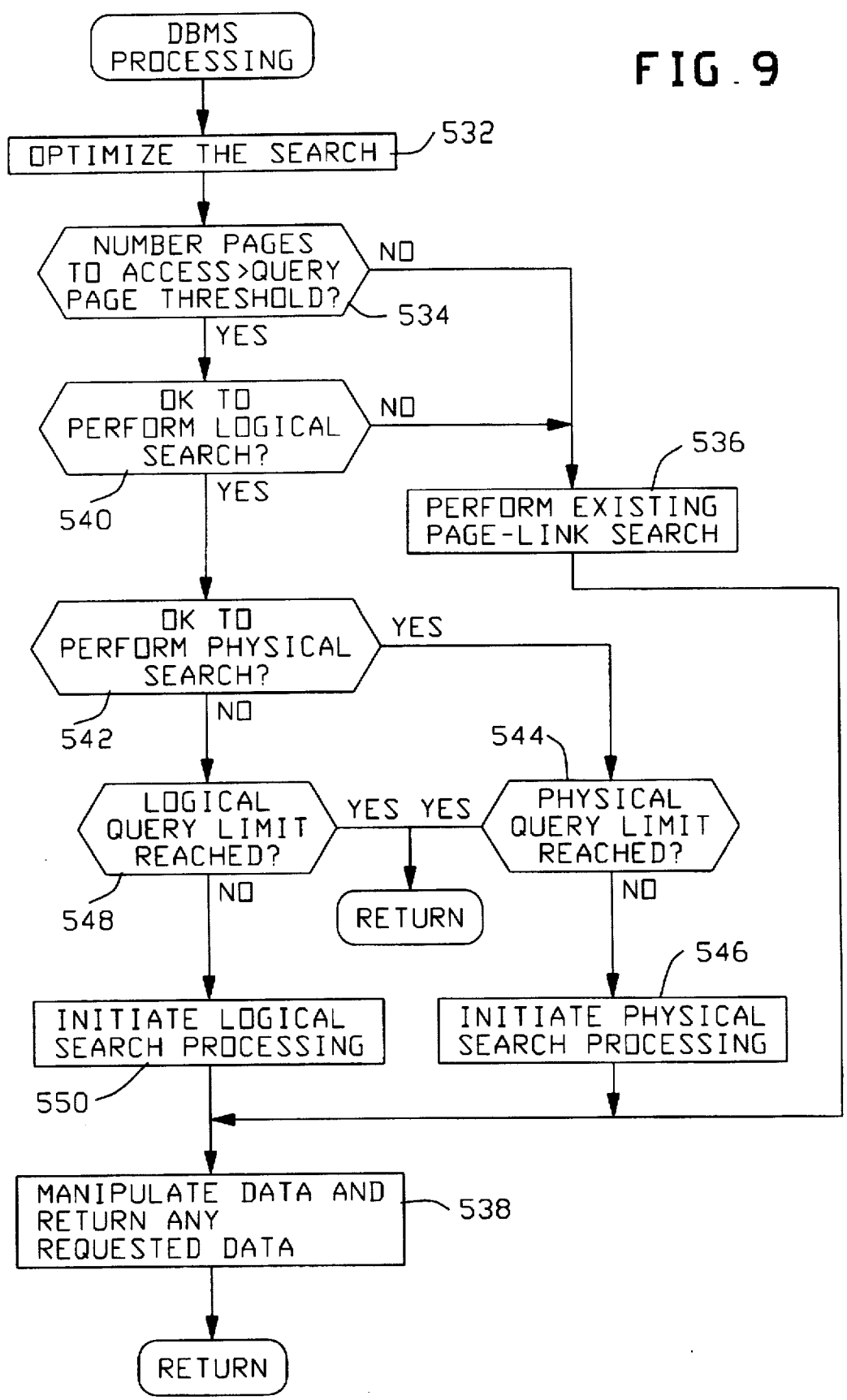
FIG. 9 is a flowchart of the processing performed by the Database Management System (DBMS) to support the system for concurrent processing of transactions and queries against a shared database.

FIG. 9 is a flowchart of the processing performed by the Database Management System (DBMS) to support the system for concurrent processing of transactions and queries against a shared database. The DBMS 220 is the component that distinguishes between transactions and queries. Transactions are processed as in the prior art, and new control is added for query processing.

Step 532 optimizes the search according to known optimization techniques such that the total number of records of the database to be processed is reduced. If the number of Database pages to search is less than or equal to a predetermined Query Page Threshold, decision Step 534 directs control to Step 536. The Query Page Threshold is established because the improved method for reading the Database file will not substantially benefit processing the query. Step 536 performs an existing page-link search to process the request. Step 538 performs any manipulation of data that is specified in the request and returns any requested data. For this path, control is returned to a Transaction Program 218.

If the Query Page Threshold is exceeded, decision Step 534 directs control to decision Step 540. Decision Steps 540 and 542 perform a sequence of checks to further determine whether a Full File Read Control 222 should be used to read the Database, and whether Physical Read Control 236 or Logical Read Control 238 should be used.

Decision Step 540 tests whether Logical Read Control 238 should be initiated. The Logical Read Control improves performance for processing queries for which an index is used in searching the Database. Reading a large number of pages of the Database into the Query Buffer 28 reduces the I/O cost for the search.

There are two types of searches that may result from initiating the Logical Read Control 238, depending upon the type of lock on the specified table. The two types of searches are the Protected search and the Unprotected search. In the Protected search the specified table is locked in Retrieval, Protected Retrieval, or Exclusive Retrieval mode, or no explicit lock is specified, but the query is read-only. In an Unprotected search, the table is explicitly locked in Access Mode.

All the following criteria must be satisfied for a query to qualify for processing by Logical Read Control 238:

1. The access method specified by the query must be either a range or ad hoc. In a range search, records in a certain index range are in the scope of the search. In an ad hoc search, every record in the table is in the scope of the search.

2. Ad hoc or range searches which appear in any query block, which include:

Select commands, cursor specifications, Unload commands, Insert commands with a Select clause, and subqueries in any SQL command.

3. If the table is locked in other than Access Mode, then the query must satisfy at least one of the following conditions:

The query is a cursor definition that involves a Union operation.

The query is either an Insert or Unload command.

The query contains a subquery.

The query block is the root query block of a cursor definition or of a Select command that involves at least one aggregate operation such as Group By, Order By, Having, BIF, or Distinct.

The query is a cursor definition and the very first retrieval after Opening cursor is being done by Fetch Next n command.

With the above conditions, the DBMS 220 ensures that the query block is not allowed to fetch backward, or to fetch the current row. These conditions are necessary to keep user program compatibility. Therefore, the Logical Read Control is initiated only when the query block cannot be fetched in any other direction than forward.

4. If the table is locked in Access Mode, then the query is not required to satisfy the conditions required for other locking modes because the cursor is restricted from scrolling.

5. The table to be searched must be explicitly locked in Access, Retrieval, Protected Retrieval, or Exclusive Retrieval mode, or the thread must be read-only.

6. If the search is accessing a secondary index, then base record retrieval must not be involved.

7. If the query block is a cursor definition, then the cursor must not have a For Update clause because updatable cursors require special locking to maintain the currency of the cursor.

8. If the query block is a cursor definition, then the cursor must not be of Random Access.

9. The search range must be larger than the minimum range width.

If the tests for initiating Logical Read Control fail, decision Step 540 directs control to Step 536. Otherwise control is directed to decision Step 542 to test whether the query qualifies for a physical read of the file. The tests for a search to qualify for processing by Physical Read Control include:

1. The access method specified by the query must be ad hoc.

2. Ad hoc or range searches which appear in any query block, which include:

Select commands, cursor specifications, Unload commands, Insert commands with a Select clause, and subqueries in any SQL command.

3. The ad hoc search is on either the primary or index B-tree.

4. The search is of a single table.

5. If the table is locked in Protected Retrieval or Exclusive Retrieval mode, then the query must satisfy at least one of the following conditions:

The query is a cursor definition that involves a Union operation.

The query is either an Insert or Unload command.

The query contains a subquery.

The query block is the root query block of a cursor definition or of a Select command that involves at least one aggregate operation such as Group By, Order By, Having, BIF, or Distinct.

The query is a cursor definition and the very first retrieval after Opening cursor is being done by Fetch Next n command.

With the above conditions, the DBMS 220 ensures that the query block is not allowed to fetch backward or to fetch the current row. These conditions are necessary to keep user program compatibility. Therefore, the Physical Read Control is initiated only when the query block cannot be fetched in any other direction than forward.

6. If the table is locked in Access Mode, then the query is not required to satisfy the conditions required for Protected Retrieval and Exclusive Retrieval modes because the cursor is restricted from scrolling.

7. The search block does not correlate to the inner subquery.

8. The table to be searched must be explicitly locked in Access, Protected Retrieval, or Exclusive Retrieval mode.

9. The underlying file cannot contain multiple B-trees.

10. The underlying file size must be larger than a minimum file size.

If the search qualifies for processing by Physical Read Control 236, decision Step 542 directs control to decision Step 544. Step 544 tests whether a limit has been reached for the number of queries in process by Physical Read Control. There are two limits. The first limit is that for a particular table only one query may be processed at a time. The second limit is the total number of queries that may be in process by Physical Read Control. The total number of simultaneous physical queries allowed may be set by a system administrator according to the particular application processing needs. Generally, a higher limit may be used where the impact on transaction processing throughput is less critical, and a lower limit may be used where the impact is critical. If either limit has been reached, control is returned to the Query Program 214. Otherwise, control is directed to Step 546 where Physical Search Processing is initiated. Physical Search Processing coordinates with the Physical Read Control in reading the specified table. After the physical read is complete, control is directed to Step 538 as discussed above.

If decision Step 542 finds that the search does not qualify for physical searching, control is directed to Step 548. Decision Step 548 tests whether a limit for concurrent logical searching has been reached. A particular thread is allowed at most 14 concurrent logical searches. This is equal to the number of base tables that can be referenced by an SQL command. If the limit has been reached, control is returned to the Query Program 214. Otherwise, Logical Search Processing is initiated at Step 550. Logical Search Processing coordinates with Logical Read Control 238 in reading the specified table.

Figure 10A:
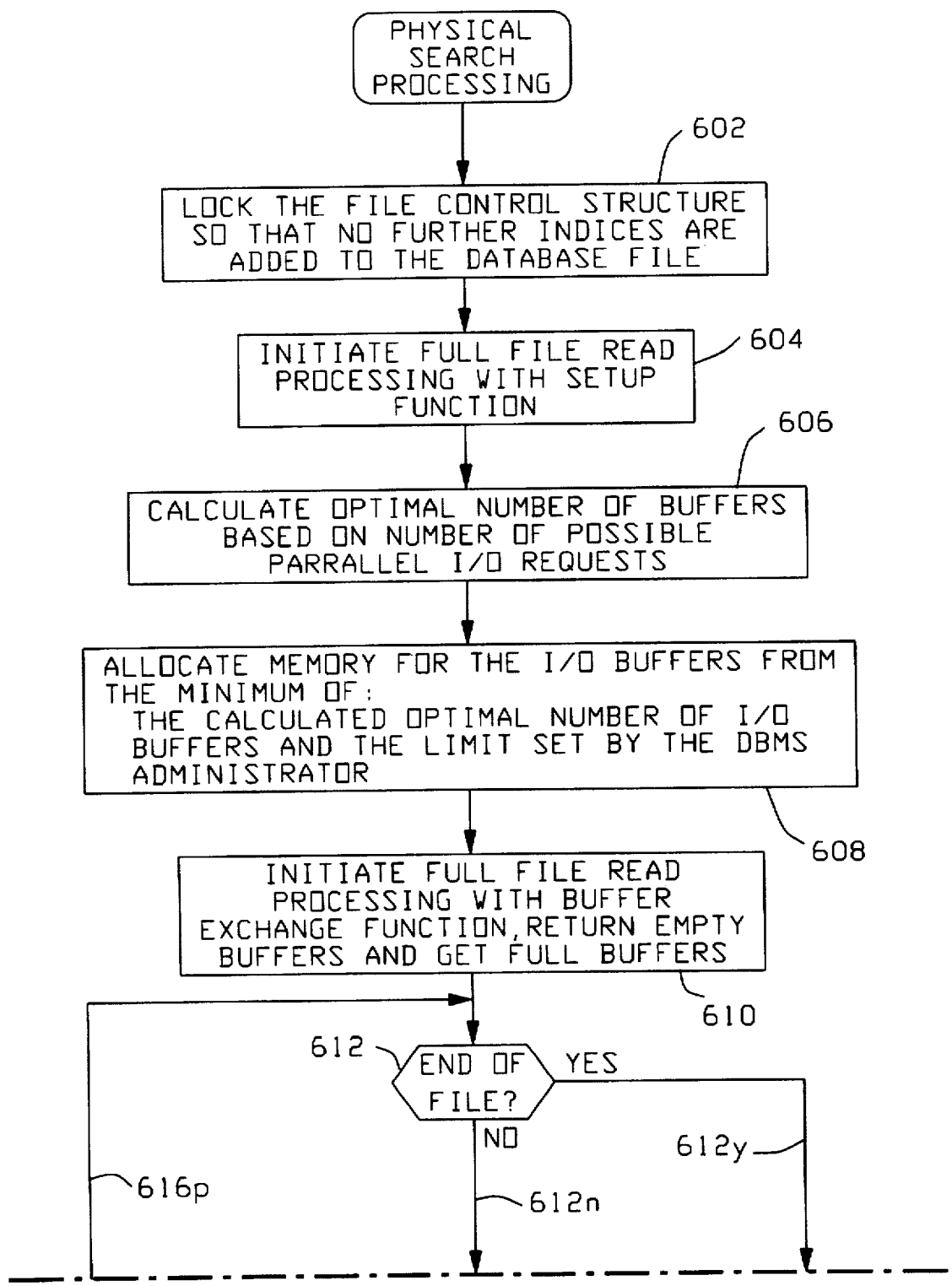
FIG. 10 shows the relationship between FIGS. 10A and 10B which comprise a flowchart of Physical Search Processing.
Figure 10B:
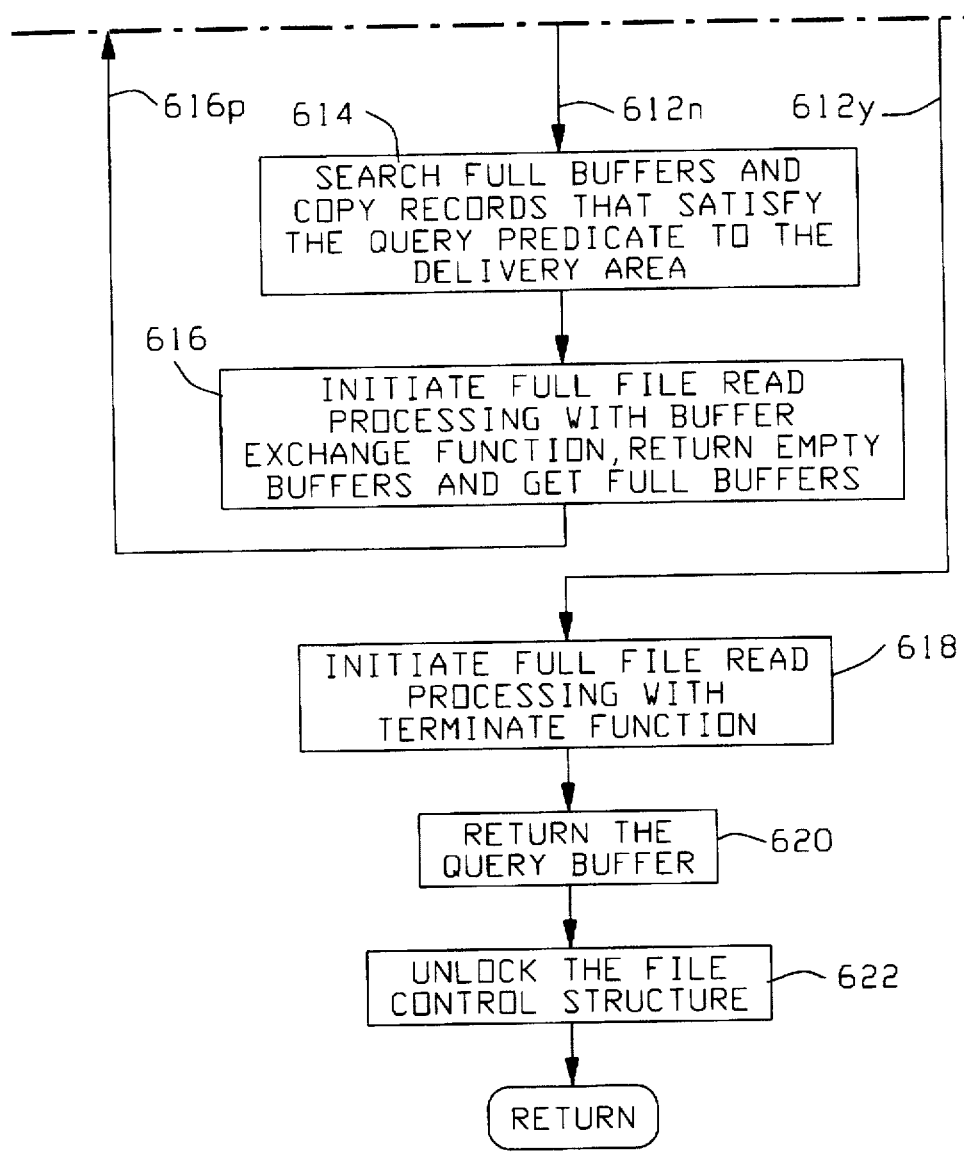
Figure 10:
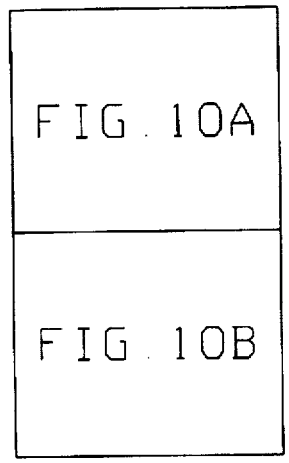

FIG. 10 shows the relationship between FIGS. 10A and 10B which comprise a flowchart of Physical Search Processing. Physical Search Processing coordinates with the Physical Read Control 236 for physically reading a database table. Physical Search Processing coordinates with Physical Read Control to set up the Query Buffer 28 and exchange Empty Buffers 52 for Full Buffers 50, and search the data returned in the Full Buffers.

Step 602 locks the file control structure that is associated with the specified table so that no indices are added to the table while the search is being performed. Full File Read Control Processing is initiated at Step 604 with a Setup function which establishes the Reader Activity 284 and returns the maximum number of I/O requests that will be concurrently issued. This maximum number of I/O requests in the exemplary embodiment is twice the number of Disks 58, 60, and 62 across which Database A is striped. Step 606 calculates the optimal number of Buffers based on the returned maximum number of I/O requests. In the exemplary system the number of Buffers is one more than the maximum number of I/O requests. Step 608 allocates memory for the desired number of Buffers. The amount of memory allocated may be less than that required for the optimal number of Buffers if the system administrator has set a lower limit. A lower limit may be specified when it is desired to limit the impact of query processing on the transaction processing throughput.

Step 610 initiates Full File Read Processing with a Buffer Exchange function to provide the Reader Activity 284 with Empty Buffers 52 and wait for Full Buffers 50. Upon return of Full Buffers, decision Step 612 tests whether the end of the table has been reached. If there are more records to process, control is directed to Step 614. Step 614 searches the Full Buffers and copies records that satisfy the query predicate to a delivery area in the Memory 40 for the Query Program 214. Step 616 initiates Full File Read Processing with the Buffer Exchange function to return the Empty Buffers (the Full Buffers that were just searched) and await more Full Buffers to search. Control is then returned to decision Step 612.

When the entire table has been searched, control is directed to Step 618 where the Full File Processing is initiated with a Terminate function to terminate the Reader Activity 284. Step 620 returns the memory allotted to the Query Buffer 28 to the system and Step 622 unlocks the file control structure. Control is then returned to the Query Program 214.

Figure 11:
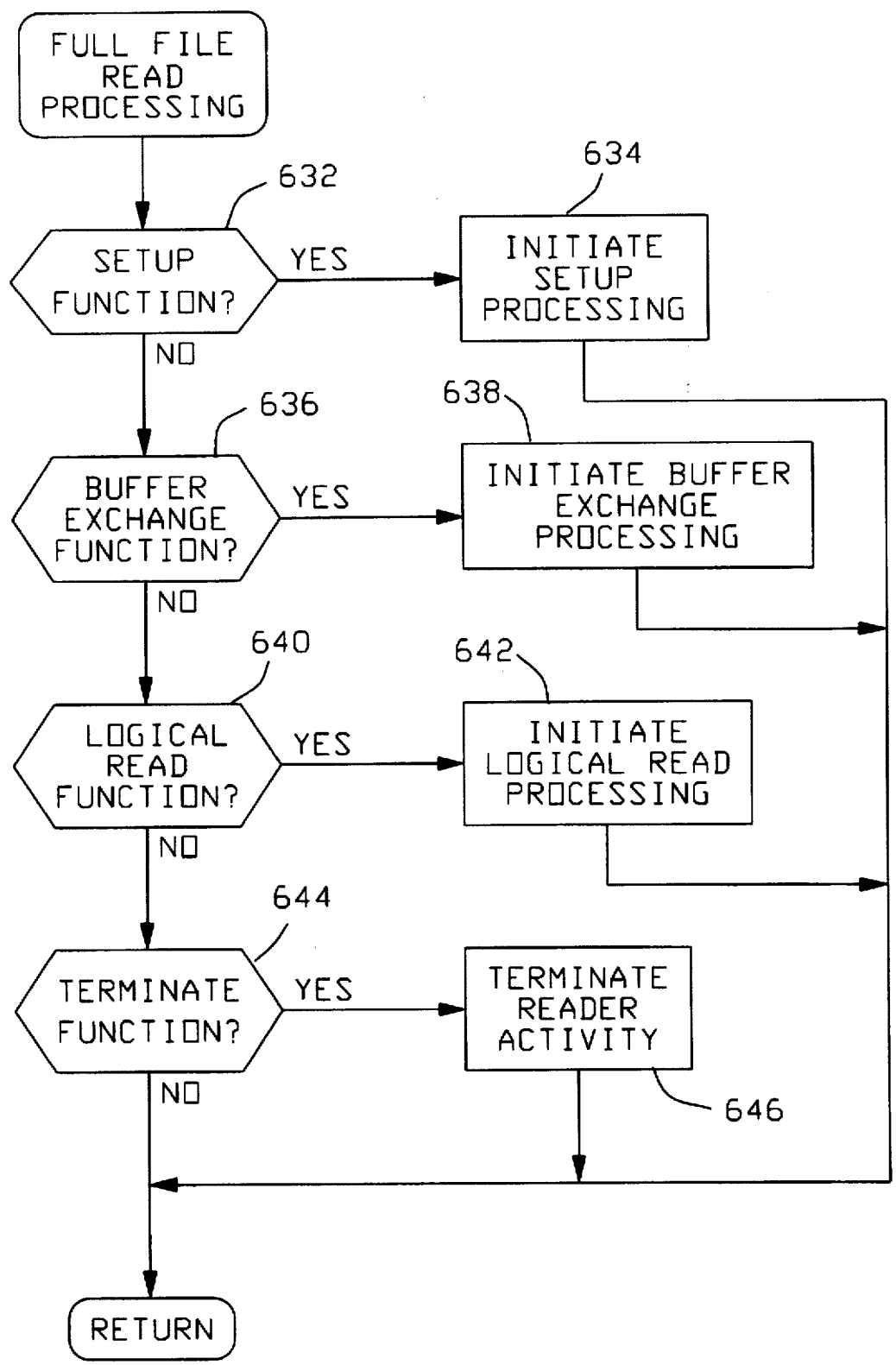
FIG. 11 is a flowchart of the Full File Read Processing.

FIG. 11 is a flowchart of the Full File Read Processing. Four functions are available: Setup, Buffer Exchange, Logical Read, and Terminate. Setup, Buffer Exchange, and Terminate are used for reading a file without regard to the logical relative relationship between segments of the file (referenced as a physical file read), and the Logical Read function is used for a logical read. A sequence of tests is performed to determine the function to perform, as shown by decision Steps 632, 636, 640, and 644. For a Setup function, Setup Processing is initiated at Step 634; for a Buffer Exchange function, Buffer Exchange Processing is initiated at Step 638; for a Logical Read function, Logical Read Processing is initiated at Step 642; and for a Terminate function, the Reader Activity 284 is terminated at Step 646.

Figure 12:
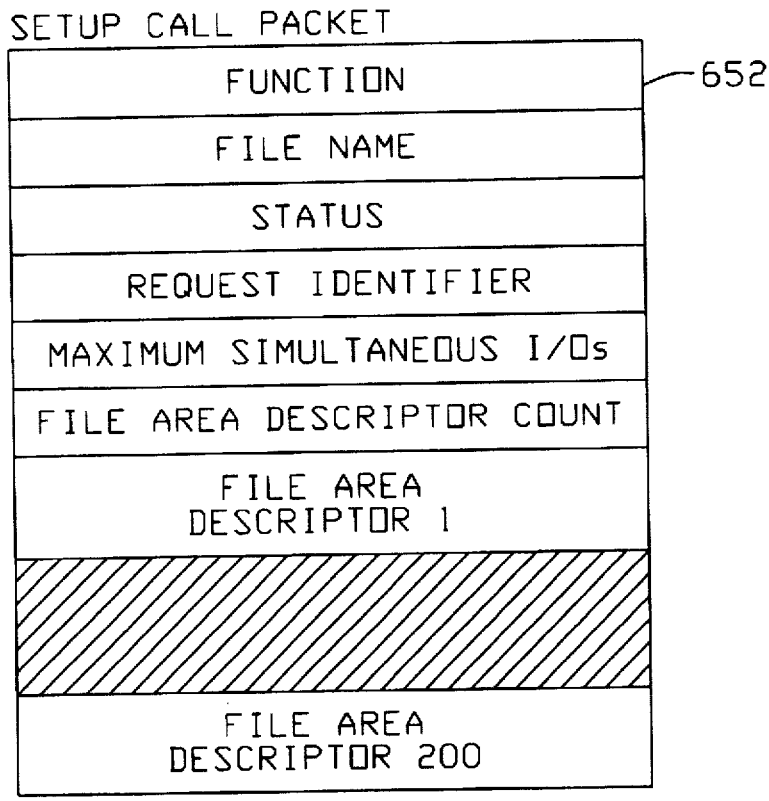
FIG. 12 shows the parameters contained in a Setup Call Packet.

Full File Read Processing is initiated with a call packet that contains parameters that vary according to the specified function. FIG. 12 shows the parameters contained in a Setup Call Packet 652. For the purposes of this specification, a Request is one or more invocations of Full File Read Processing that, as a whole, return all the specified areas of a particular file. Each of the invocations of Full File Read Processing for one Request are referred to as Calls. The fields in the Setup Call Packet are defined as follows:

Function—a code that specifies the Setup function.

File Name—identifies the particular file that contains the table to read.

Status—a code returned to indicate the status of the call.

Request Identifier—a code returned from the Setup call to identify the physical file read.

Maximum Simultaneous I/Os—is returned from the Setup call to designate the number of simultaneous I/O requests that may be made for the Request.

File Area Descriptor Count—is the number of File Area Descriptors in the call packet.

File Area Descriptors 1–200—describe the areas of the file that are to be read. Up to 200 File Area Descriptors may be specified.

Figure 13:
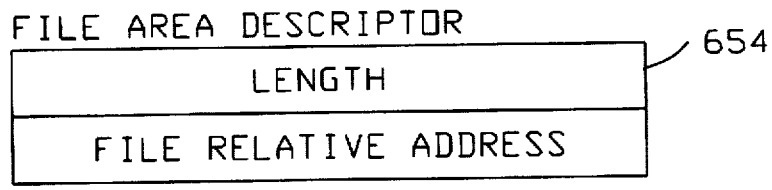
FIG. 13 show the format and content of a File Area Descriptor.

FIG. 13 shows the content of a File Area Descriptor 654. The Length and File Relative Address fields may vary according to the units of granularity of the specified file. The fields may designate words for word addressable files or segments for segment addressable files.

Figure 14:
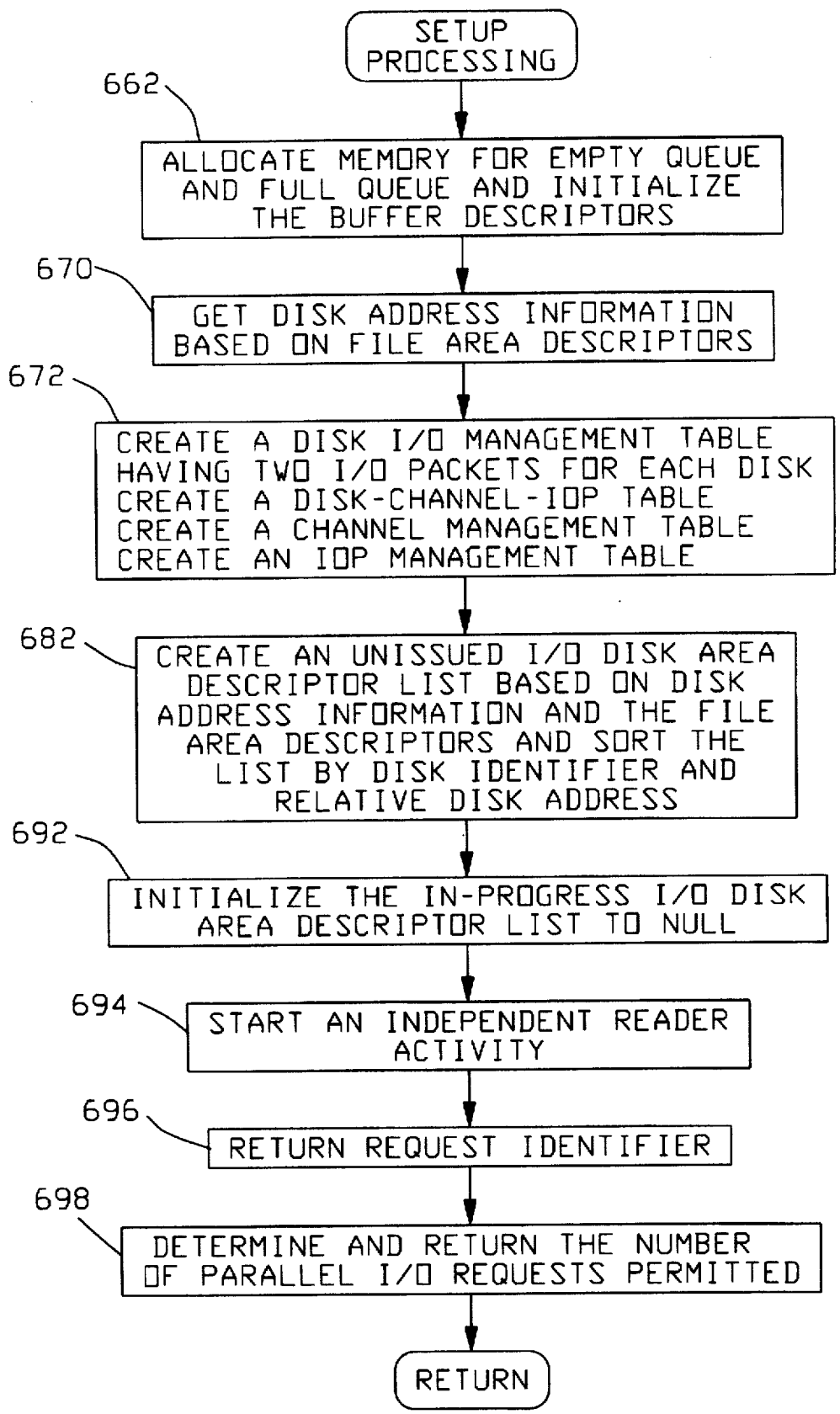
FIG. 14 is a flowchart of the Setup Processing.

FIG. 14 is a flowchart of the Setup Processing. Setup Processing is initiated from Full File Read Processing to establish the control structures required to perform a physical read of a file.

Figure 15:
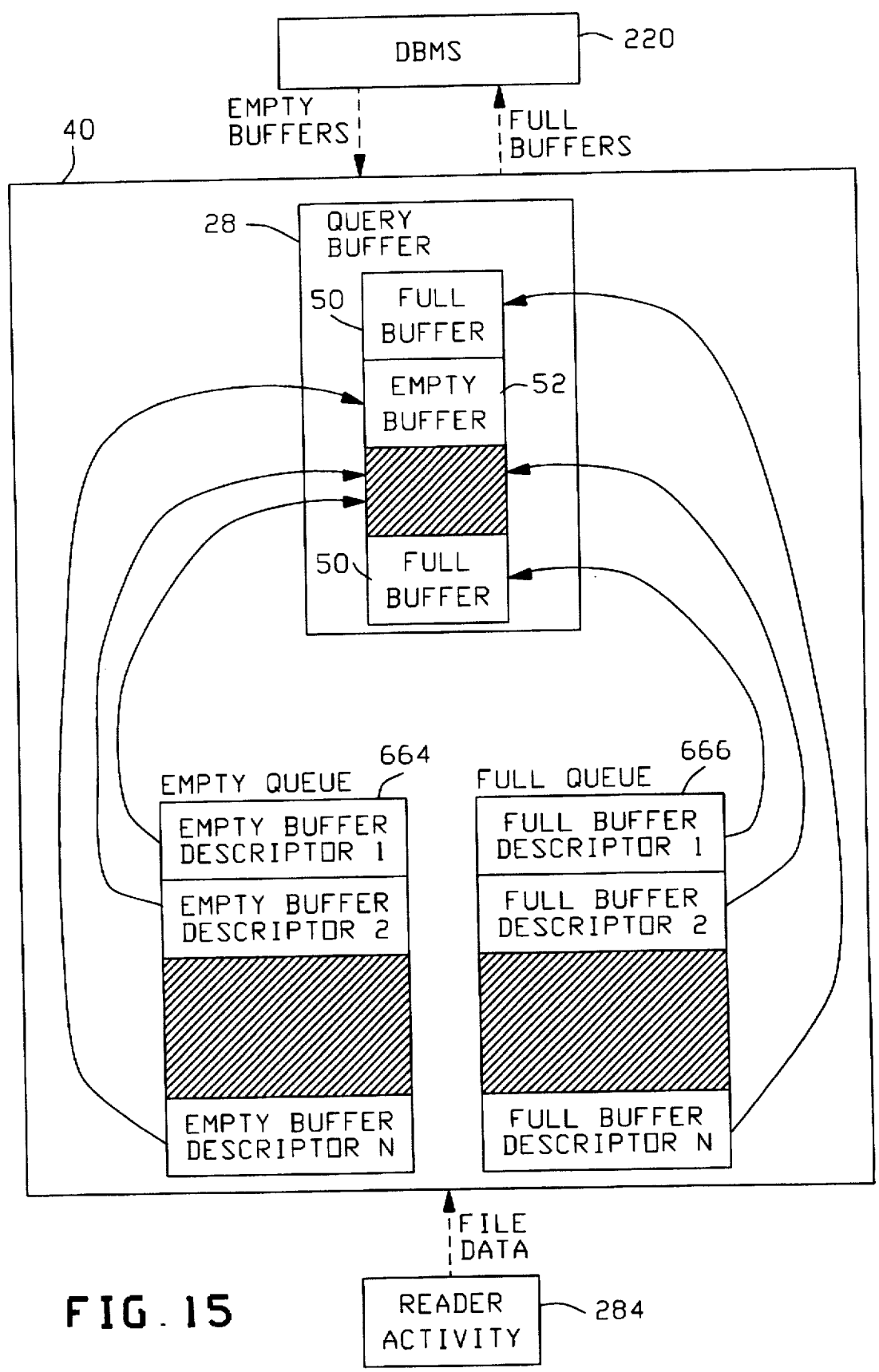
FIG. 15 illustrates the relationship between the Empty Queue, the Full Queue, the Query Buffer, the DBMS, and the Reader Activity.

Step 662 allocates memory for the Empty Queue 664 and Full Queue 666 as shown in FIG. 15. The entries in the Empty Queue and Full Queue are used to reference distinct ones of Buffers in the Query Buffer 28.

FIG. 15 illustrates the relationship between the Empty Queue 664, the Full Queue 666, the Query Buffer 28, the DBMS 220, and the Reader Activity 284. The DBMS 220 receives Full Buffers 50 for searching and returns Empty Buffers after searching. Thus, a Full Buffer becomes an Empty Buffer after the DBMS has searched the Buffer.

The Query Buffer 28 consists of Empty Buffers 52 and Full Buffers 50. During processing of a query, the Empty Buffers 52 are receiving file data as a result of I/O requests issued by the Reader Activity 284. At the same time, the Full Buffers 50 are being searched by the DBMS 220.

The Empty Queue 664 consists of N Empty Buffer Descriptors 668. The Buffer Descriptors point to an Empty Buffer 52 in the Query Buffer 28. The Full Queue 666 consists of N Full Buffer Descriptors, each of which references a Full Buffer 50 in the Query Buffer.

Figure 16:
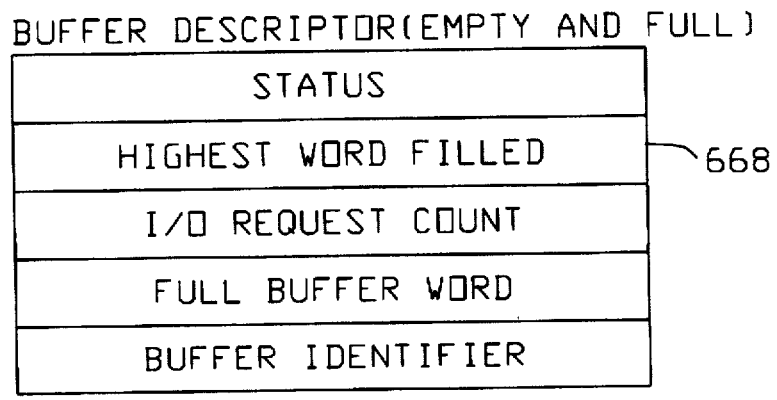
FIG. 16 illustrates the content of a Buffer Descriptor.

FIG. 16 illustrates the content of a Buffer Descriptor 668. The fields in a Buffer Descriptor are defined as follows:

Status—indicates whether the referenced I/O Buffer is empty or full.

Highest Word Count—indicates the highest word address in the referenced Buffer that has been filled.

I/O Request Count—indicates the number of I/O requests that are currently in progress and are writing data which is being read from Disk into the Buffer.

Full Buffer Word—is the word offset address in the I/O Buffer at which the I/O Buffer is considered a Full I/O Buffer 50. This value may vary according to the page size defined by the Database.

Buffer Identifier—is a pointer to the particular Buffer referenced by the Buffer Descriptor.

Returning to FIG. 14, Step 670 obtains Disk address information based on the File Area Descriptors 654 contained in the Setup Call Packet 652. The purpose is to identify the devices on which the file is stored. Step 672 then creates a Disk I/O Management Table, a Disk-Channel-IOP Table, a Channel Management Table, and a IOP Management Table.

Figure 17:
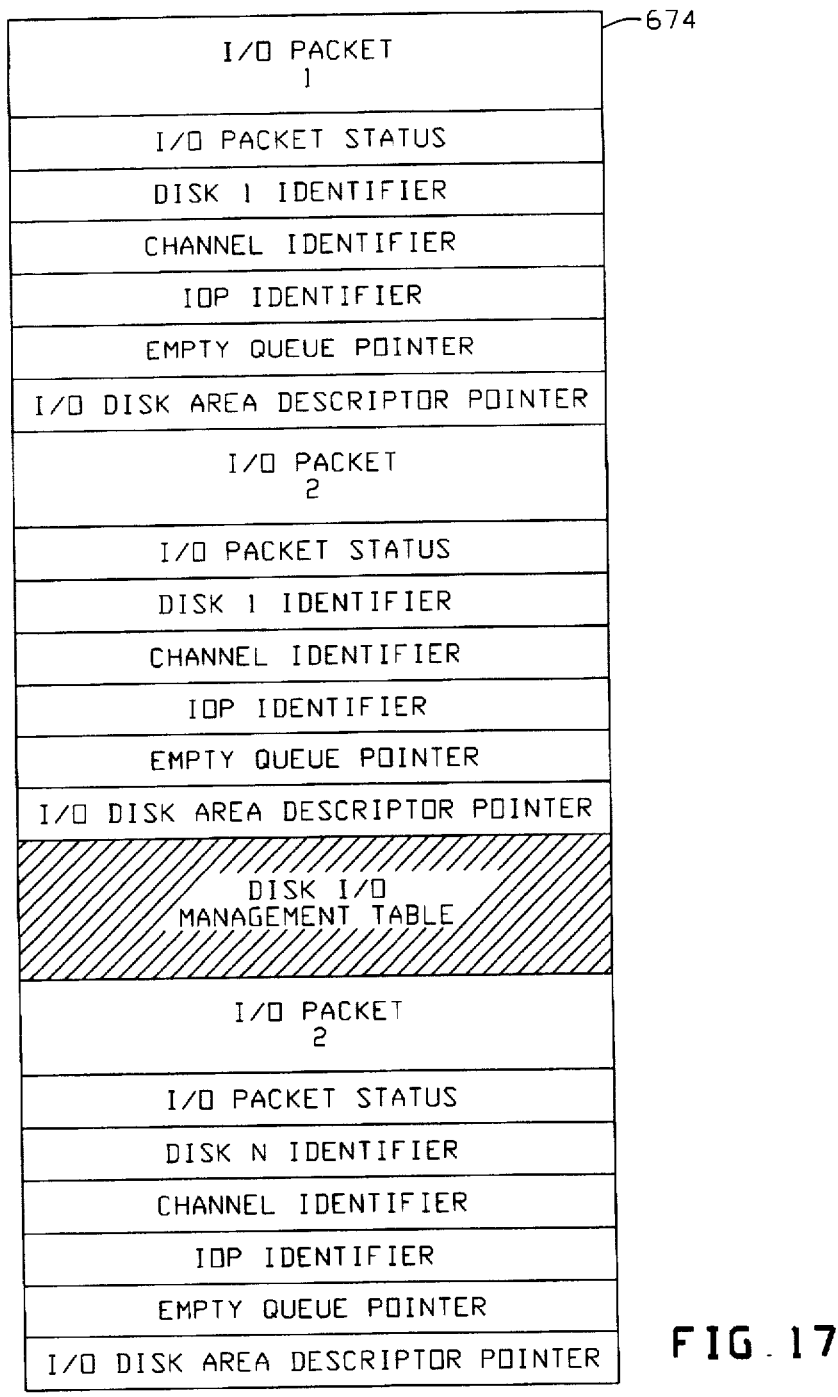
FIG. 17 illustrates the content of the Disk Management Table.

FIG. 17 illustrates the content of the Disk Management Table 674. The Disk I/O Management Table is used to control the number of I/O requests that are issued and incomplete for a particular Request. The Table contains two entries for each Disk 58, 60, and 62 on which the specified file is stored. Each entry contains the following fields:

I/O Packet—contains the information that is provided to the OS File I/O 240 for reading a portion of the specified file.

I/O Packet Status—indicates whether the I/O Packet is available or an I/O request is in-progress.

Disk Identifier—identifies the particular Disk to which the I/O request has been issued.

Channel Identifier—identifies the I/O Channel over which the I/O request is expected to be issued.

IOP Identifier—identifies the IOP through which the I/O request is expected to be issued.

Empty Queue Pointer—points to an Empty Buffer Descriptor in the Empty Queue 664.

I/O Disk Area Descriptor Pointer—points to an I/O Disk Area Descriptor (which is described in FIG. 22).

FIG. 18 illustrates the content of the Disk-Channel-IOP Table. The Disk-Channel-IOP Table is used to determine the possible I/O Channels 16, 18, and 20 through which a Disk is accessible. The Disk Identifier column identifies the different Disks 58, 60 and 62 on which the requested file is stored. There may be more than one entry for a single Disk if it is accessible via multiple Channel Adapters 164, 174, or 176. For each entry in the Disk Identifier column, there is at least one corresponding entry in the Channel Identifier column that identifies the Channel Adapter providing access to the Disk. For each Channel Identifier there is one IOP Identifier that identifies the IOP 158 or 160 to which the Channel Adapter is coupled. For example, Disk 192 of FIG. 4 would have two entries in the Table as follows (the reference numerals are used as the identifiers):

| Disk Identifier | Channel Identifier | IOP Identifier |
| --- | --- | --- |
| 192 | 164 | 158 |
| 192 | 174 | 160 |

FIG. 19 illustrates the content of the Channel Management Table. The Channel Management Table 678 is used to control the number of outstanding I/O requests over a particular Channel 16, 18, or 20 for a physical read Request. The Table has a row for each Channel Adapter. Each row contains the Channel Identifier that uniquely identifies the Channel Adapter 164, 174, and 176 that provides access to the Disks 58, 60, and 62 on which the file is stored, a Maximum I/O Requests field that is preset according to the I/O capacity of the particular Channel, and an I/O Request Count field for the number of I/O requests presently issued and incomplete (with respect to the physical file read) for the associated Channel Identifier.

FIG. 20 illustrates the content of the IOP Management Table. The IOP Management Table 680 is used to control the number of outstanding I/O requests in process by a particular IOP 158 and 160 for a physical read Request. The Table has a row for each IOP. Each row contains the IOP Identifier that uniquely identifies the IOP that provides access to the Disks 58, 60, and 62 on which the file is stored, a Maximum I/O Requests field that is preset according to the I/O capacity of the IOP, and an I/O Request Count field for the number of I/O requests presently issued and incomplete (with respect to the physical file read request) for the associated IOP.

Figure 21:
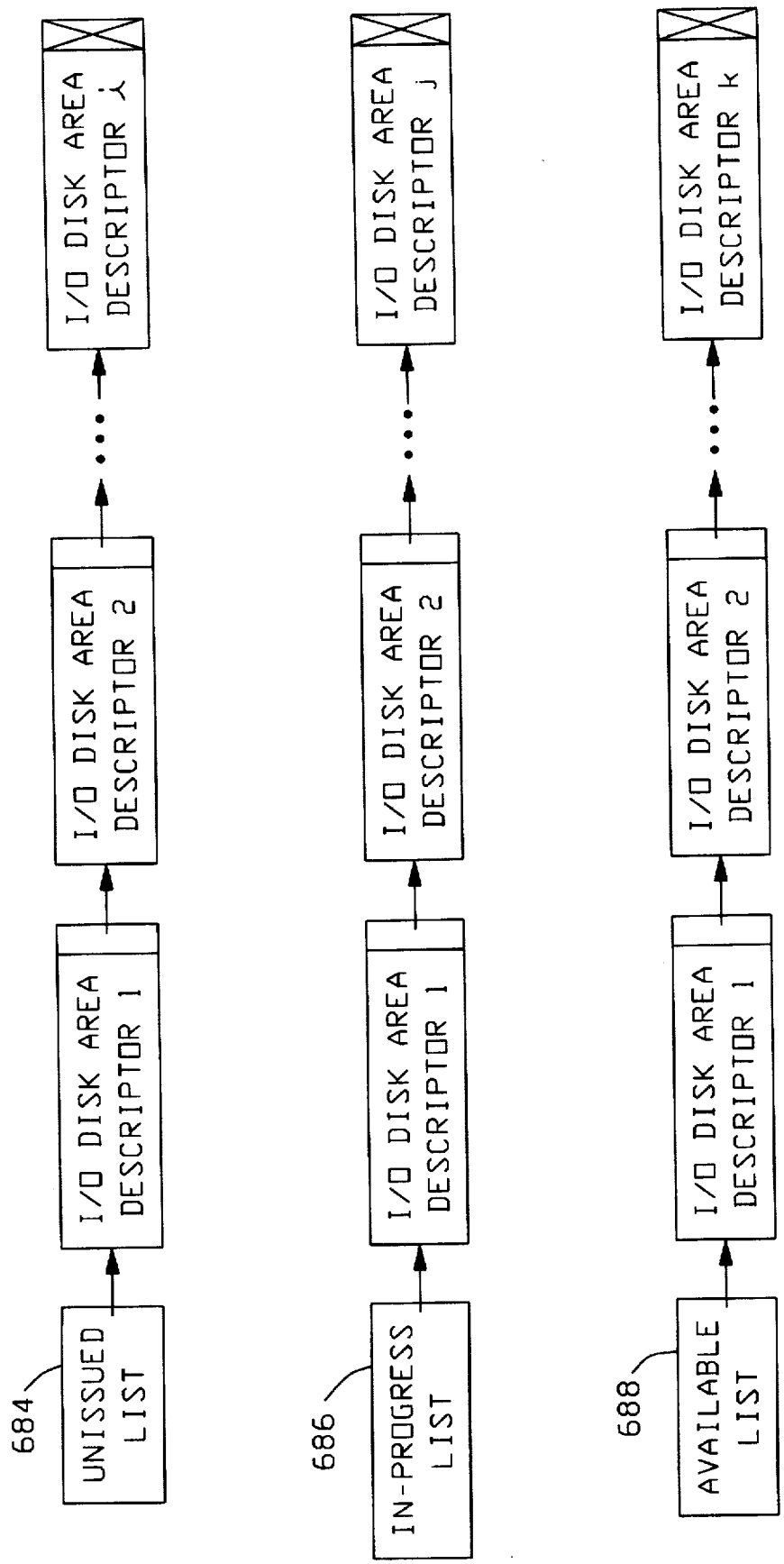
FIG. 21 illustrates the Unissued I/O Disk Area Descriptor list, the In-progress I/O Disk Area Descriptor list, and the Available I/O Disk Area Descriptor list.

Returning to Step 682 of FIG. 14, three lists of I/O Disk Area Descriptors are created to manage issuing I/O requests. FIG. 21 illustrates the three lists: the Unissued I/O Disk Area Descriptor list (Unissued list 684), the In-progress I/O Disk Area Descriptor list (In-progress list 686), and the Available I/O Disk Area Descriptor list (Available list 688). During Setup Processing, the Unissued list contains all the requests specified in the File Area Descriptors 654 from the Setup Call Packet 652. In reading the file, I/O Disk Area Descriptors move from the Unissued list to the In-progress list to the Available list. Entries on the Available list are used for creating new I/O Disk Area Descriptors on the Unissued list. The In-progress list contains I/O Disk Area Descriptor corresponding to I/O requests that have been issued and are incomplete.

FIG. 22 illustrates the content of an I/O Disk Area Descriptor. The fields in an I/O Disk Area Descriptor 690 are defined as follows:

Disk Identifier—identifies the particular Disk 58, 60, or 62 to which the I/O request is to be (or has been) issued.

Disk Relative Word Address—identifies the word address relative to the first addressable word on the Disk at which the area begins.

File Relative Word Address—identifies the word address relative to the first logically addressable word of the file at which the area begins.

Disk Area Length—is the length in words of the area to read.

I/O Packet Pointer—is a pointer to the I/O Packet in the Disk I/O Management Table 674.

Next I/O Disk Area Descriptor Pointer—is a pointer to the next I/O Disk Area Descriptor 684.

Combined Pointer—is a pointer to an I/O Disk Area Descriptor that will be combined into one I/O request.

The Unissued list 684 is then sorted by Disk Identifier and by Disk relative address. Step 692 initializes the In-progress list 686 to null.

At Step 694, an independent Reader Activity 284 is started to begin issuing I/O requests. A Request Identifier is assigned and returned to the caller at Step 696. The Request Identifier is then used on subsequent Buffer Exchange requests initiated by the caller. Step 698 determines the number of parallel I/O requests that may be issued and returns this value to the caller. The number of parallel I/O requests is equal to twice the number of Disks on which the file is stored. The number of parallel I/O requests per Disk may be adjusted upward or downward according to the performance capabilities of a particular Disk.

Figure 23:
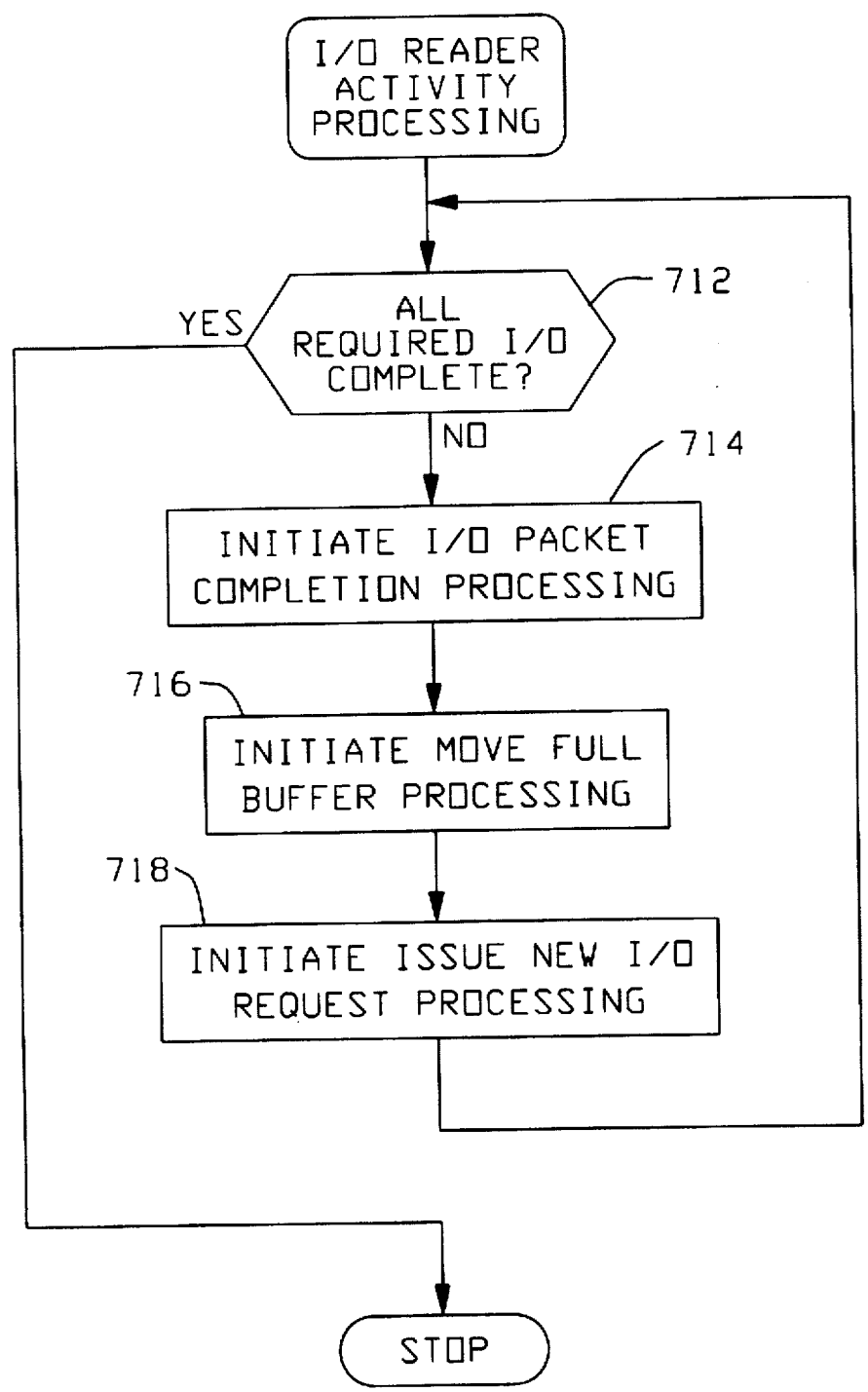
FIG. 23 is a flowchart of the Reader Activity processing.

FIG. 23 is a flowchart of the Reader Activity processing. The Reader Activity 284 completes processing of I/O requests, moves Buffers to the Full Queue 666, and issues I/O requests from the Unissued list 684 of I/O Disk Area Descriptors. Decision Step 712 tests whether there are any I/O requests remaining to be issued or are in-progress. If all the I/O requests have not completed, control is directed to Step 714 where I/O Packet Completion Processing is initiated. I/O Packet Completion processing manipulates the In-progress list 686 and Disk Management Table 674 as necessary.

Step 716 initiates Move Full Buffer Processing to move any Buffers on the Empty Queue 664 that have been filled with data to the Full Queue 666. The last Step 718 in the Reader Activity processing loop is to initiate Issue New I/O Request Processing. Issue New I/O Request Processing selects one or more I/O Disk Area Descriptors 690 from the Unissued list 684 and issues an I/O request.

Figure 24:
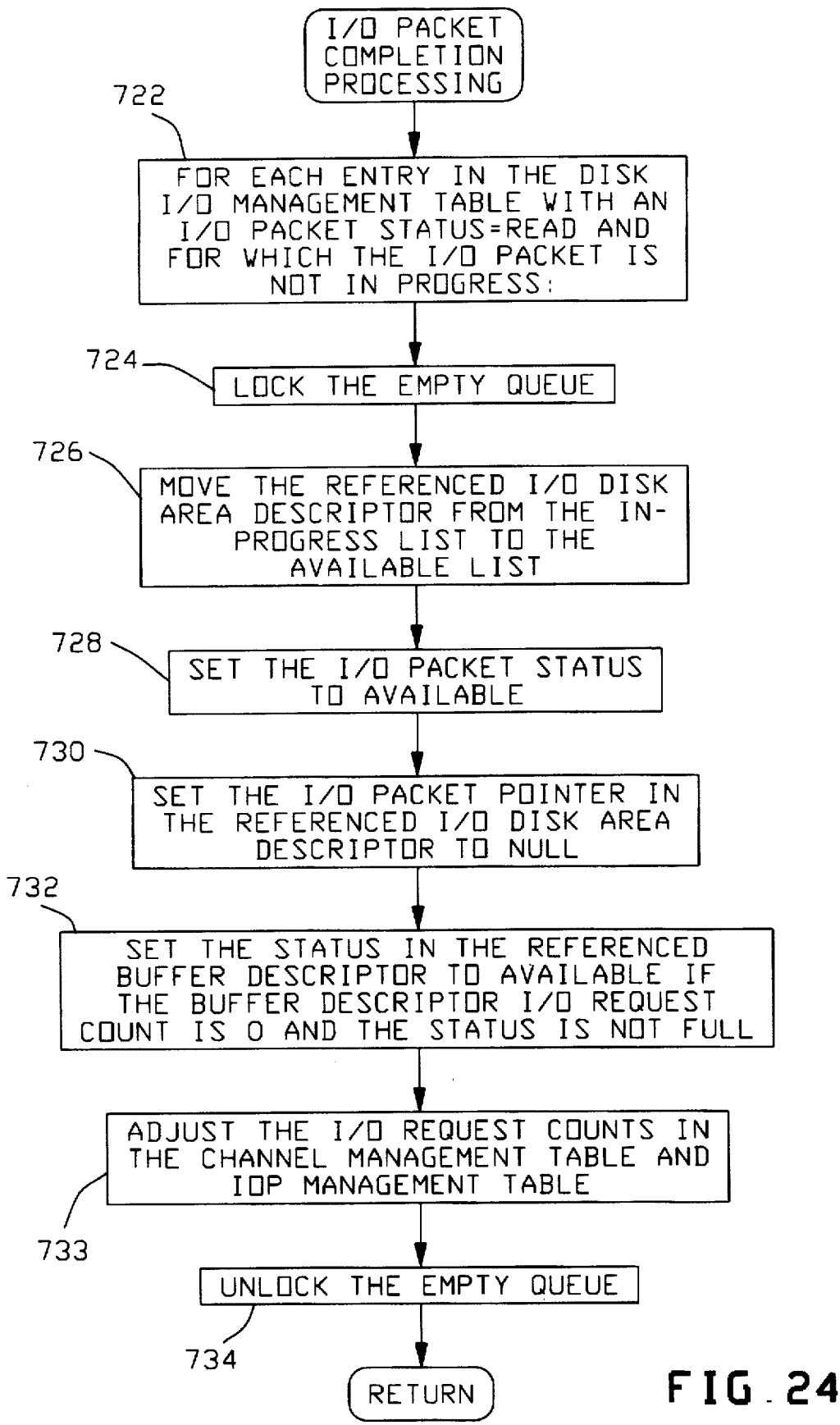
FIG. 24 is a flowchart of the I/O Packet Completion Processing.

FIG. 24 is a flowchart of the I/O Packet Completion Processing. I/O Packet Completion Processing checks the Disk I/O Management Table 674 for completed I/O Packets and processes them accordingly. At Step 722, the Disk I/O Management Table is checked for I/O Packets with a Status of Read and which are not In-progress. For each I/O Packet found, Steps 724–734 are performed.

Step 724 locks the Empty Queue 664 to prevent manipulation of the Empty Queue by the Buffer Exchange Processing (described in subsequent FIGS.) while the completed I/O request is processed. The I/O Disk Area Descriptor 690 on the In-progress list 686 that is referenced by the I/O Disk Area Descriptor Pointer from the entry in the Disk I/O Management Table 674 is moved to the Available list 688 at Step 726. Step 728 sets the I/O Packet Status to Available in the Disk I/O Management Table and Step 730 sets the I/O Disk Area Descriptor Pointer to null.

Step 732 adjusts the Status of the Buffer Descriptor 668 that is referenced by the Empty Queue Pointer in the Disk I/O Management Table 674 if all I/O requests that are writing to the Empty Buffer 52 have completed. If the I/O Request Count in the Buffer Descriptor is 0 and the Status is not Full, the Status in the Buffer Descriptor is set to Available so that additional I/O request may be issued to write to the Empty Buffer. Step 733 decrements the I/O Request Counts in the Channel Management Table 678 and in the IOP Management Table 680 for the Channel Identifier and IOP Identifier associated with the completed request. Step 734 unlocks the Empty Queue 664. After all completed I/O Packets have been processed, control is returned to the Reader Activity Processing.

Figure 25:
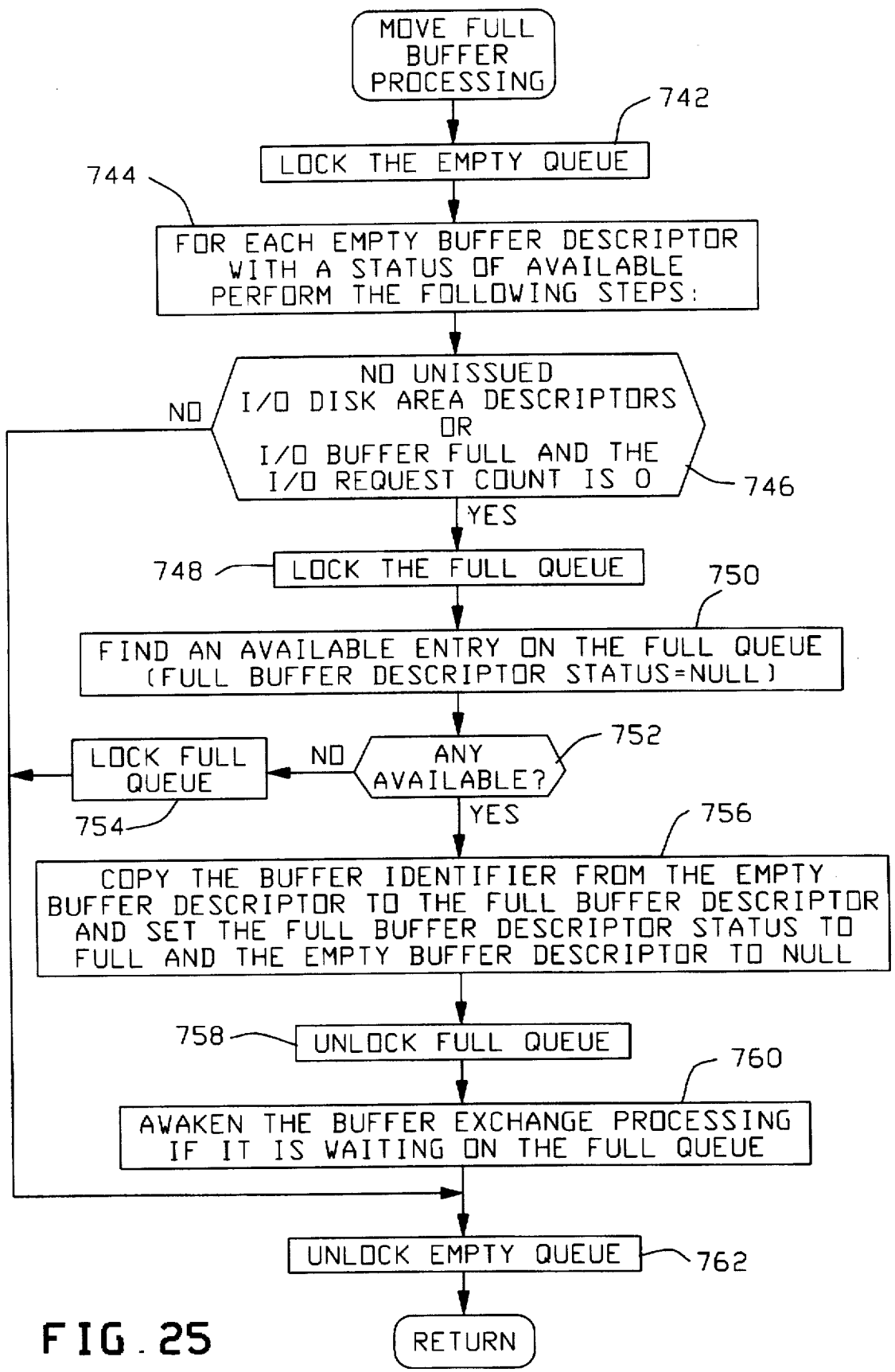
FIG. 25 is a flowchart of the Move Full I/O Buffer Processing that moves I/O Buffers from the Empty Queue to the Full Queue.

FIG. 25 is a flowchart of the Move Full Buffer Processing that moves Buffers from the Empty Queue 664 to the Full Queue 666. If the Buffer Exchange Processing (described in subsequent FIGS.) is waiting for a Full Buffer 50, it is awakened.

Step 742 locks the Empty Queue 664, and Step 744 checks each Buffer Descriptor 668 in the Empty Queue for a Status not equal to Null. For each Buffer Descriptor found, Steps 746–760 are performed. Decision Step 746 tests whether there are any remaining I/O Disk Area Descriptors 690 on the Unissued list 684 or In-progress list 686, or whether the Buffer on the Empty Queue is full and the I/O Request Count for the Buffer is 0. If either condition is satisfied, then the Buffer may be moved to the Full Queue 666 and control is directed to Step 748.

The Full Queue 666 is locked at Step 748 and Step 750 locates an available entry on the Full Queue. If the Status in a Buffer Descriptor 668 on the Full Queue is null, then the Buffer Descriptor is available. If no available entry was found on the Full Queue, decision Step 752 directs control to Step 754 where the Full Queue is unlocked.

If an available Buffer Descriptor 668 was found in the Full Queue 666, control is directed to Step 756 where the Buffer Identifier from the Buffer Descriptor on the Empty Queue is copied to the available entry in the Full Queue. The Status in the Buffer Descriptor on the Full Queue is set to Full and the Status of the Buffer Descriptor on the Empty Queue is set to Null.

Step 758 unlocks the Full Queue 666, and Step 760 awakens the Buffer Exchange Processing if it is waiting for more Full Buffers 50 to return to the Query Processor 10 for processing. Step 762 unlocks the Empty Queue 664 before control is returned to the Reader Activity Processing.

Figure 26B:
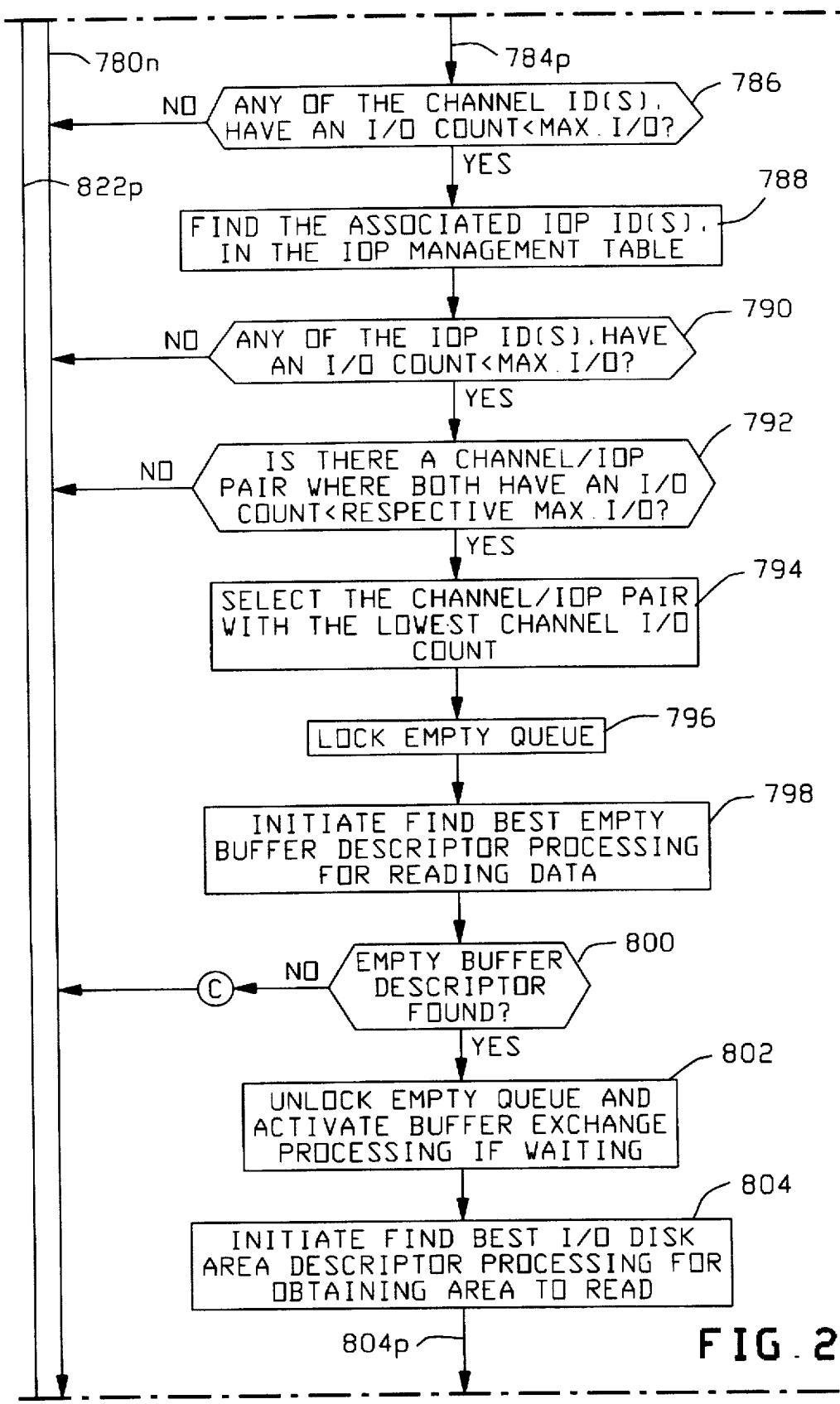
FIG. 26 shows the relationship of the flowchart of FIGS. 26A–D which contain a flowchart of the Issue New I/O Request Processing.
Figure 26C:
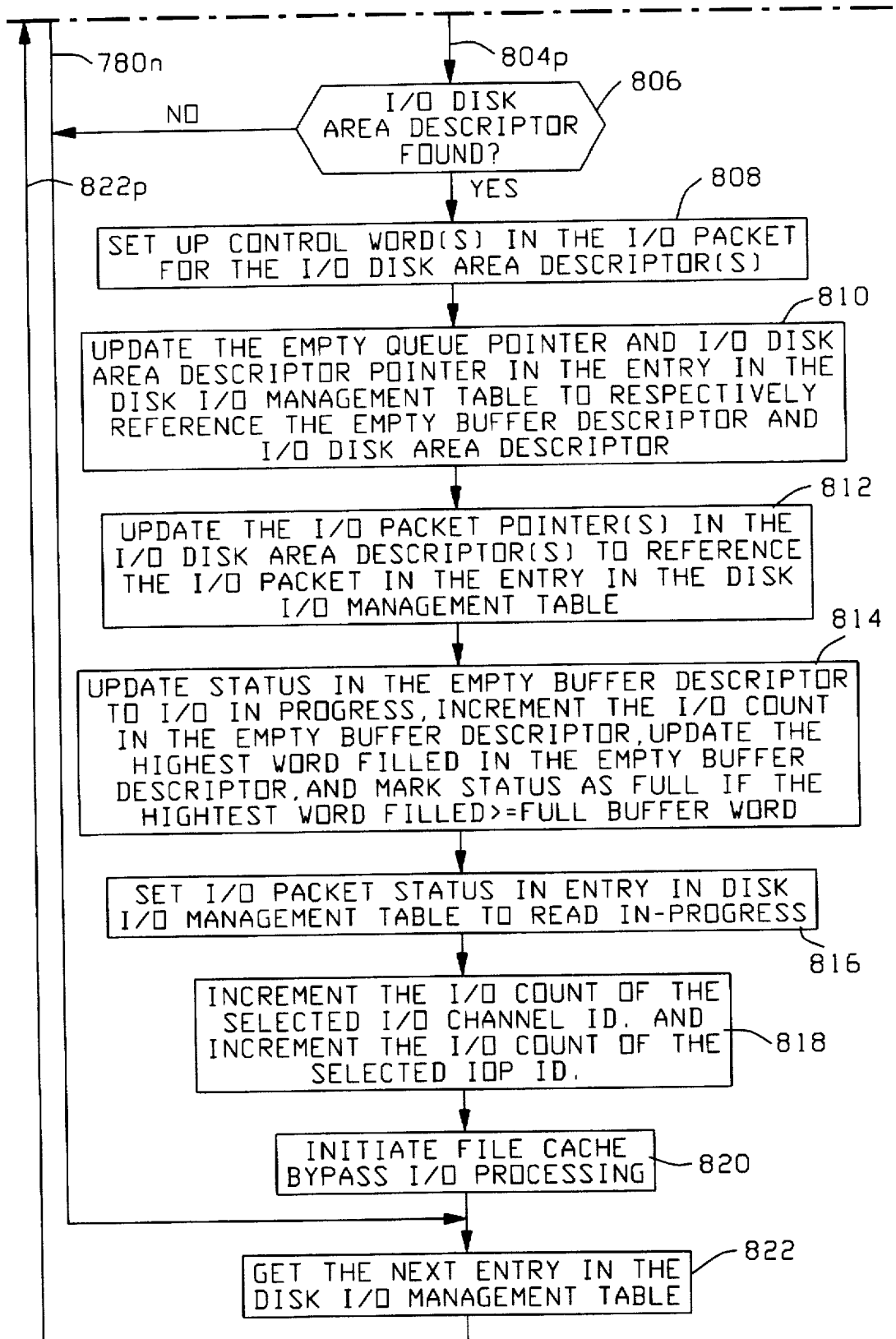
Figure 26D:
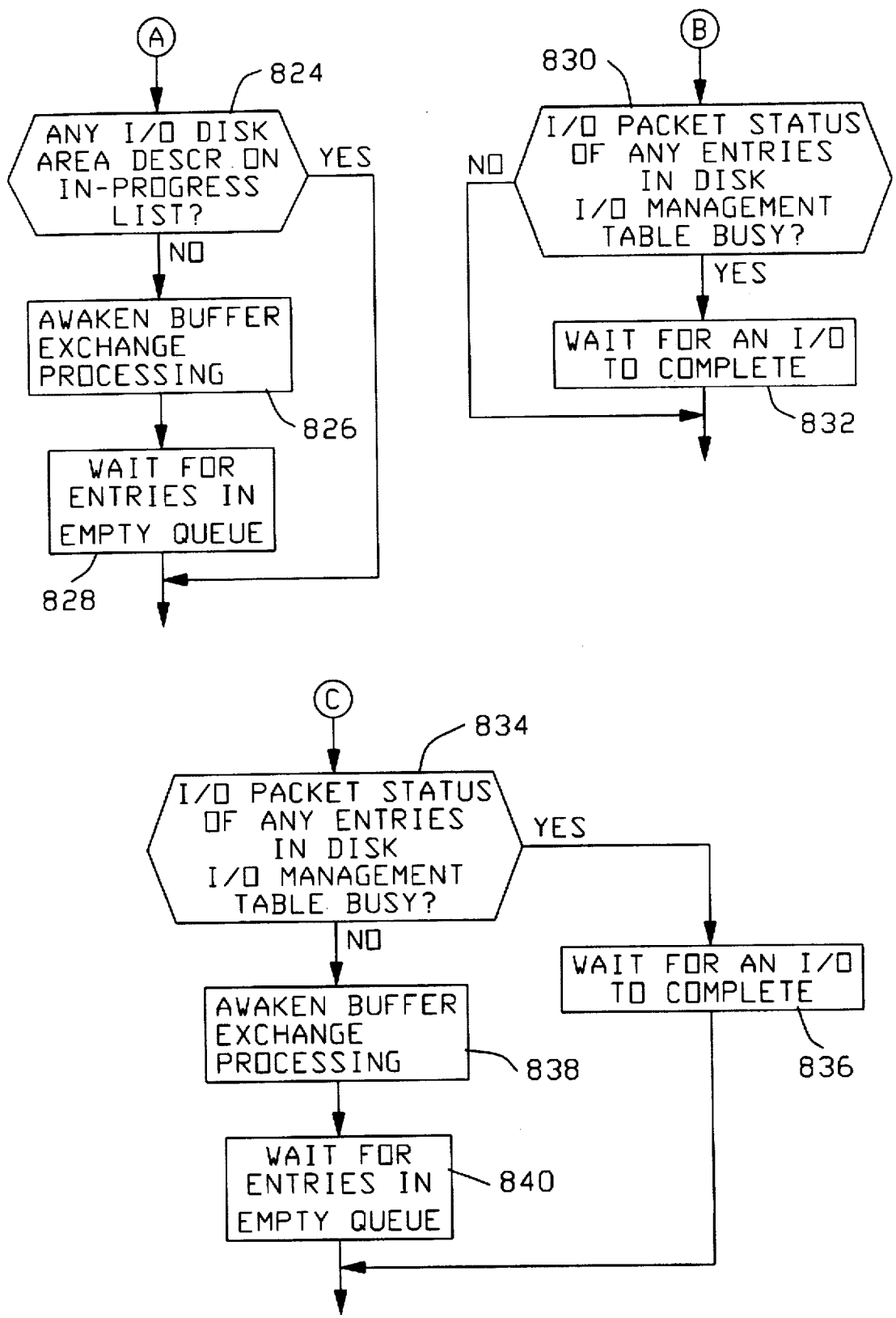

FIG. 26 shows the relationship of the flowchart of FIGS. 26A–D. FIGS. 26A–D contain a flowchart of the Issue New I/O Request Processing. Issue New I/O Request Processing issues new I/O requests from entries in the Unissued list 684 of I/O Disk Area Descriptors 690.

The initial processing done is to check for any I/O Disk Area Descriptors 690 on the Unissued list 684 and whether any I/O Packets in the Disk I/O Management Table 674 have a Status of Available as shown by decision Steps 772 and 774. If there are entries remaining on the Unissued list and there is an available I/O Packet in the Disk I/O Management Table, control is directed to Step 776 to determine whether an I/O Packet is available for an entry on the Unissued list.

Step 776 obtains the first entry in the Disk I/O Management Table 674 and decision Step 778 tests whether the end of the Table has been reached. If the end of the Table has been reached, control is returned. Decision Step 780 tests whether the I/O Packet Status of the present entry in the Disk I/O Management Table is Available. If so, control is directed to Step 782. Otherwise, control is directed to Step 822.

Steps 782 through 792 determine whether an I/O request should be issued for the Disk identified by the Disk Identifier in the Disk I/O Management Table 674 based on the Channels 16, 18, and 20 of the in-progress I/O requests for the query. The objective is to not overload the IOPs 158 and 160, Channel Adapters 164, 174, and 176, and Disks with I/O requests for a single query.

Step 782 obtains the Channel Identifiers and IOP Identifiers that are associated with the Disk Identifier from the Disk-Channel-IOP Management Table 676. Step 784 then finds the Channel Identifier(s) in the Channel Management Table to determine the present load that the query is placing on the Channel Adapter(s). If there is a Channel Identifier that has an I/O Count that is less than the Maximum I/O Count, decision Step 786 directs control to Step 788. Otherwise, control is directed to Step 822.

Step 788 finds the IOP Identifier(s) in the IOP Management Table 680 to determine the present load that the query is placing on the IOPs. Decision Step 790 evaluates the load on the IOPs by examining the IOP Management Table. If the I/O Count for any of the IOP Identifiers is less than the Maximum I/O Count, control is directed to decision Step 792. Otherwise, control is directed to Step 822.

Decision Step 792 checks whether there is an IOP Identifier/Channel Identifier pair which both have their respective I/O Counts less than their Maximum I/O Counts. If so, control is directed to Step 794. Otherwise, control is directed to Step 780. Step 794 selects the IOP Identifier/Channel Identifier pair with the lowest I/O Count from the Channel Management Table 678, if there is more than one pair available. Step 796 locks the Empty Queue 664, and Step 798 initiates Find Best Empty Buffer Descriptor Processing.

The Find Best Empty Buffer Descriptor Processing returns an Empty Buffer Descriptor 668 that references the Empty Buffer 52 with the most available space. If an Empty Buffer Descriptor was found, decision Step 800 directs control to Step 802 where the Empty Queue is unlocked and the Buffer Exchange Processing is awakened if it is waiting to lock the Empty Queue. Step 804 initiates Find Best I/O Disk Area Descriptor Processing to obtain an area to read from the Disk 58, 60, or 62. If an I/O Disk Area Descriptor is returned, decision Step 806 directs control to Step 808. Otherwise, control is directed to Step 780.

Step 808 sets up one or more control words in the I/O Packet in the Disk I/O Management Table 674 based on the one or more I/O Disk Area Descriptors returned from the Find Best I/O Disk Area Descriptor Processing. The control words in the I/O Packet indicate the area(s) on the Disk to be read and whether any data should be skipped. If only a small space separates areas specified by I/O Disk Area Descriptors, the I/O Disk Area Descriptors are combined into one I/O request contained in the I/O Packet because it is more efficient to issue a single I/O request rather than multiple I/O requests in this case.

Step 810 updates the Empty Queue Pointer and I/O Disk Area Descriptor Pointer in the entry in the Disk I/O Management Table 674. The Empty Queue Pointer is set to reference the Empty Buffer Descriptor from Step 798 and the I/O Disk Area Descriptor Pointer is set to reference the I/O Disk Area Descriptor from Step 804. Step 812 updates the I/O Packet Pointer(s) in the I/O Disk Area Descriptor(s) to reference the I/O Packet in the entry in the Disk I/O Management Table.

Step 814 updates various fields in the Empty Buffer Descriptor from Step 798. The Status is set to I/O In-progress, the I/O Count is incremented, and the Highest Word Filled is adjusted to account for the data that will be read as a result of the I/O request. If the adjusted Highest Word Filled is greater than or equal to the Full Buffer Word, then the Status is set to Full. The I/O Packet Status in the entry in the Disk I/O Management Table 674 is set to Read In-progress at Step 816.

Step 818 adjusts the I/O Counts for the IOP Identifier and Channel Identifier in the Channel Management Table 678 and IOP Management Table 680. In addition, the Channel Identifier and IOP Identifier are stored in the appropriate entry in the Disk I/O Management Table. The I/O request is issued by initiating File Cache Bypass Processing at Step 820. File Cache Bypass Processing issues the I/O request to the designated Disk 58, 60, or 62 and merges the data with corresponding data that is present in the Nonvolatile File Cache 102 and has been updated. The I/O request is issued asynchronously to the processing of the Reader Activity 284. Thus, control is returned to Issue New I/O Request Processing before the File Cache Bypass Processing is completed. Step 822 obtains the next entry in the Disk I/O Management Table 674 and control is returned to Step 778.

Returning to Step 772, if it is found that there are no entries on the Unissued list 684, control is directed to decision Step 824 of FIG. 26D. Note that the circle labeled A designates the initiation of the processing Steps referenced by another labeled circle A in FIG. 26D. When the processing steps that are referenced by a labeled circle are complete, control is presumed to be returned to the control line emanating from the labeled circle. If there are I/O requests in progress, that is, there are entries on the In-progress List 686, control is returned to the Reader Activity Processing. Otherwise, Step 826 awakens the Buffer Exchange Processing to process any Full Buffers 50. Step 828 suspends the Reader Activity Processing to wait for entries in the Empty Queue 664. This processing is resumed upon being activated by the Buffer Exchange Processing.

If Step 774 finds that there are not any available I/O Packets in the Disk I/O Management Table 674, control is directed to Step 830 in FIG. 26D. Decision Step 830 tests whether the I/O Packet Status of any of the I/O Packets is Busy. If so, Step 832 suspends processing until one of the I/O requests completes. Control is then returned to the Read Activity Processing. If none of the I/O Packets has a Busy Status, then Step 832 is skipped.

Moving to Step 800, if no Empty Buffer Descriptor 668 was found, control is directed to Step 834 of FIG. 26D. Decision Step 834 tests whether any of the I/O Packets in the Disk I/O Management Table 674 are busy. If so, Step 836 suspends processing until one of the I/O requests completes. Otherwise, control is directed to Step 838 where the Buffer Exchange Processing is resumed if it is waiting for Full Buffers 50. Step 840 then suspends processing to wait for entries in the Empty Queue 664. This processing is resumed upon being activated by the Buffer Exchange Processing.

Figure 27:
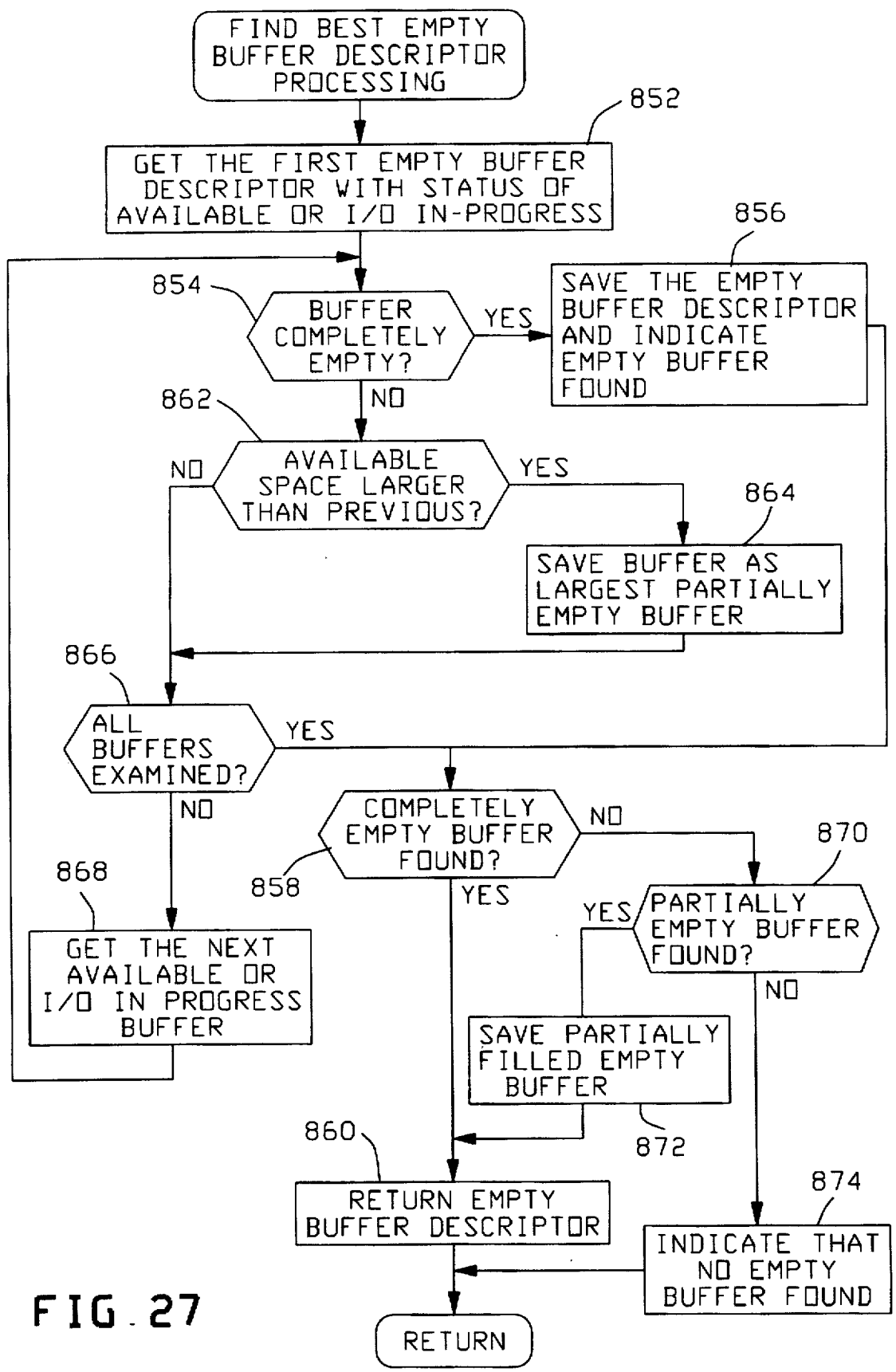
FIG. 27 is a flowchart of the Find Best Empty Buffer Descriptor Processing.

FIG. 27 is a flowchart of the Find Best Empty Buffer Descriptor Processing which obtains the Empty Buffer 52 that has the most space available and has a Status of Available or I/O in progress. Step 852 obtains the first Empty Buffer Descriptor that has a status of Available or I/O in-progress. Decision Step then tests whether the Buffer is completely empty. If so, control is directed to Step 856 where the Empty Buffer Descriptor is saved and it is indicated that an Empty Buffer was located. Control is then directed to decision Step 858 to determine whether a completely empty Buffer was found. Because control was directed to Step 858 from Step 858, the test will pass and control is directed to Step 860 where the Empty Buffer Descriptor is returned. In the case of the completely empty Buffer, the associated Empty Buffer Descriptor is returned.

If decision Step 854 finds that the present Buffer is not a completely empty Buffer, control is directed to Step 862. Decision Step 862 tests whether the Empty Buffer under consideration has more space available than a previously saved Empty Buffer. If so, control is directed to Step 864 where the Empty Buffer under consideration is saved as the largest partially empty Buffer. Otherwise, control is directed to decision Step 866 to determine whether all the Buffers have been examined. If there are more Empty Buffer Descriptors to process, control is directed to Step 868 where the next Empty Buffer Descriptor having a Status of I/O in-progress or Available is obtained. Control is then returned to decision Step 854.

Once Step 866 finds that all the Buffers have been processed, or a completely empty Buffer is found at Step 854, control is directed to Step 858. If Step 858 finds that a completely empty Buffer was not found, control is directed to decision Step to determine whether a partially empty Empty Buffer was found. If a partially empty Empty Buffer was found, Step 872 saves the partially empty Buffer as the Empty Buffer Descriptor to return. Otherwise, Step 874 indicates that an Empty Buffer could not be found.

Figure 28A:
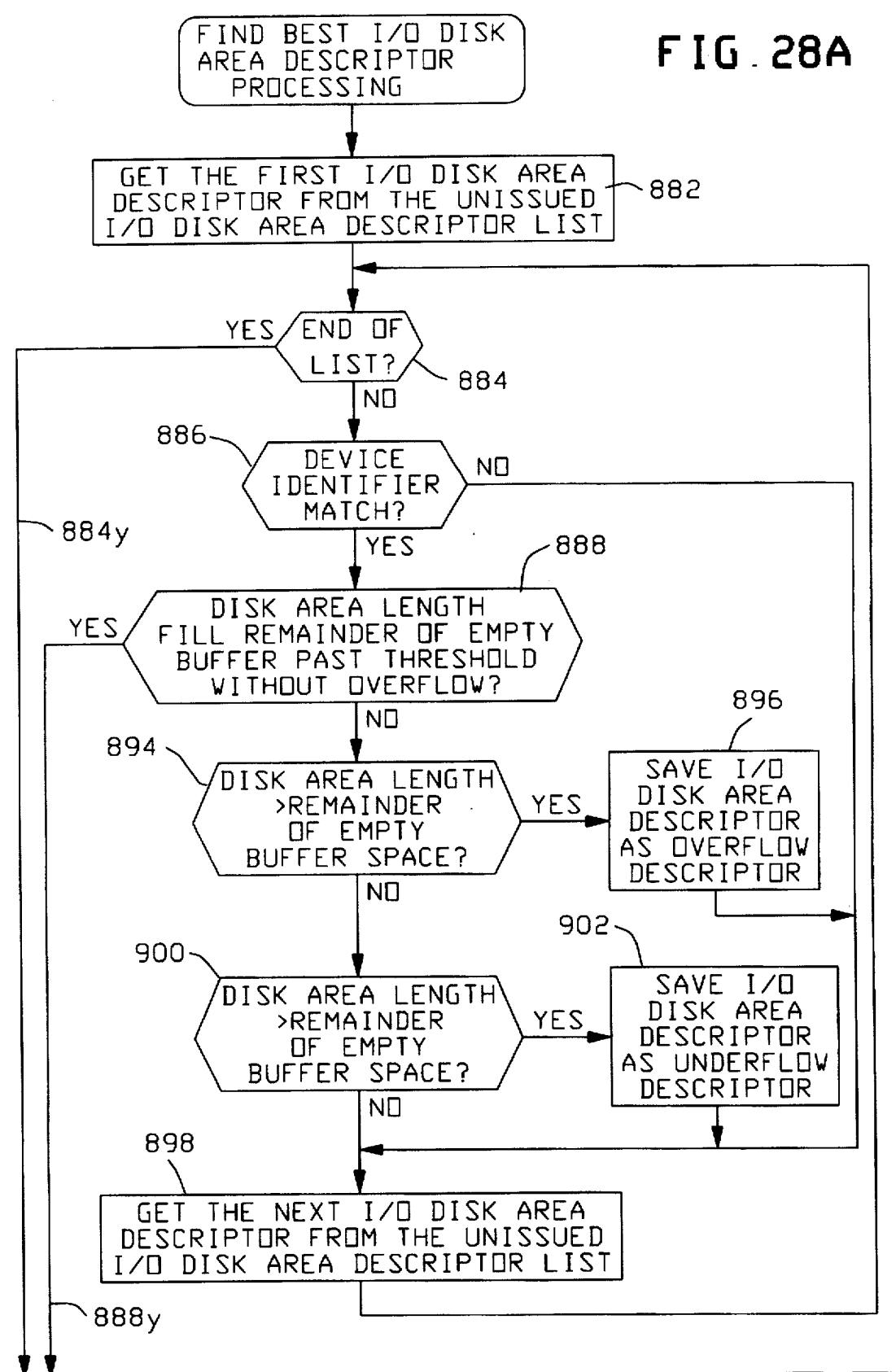
FIG. 28 shows the relationship of the flowchart of FIGS. 28A–C which contain a flowchart of the Find Best I/O Disk Area Descriptor Processing.
Figure 28B:
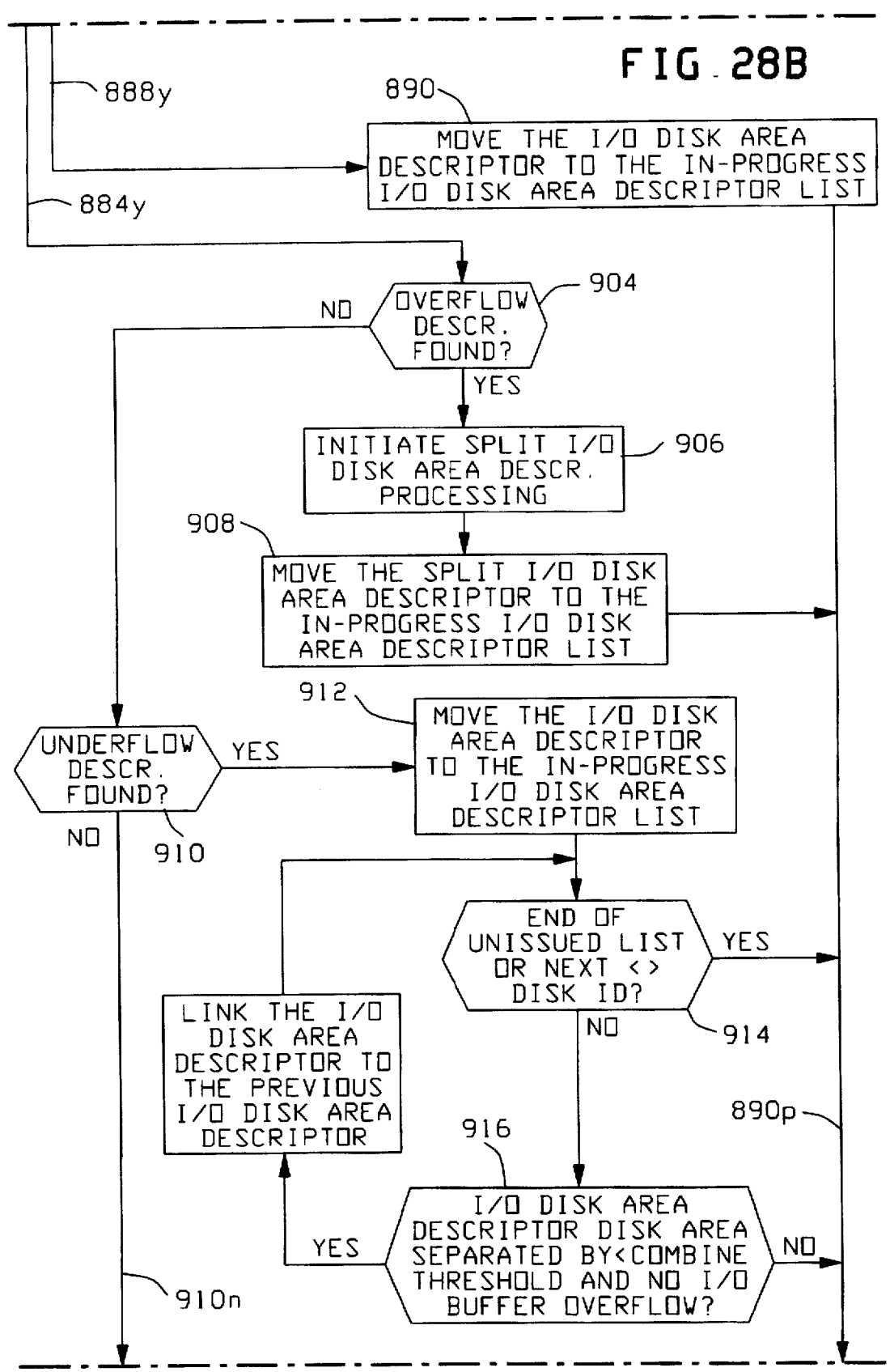
Figure 28C:
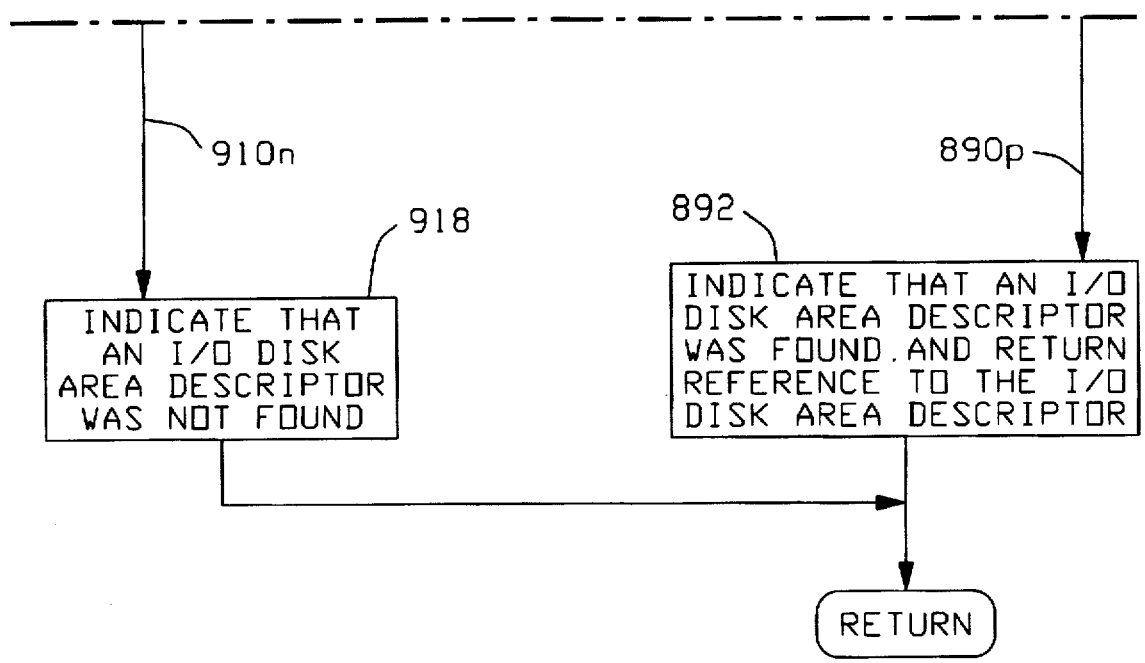

FIG. 28 shows the relationship of the flowchart of FIGS. 28A–C. FIGS. 28A–C contain a flowchart of the Find Best I/O Disk Area Descriptor Processing. This processing obtains one or more I/O Disk Area Descriptors from the Unissued list 684 and returns them to the Issue New I/O Request Processing.

Step 882 obtains the first I/O Disk Area Descriptor from the Unissued list 684. If the end of the list has not been reached, decision Step 884 directs control to decision Step 886. If the Disk Identifier in the I/O Disk Area Descriptor matches the Disk Identifier from the Disk I/O Management Table 674 entry, decision Step 886 directs control to decision Step 888. Decision Step 888 tests whether the amount of data requested in the I/O Disk Area Descriptor would fill the Empty Buffer 52 past the Full Buffer Word specified in the Buffer Descriptor 668 and not exceed the space available in the Buffer. Under ideal conditions, the amount of data would fill the Buffer and control is directed to Step 890. Step 890 moves the I/O Disk Area Descriptor from the Unissued list to the In-progress list 686. Processing then proceeds to Step 892 where it is indicated that an I/O Disk Area Descriptor was found and reference to the Descriptor is returned.

If either the data referenced by the I/O Disk Area Descriptor would not fill the Empty Buffer 52, decision Step 888 directs control to Step 894. Step 894 tests whether the amount of data referenced is too large. If so, control is directed to Step 896 where the Descriptor is saved as an Overflow Descriptor. Control is then directed to Step 898 to obtain the next I/O Disk Area Descriptor from the Unissued list 684.

Decision Step 894 directs control to decision Step 900 if the amount of data referenced is not too large for the Empty Buffer 52. If the amount of data referenced is less than the available space in the Empty Buffer, then control is directed to Step 902 where the Descriptor is saved as an Underflow Descriptor. Control is then directed to Step 898 to obtain the next I/O Disk Area Descriptor.

If decision Step 886 finds that the Disk Identifier does not match, control is directed to Step 898 to obtain the next I/O Disk Area Descriptor 690. Once the end of the Unissued list 684 has been reached, decision Step 884 directs control to decision Step 904.

If an Overflow Descriptor is available from Step 896, decision Step 904 directs control to Step 906. Step 906 initiates Split I/O Disk Area Descriptor Processing to divide Overflow Descriptor into two I/O Disk Area Descriptors 690. The I/O Disk Area Descriptor returned from the Split processing is moved to the In-progress list 686 at Step 908 and control is directed to Step 892 as described above.

Decision Step 904 directs control to Step 910 if an Overflow Descriptor was not found. If an Underflow Descriptor was saved at Step 902, control is directed to Step 912. Steps 912–916 move one or more Disk Area Descriptors 690 to the In-progress list 686 until a Descriptor is encountered that references data that is separated from the data referenced in the prior Descriptor by an amount that would not permit combining the Descriptors into one I/O request or the combination would not fit in the Empty Buffer 52. Step 912 links the I/O Disk Area Descriptor to the last linked or Underflow Descriptor. In-progress-list. If the end of the Unissued list 684 has been reached or the Disk Identifier in the next Descriptor is not equal to the Disk Identifier of the entry in the Disk I/O Management Table 674, control is directed to Step 892 as described above. Otherwise, the next Descriptor is examined at Step 916 to determine whether the referenced data is separated from the previously referenced data by less than a Combine Threshold and the data referenced by the combined Descriptors would fit in the Empty Buffer 52. The Combine Threshold is system dependent and is set to a value for which it would be more efficient to issue one input-output request that references two non-contiguous areas and discard the unneeded data than to issue two input-output requests. If the test at Step 916 passes, control is returned to Step 917 where the I/O Disk Area Descriptor is linked to the previously saved I/O Disk Area Descriptor (using the Combine Pointer in the I/O Disk Area Descriptor). Control is directed from Step 917 to Step 914. If the test at Step 916 fails, control is directed to Step 892.

If neither an Overflow nor an Underflow Descriptor was found, Step 918 indicates that an I/O Disk Area Descriptor was not found and control is returned to Issue New I/O Request Processing.

Figure 29:
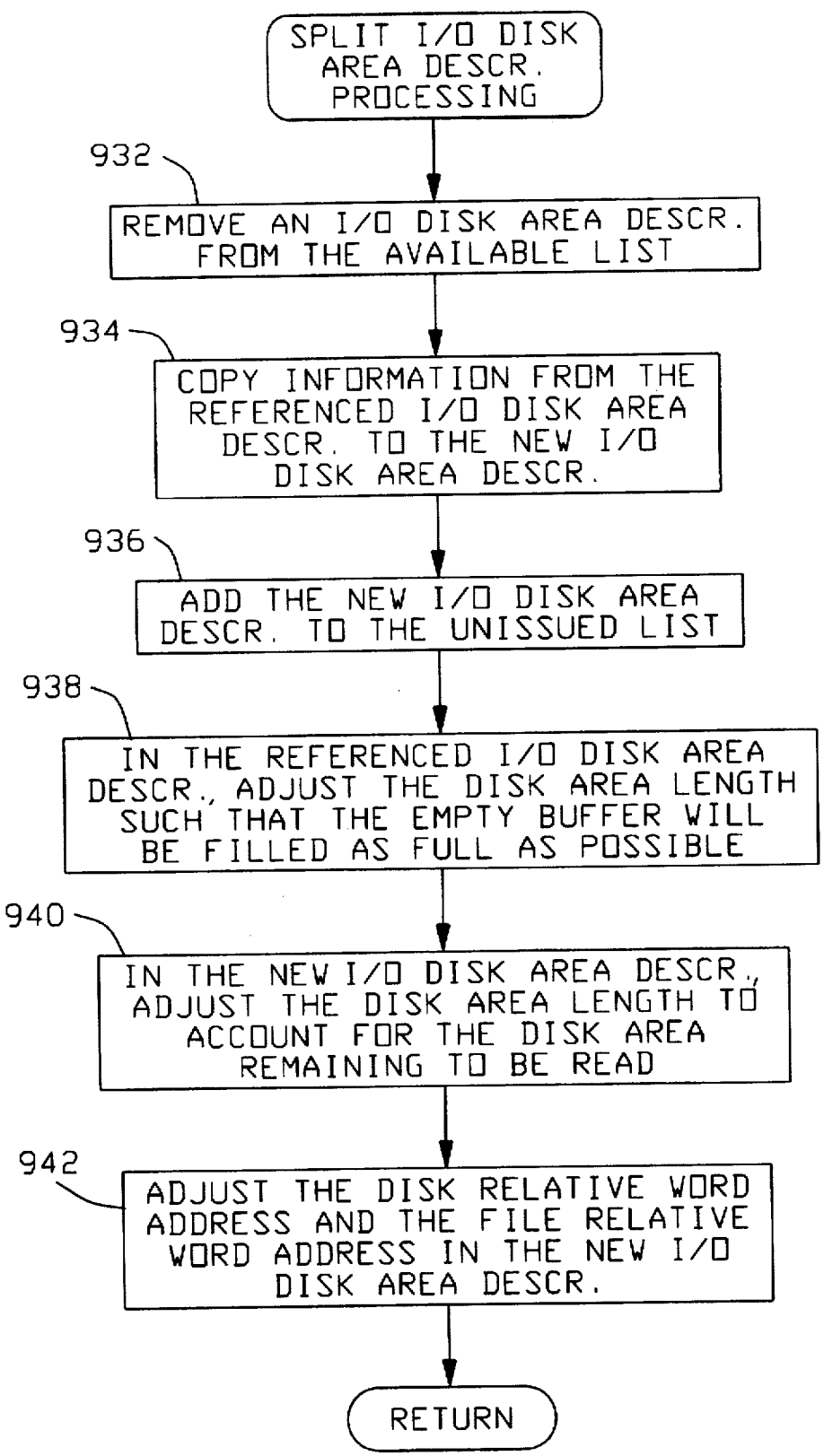
FIG. 29 is a flowchart of the processing for Split I/O Disk Area Descriptor Processing.

FIG. 29 is a flowchart of the processing for Split I/O Disk Area Descriptor Processing. Split I/O Disk Area Descriptor Processing divides an I/O Disk Area Descriptor 690 into two I/O Disk Area Descriptors. It is initiated when a Descriptor on the Unissued List 684 is encountered and the Descriptor references a quantity of data that will not fit into an Empty Buffer.

Step 932 removes an I/O Disk Area Descriptor 690 from the Available list 686. At Step 934, the information contained in the referenced Descriptor that is passed to the Split Processing is copied to the new Descriptor from Step 932. Step 936 adds the new Descriptor to the Unissued list. In the referenced I/O Disk Area Descriptor, at Step 938, the Disk Area Length is adjusted such that the Empty Buffer 52 will be filled as full as possible upon completion of the I/O request that will be issued. At Step 940, the Disk Area Length in the new Descriptor is set to account for the quantity removed from the referenced Descriptor. Step 942 adjusts the Disk Relative Word Address and the File Relative Word Address in the new Descriptor accordingly.

Figure 30A:
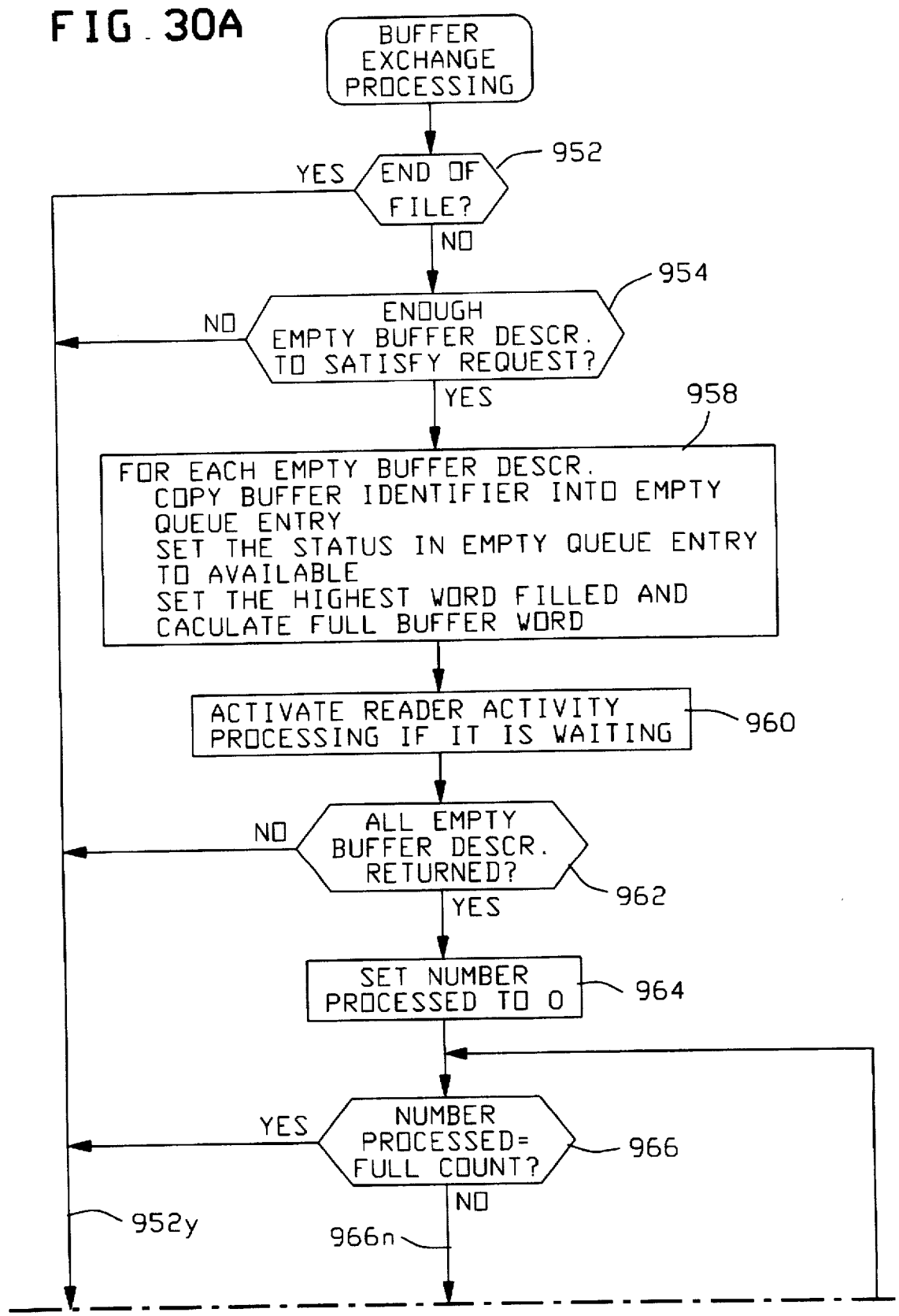
FIG. 30 shows the relationship of the flowchart of FIGS. 30A–B which contain a flowchart of the Buffer Exchange Processing.
Figure 30B:
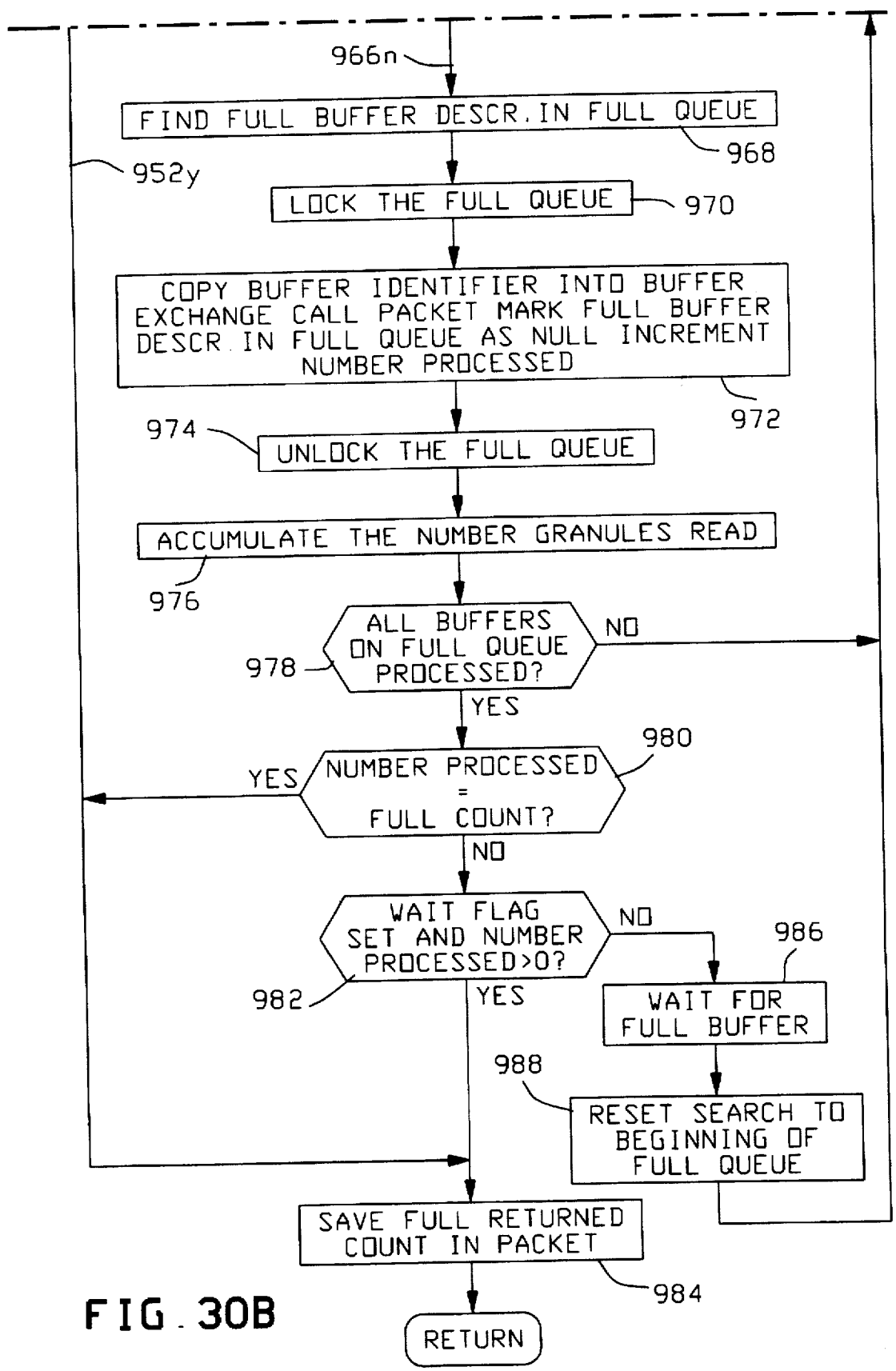

FIG. 30 shows the relationship of the flowchart of FIGS. 30A–B. FIGS. 30A–B contain a flowchart of the Buffer Exchange Processing. Buffer Exchange Processing is initiated by the DBMS 220 to exchange Buffers that it has completed searching (Empty Buffers 52) for Full Buffers 50 that the Reader Activity has filled.

If the end of the file has not been reached, decision Step 952 directs control to decision Step 954. Decision Step 954 tests whether enough Empty Buffer Descriptors 668 have been provided in the Buffer Exchange Call Packet.

Figure 31:
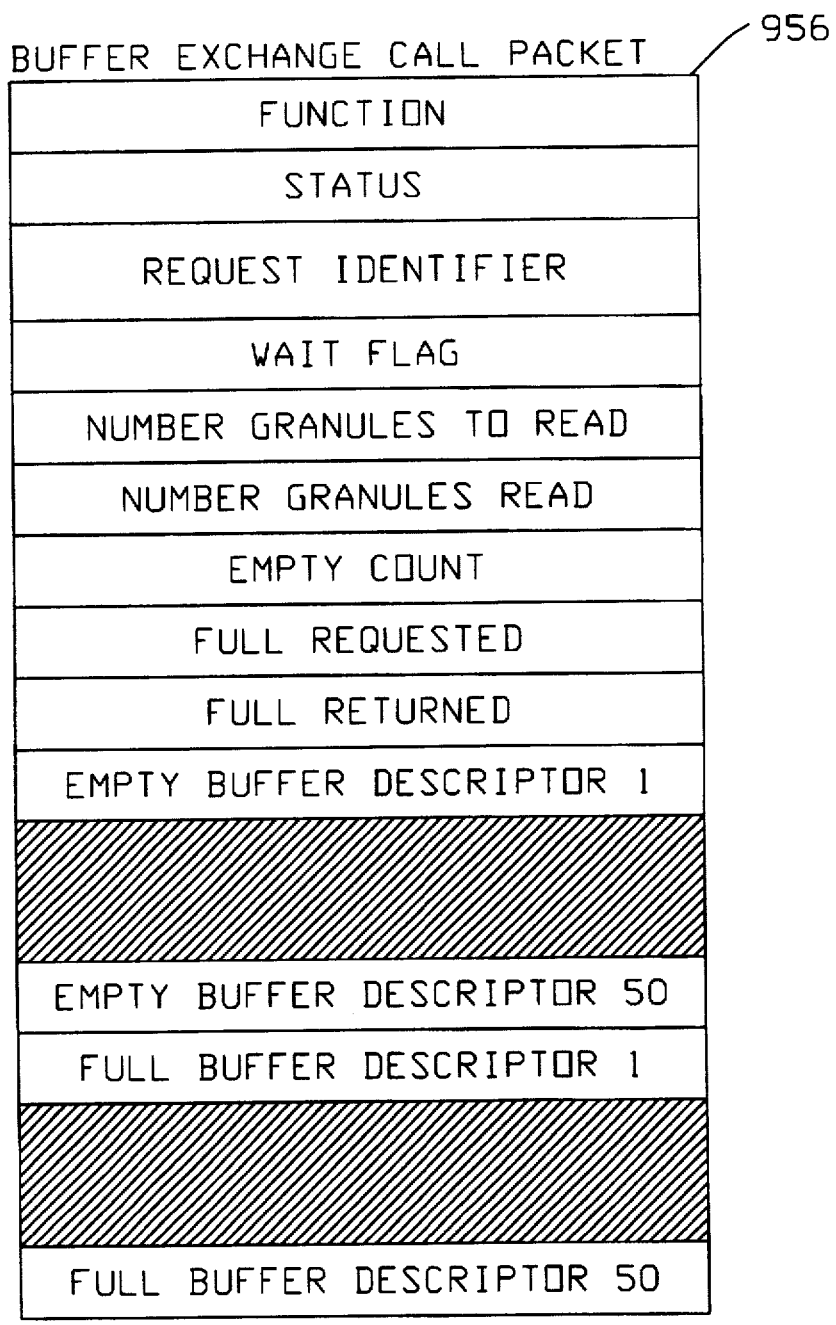
FIG. 31 shows the content of the Buffer Exchange Call Packet.

FIG. 31 shows the content of the Buffer Exchange Call Packet 956. The fields are defined as follows:

Function—a code that specifies the Buffer Exchange function.

Status—a code returned to indicate the status of the call.

Request Identifier—a code that is provided to identify the physical read Request.

Wait Flag—is set if the DBMS 220 should be suspended only if there are not any Full Buffers 50 to return.

Number of Granules to Read—is set by Setup Processing to indicate the total number of granules that are to be read for the physical read Request.

Number of Granules Read—is set during Buffer Exchange Processing to indicate the total number of granules that have been returned in Full Buffers for the Request.

Empty Count—is the number of Empty Buffer Descriptors 668 that are contained in the Buffer Exchange Call Packet.

Full Requested—is the number of Full Buffer Descriptors that are requested to be returned by the DBMS.

Full Returned—is the number of Full Buffer Descriptors returned to the caller for processing.

Empty Buffer Descriptors 1–50—are the Buffer Descriptors that are being returned.

Full Buffer Descriptors 1–50—are updated by Buffer Exchange Processing to reference Full Buffers 50 that are available for searching.

Returning to FIG. 30A, if the Empty Count plus the number of entries in the Full Queue and Empty Queue is greater than or equal to the Full Count, decision Step 954 directs control to Step 958. For each of the Empty Buffer Descriptors 668 in the Call Packet 956, Step 958 copies the Buffer Identifier to an entry in the Empty Queue 664, sets the Status to Available, and resets the Highest Word Filled and calculates the Full Buffer Word. The Full Buffer Word is set to 80% of the size of the Buffer. Step 960 activates the Reader Activity Processing if it is waiting for Empty Buffers 52.

Decision Step 962 tests whether all the Empty Buffers specified in Buffer Exchange Call Packet 956 were placed on the Empty Queue 664. If not, the Full Returned count is appropriately set and control is returned. If all the Empty Buffers cannot be returned, this processing is exited for two reasons. First, the queuing logic between the Buffer Exchange Processing and Reader Activity Processing requires that the Buffer Exchange Processing will never queue itself unless all Empty Buffers 52 provided on the call were saved. Second, the test at Step 954 could be invalid because it was made assuming that all the Empty Buffers would be returned.

Control is directed to Step 964 if all the Empty Buffers 52 were placed on the Empty Queue 664. Step 964 begins a processing loop in which Full Buffers 50 are identified and returned. Step 964 initializes the number processed to zero. Decision Step 966 tests whether the number processed is equal to the Full Count from the Buffer Exchange Call Packet 956. If there are more Full Buffers requested than have been processed, control is directed to Step 968. Step 968 locates a Full buffer Descriptor 668 in the Full Queue 666, and Step 970 locks the Full Queue. The Buffer Identifier from the Full Buffer Descriptor is copied into the Buffer Exchange Call Packet, the Full Buffer Descriptor in the Full Queue is marked as Null, and the number processed is incremented at Step 972.

Step 974 unlocks the Full Queue and Step 976 accumulates the Number of Granules Read based on the number of granules in the Full Buffer 50. Decision Step 978 tests whether all the Buffers on the Full Queue 666 have been processed. If not, control is returned to decision Step 966.

If there are more Full Buffers to process, decision Step 978 directs control to decision Step 980. Decision Step 980 tests whether the number of Full Buffers processed is equal to Full Count, that is the number requested. If so, control is returned to the caller. Otherwise, control is directed to decision Step 982 where the Wait Flag and Number Processed are examined. If at least one Full Buffer was found and the Wait Flag is set, control is directed to Step 984 where the Full Returned count in the Buffer Exchange Packet 956 is set appropriately.

If the Wait Flag is not set, decision Step 982 directs control to Step 986 where processing is suspended to wait for a Pull Buffer from the Reader Activity Processing. The Reader Activity Processing activates the Buffer Exchange Processing when a Full Buffer is made available. When awakened, Step 988 resets the Full Buffer search to begin at the beginning of the Full Queue 666.

Figure 32:
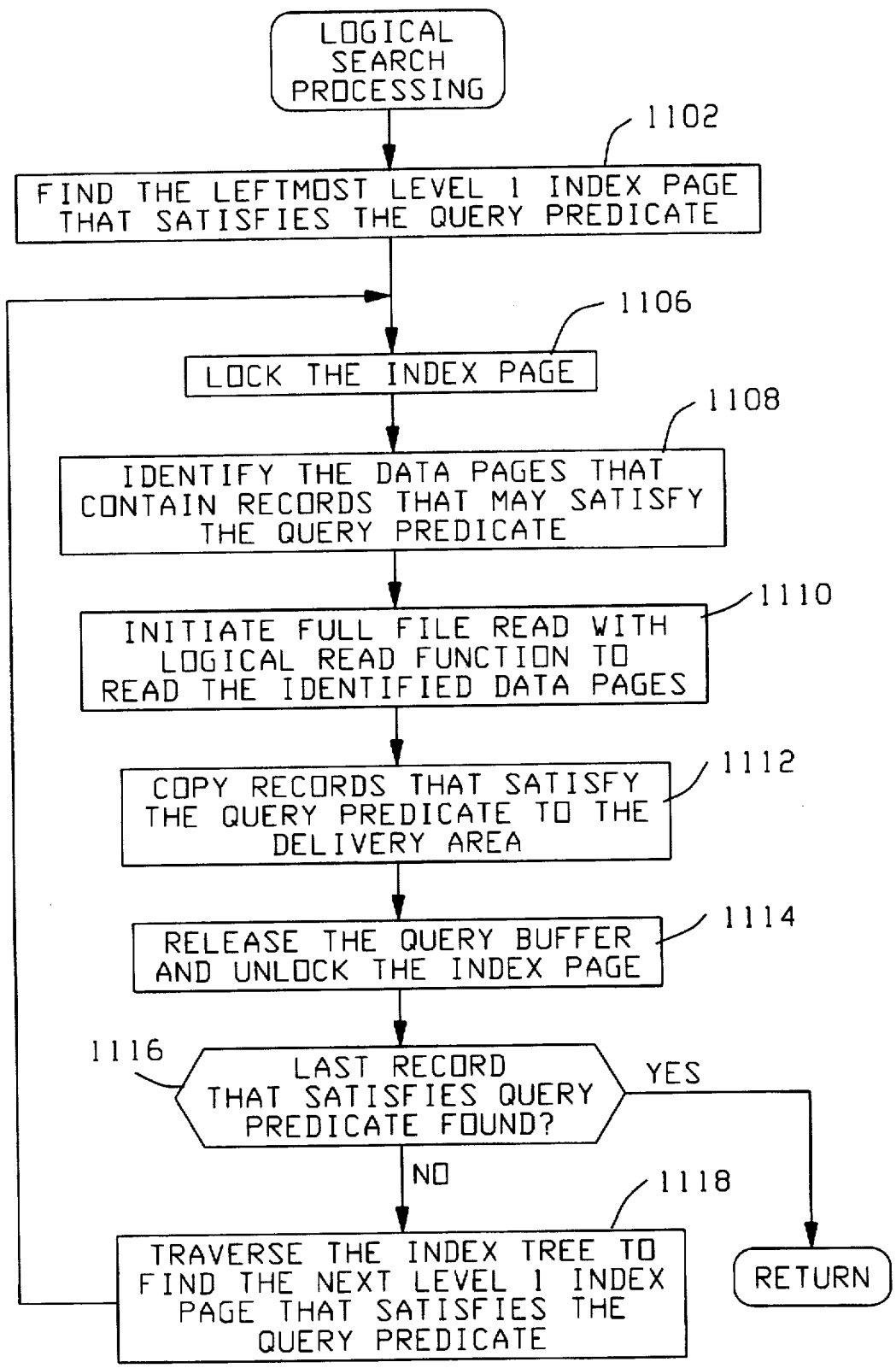
FIG. 32 is a flowchart of the Logical Search Processing that is initiated by the DBMS Processing.

FIG. 32 is a flowchart of the Logical Search Processing that is initiated by the DBMS Processing of FIG. 9. The Logical Search Processing does not use the buffer exchange logic that is used by the Physical Search Processing. However, a Query Buffer 28 is still dedicated to the query search thereby providing improved performance. Parallel reading of the file over the multiple Channels 16, 18, and 20 is available, but the searching of the data read must wait until all the requested data has been read.

Step 1102 locates the leftmost level-one index page in the Database that satisfies the query predicate. Step 1106 then locks the index page so that it is not changed while the search is proceeding. All the data pages that contain records that may satisfy the query predicate are identified at Step 1108. Once the desired pages are identified, Step 1110 initiates Full File Read Processing with a Logical Read function to read the desired data pages. Step 1112 copies records in the Query Buffer that satisfy the search predicate to a predetermined delivery area. The memory allocated to the Query Buffer 28 is released and the index page is unlocked at Step 1114.

Decision Step 1116 tests whether the last record that satisfies the query predicate was found. If so, control is returned to the Query Program 214. Otherwise, control is directed to Step 1118 to obtain the next level-one index page. Processing then continues at Step 1106 as described above.

Figure 33:
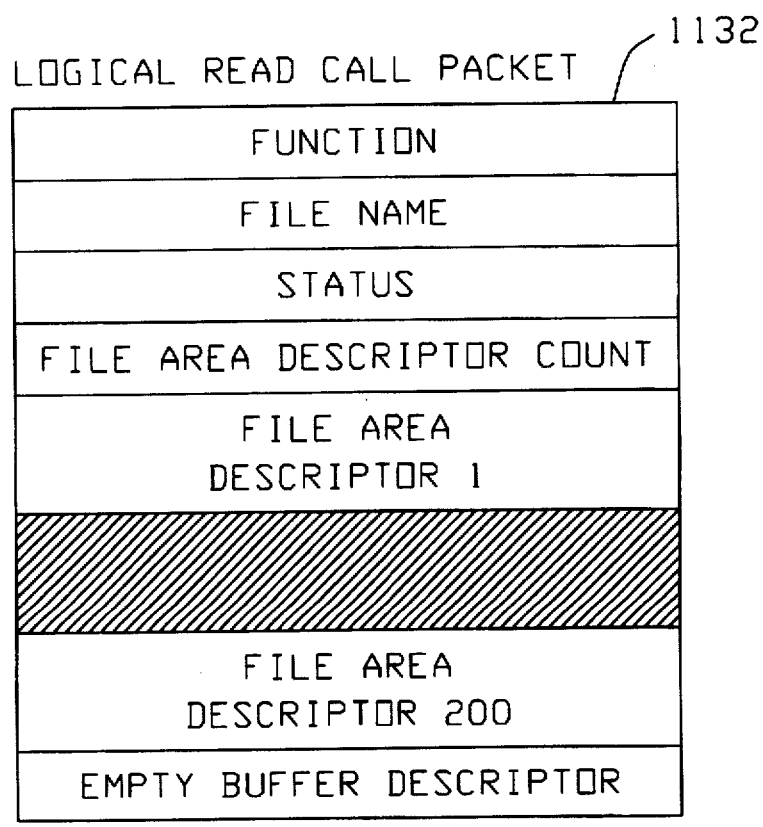
FIG. 33 illustrates the content of a Logical Read Call Packet.

FIG. 33 illustrates the content of a Logical Read Call Packet 1132. The Logical Read Call Packet is issued by the Logical Search Processing to the Full File Read Processing of FIG. 11. The fields in the Logical Read Call Packet are defined as follows:

Function—a code that specifies the Logical Read function.

File Name—identifies the particular file that contains the table to read.

Status—a code returned to indicate the status of the call.

File Area Descriptor Count—is the number of File Area Descriptors in the call packet.

File Area Descriptors 1–200—describe the areas of the file that are to be read. Up to 200 File Area Descriptors may be specified.

Empty Buffer Descriptor—is the Buffer Descriptor that references an Empty Buffer 52 in which the data is returned.

Figure 34:
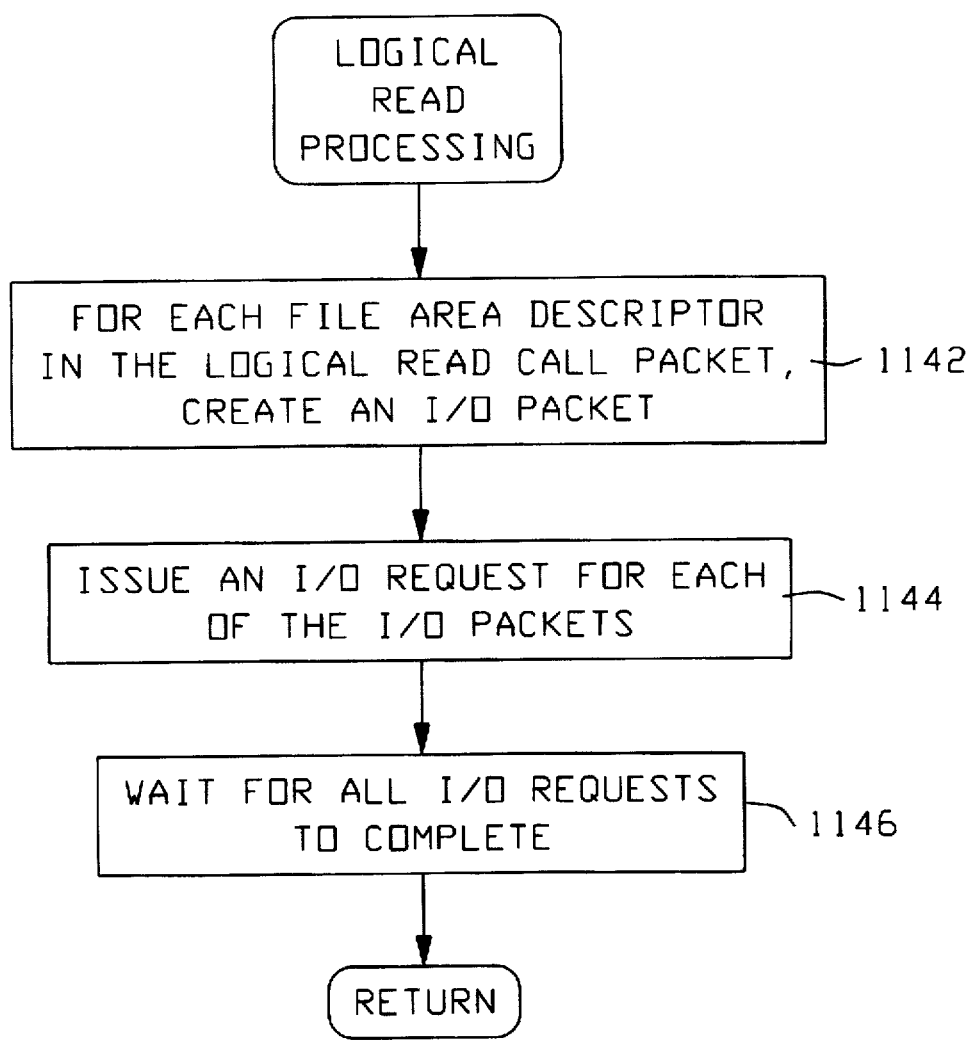
FIG. 34 is a flowchart of the processing for Logical Read Processing that is invoked by the Full File Read Processing.

FIG. 34 is a flowchart of the processing for Logical Read Processing that is invoked by the Full File Read Processing. Logical Read Processing returns the portions of the file in logical relative order in the Query Buffer 28 provided by the DBMS 220.

For each File Area Descriptor 654 provided in the Logical Read Call Packet 1132, Step 1142 creates an I/O Packet in the Disk I/O Management Table 674. In the exemplary embodiment, the File Cache Bypass I/O Request Processing of FIG. 35 is performed if eight or more segments have the same logical and physical relative order.

Step 1144 issues an asynchronous I/O request for each I/O Packet in the Disk I/O Management Table 674. Steps 1142 and 1144 are repeated as necessary to process all the File Area Descriptors specified in the Logical Read Call Packet 1132. Step 1146 waits for all the I/O requests to complete before control is returned to the Full File Read Processing and ultimately the DBMS 220.

Figure 35:
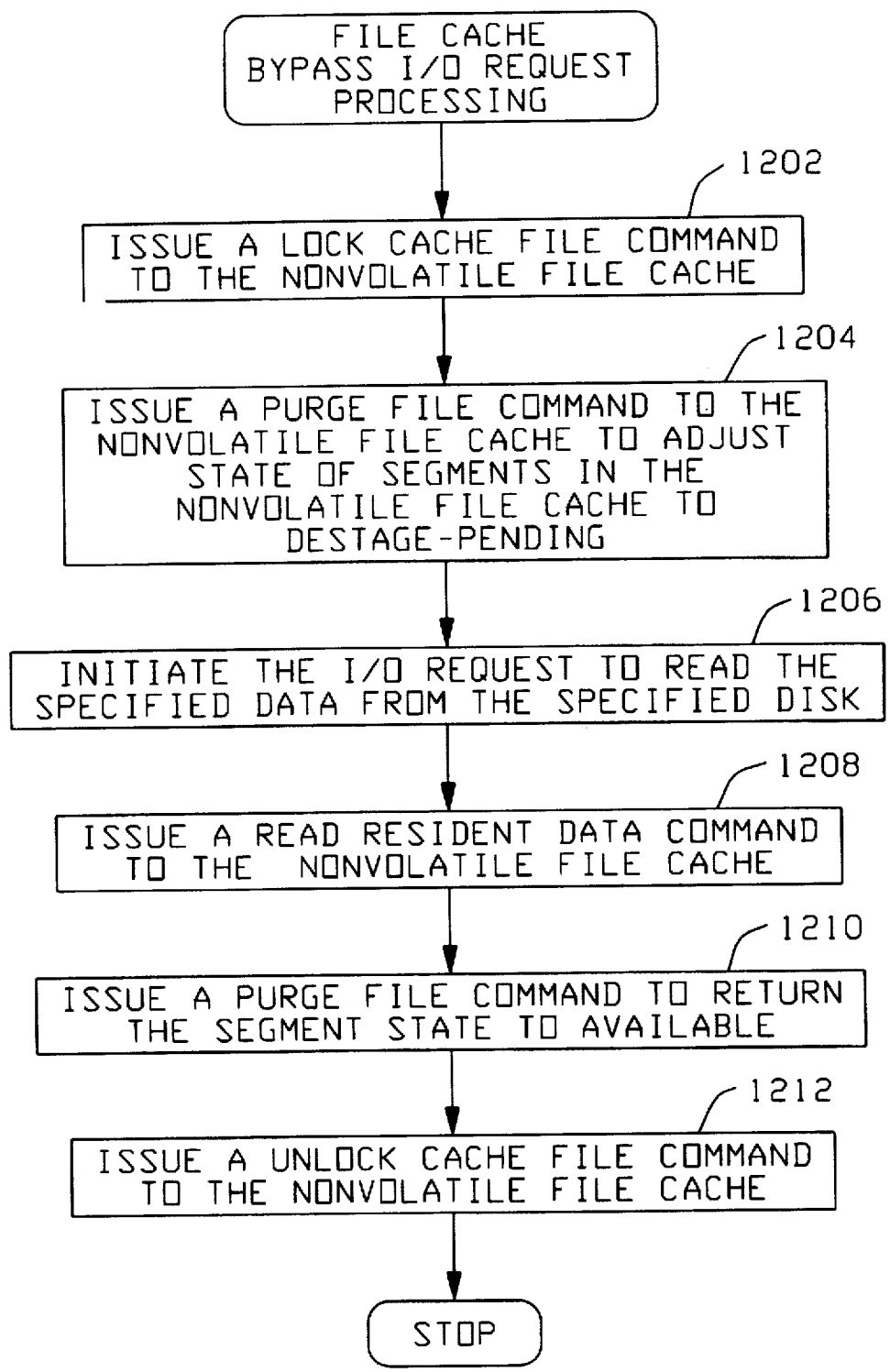
FIG. 35 is a flowchart of the File Cache Bypass I/O Request Processing.

FIG. 35 is a flowchart of the File Cache Bypass I/O Request Processing. The File Cache Bypass I/O Request Processing establishes the necessary locks with the Nonvolatile File Cache 102, issues the I/O requests, reads the necessary data from the Nonvolatile File Cache, and merges the cached file data with the data read from Disks 58, 60, and 62. The File Cache Bypass I/O Request Processing logic is part of the O/S File I/O control 240.

An objective of the Bypass Processing is to return consistent data in response to the query. Data is considered inconsistent when only some of the updates resulting from a transaction have been written to the database file. To accomplish this in a system with a Nonvolatile File Cache, three requirements must be met. First, all data transfers between the Nonvolatile File Cache and the Disks 58, 60, and 62 must be temporarily suspended with respect to portion of the file being bypassed. That is, staging of data from the Disks to the Nonvolatile File Cache and destaging of data from the Nonvolatile File Cache to the Disks must be temporarily suspended.

The second requirement is that after all the data has been read from Disks 58, 60, and 62, the corresponding data that may be in the Nonvolatile File Cache 102 must be read and merged with the data read from Disk. This ensures that the query is processing the most recent data.

The third requirement is that the reading of the data from the Nonvolatile File Cache 102 must be synchronized with updates that are occurring as a result of processing transactions.

Step 1202 issues a Lock Cache File command to the Nonvolatile File Cache 102. This command ensures that no other bypass operations will occur within the specified file area until the present bypass operation is completed and ensures that no new staging activity will be commenced. This use of this command and its functionality is described in the co-pending patent application for an Outboard File Cache System. This effectively prohibits the initiation of Disk 58, 60, or 62 to Cache 102 transfers for the referenced data.

A Purge File command is issued to the Nonvolatile File Cache 102 at Step 1204. The result of this command is that the Nonvolatile File Cache sets a state indicator for the specified portions of the file to destage-pending. This effectively prohibits the initiation of Cache 102 to Disk 58, 60, and 62 transfers for the referenced data. In addition, any in-progress Cache to Disk or Disk to Cache transfers for the referenced data will complete before processing continues at Step 1206.

Steps 1202 and 1204 prevent transfers of data between the Disks 58, 60, and 62 and the Nonvolatile File Cache 102. However, this does not prevent transaction updates to portions of the file that are present in the Cache 102. This is because the destage-pending state does not prevent reads or writes to the Cache. Therefore, transaction processing may continue while the query is in progress. By preventing all transfers between the Cache and the Disks, and forcing all updates to be made to the Cache, the query is guaranteed to receive consistent data.

At Step 1206, the I/O request is issued to read the specified data from Disk 58, 60, or 62. After the data has been read from Disk, a Read Resident File command is issued to the Nonvolatile File Cache at Step 1208. The Read Resident File command causes the portions of the file that have been updated by transactions during the read of data from Disks to be read from the Cache 102 and then properly merged with the data read from the Disks at Step 1210.

After the Read Resident Data command of Step 1208 is complete, Step 1210 issues a Purge File command to the Nonvolatile File Cache 102 to return the state indicator for the specified portions of the file to Available. Step 1212 issues an Unlock Cache File command to the Nonvolatile File Cache 102. This results in allowing transfers between the Cache 102 and Disks 58, 60, and 62 to resume, and allowing other bypass operations to proceed. After the Purge File and Unlock Cache File commands are complete, the File Cache Bypass I/O Request Processing is finished processing the I/O request provided by the Issue New I/O Request Processing.

Figure 36:
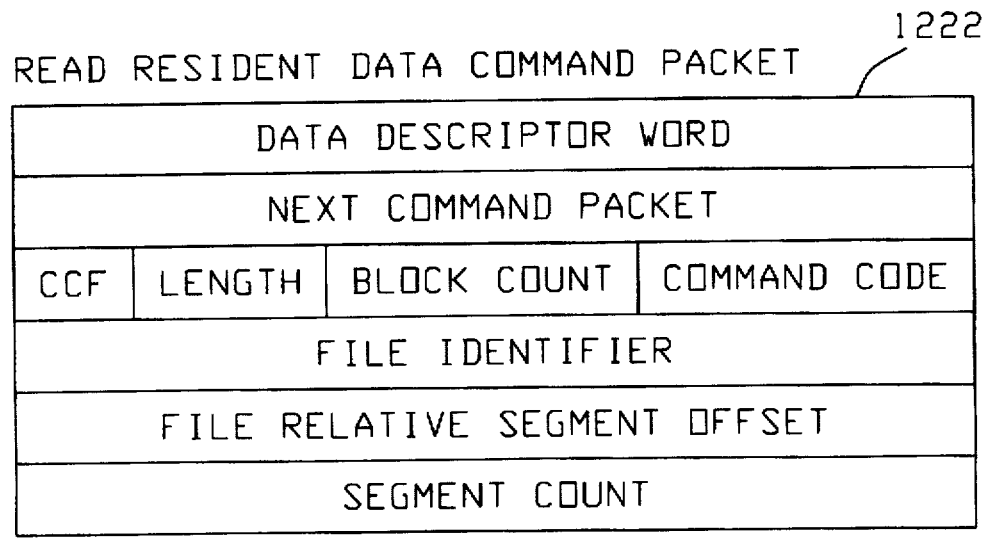
FIG. 36 shows the content of the Read Resident Data Command Packet.

FIG. 36 shows the content of the Read Resident Data Command Packet 1222 that is issued to the Nonvolatile File Cache 102. The fields are defined as follows:

Data Descriptor Word—is used to reference the addresses in Memory 40 to which the data read from Cache 102 is to be written.

Next Command Packet—is a pointer to the next command packet in a chain of command packets.

Command Chain Flag (CCF)—indicates whether this command packet is part of a chain of command packets.

Length—is the number of words in the command packet after the word in which the Length is stored.

Block Count—is the number of blocks to be read.

Command Code—identifies the particular function that the Nonvolatile File Cache is to perform.

File Identifier—identifies the logical file that is addressed by the command.

File Relative Segment Offset—is the first segment, relative to the beginning of the file, that is addressed by the command.

Segment Count—is the number of segments that are referenced by the command.

Figure 37:
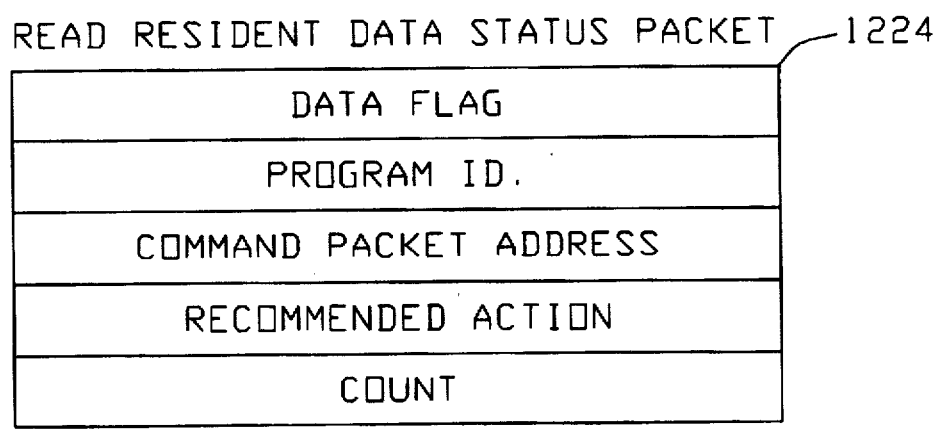
FIG. 37 shows the content of the Read Resident Data Status Packet.

FIG. 37 shows the content of the Read Resident Data Status Packet 1224 that is returned to the Operating System File I/O Control 240 by the Nonvolatile File Cache 102 in response to processing a Read Resident Data command. The fields are defined as follows:

Valid Flag—is used to indicate whether the status packet contains valid information.

Program Identifier—is a value that identifies the command packet or the command packet chain with which the command packet is associated.

Command Packet Address—is the address in the Memory 40 of the command packet with which the status packet is associated.

Recommended Action—is the processing that should be performed upon receipt of the status packet.

Count—is the recommended number of times that the OS File I/O Control 240 should retry when responding to the status.

Figure 38:
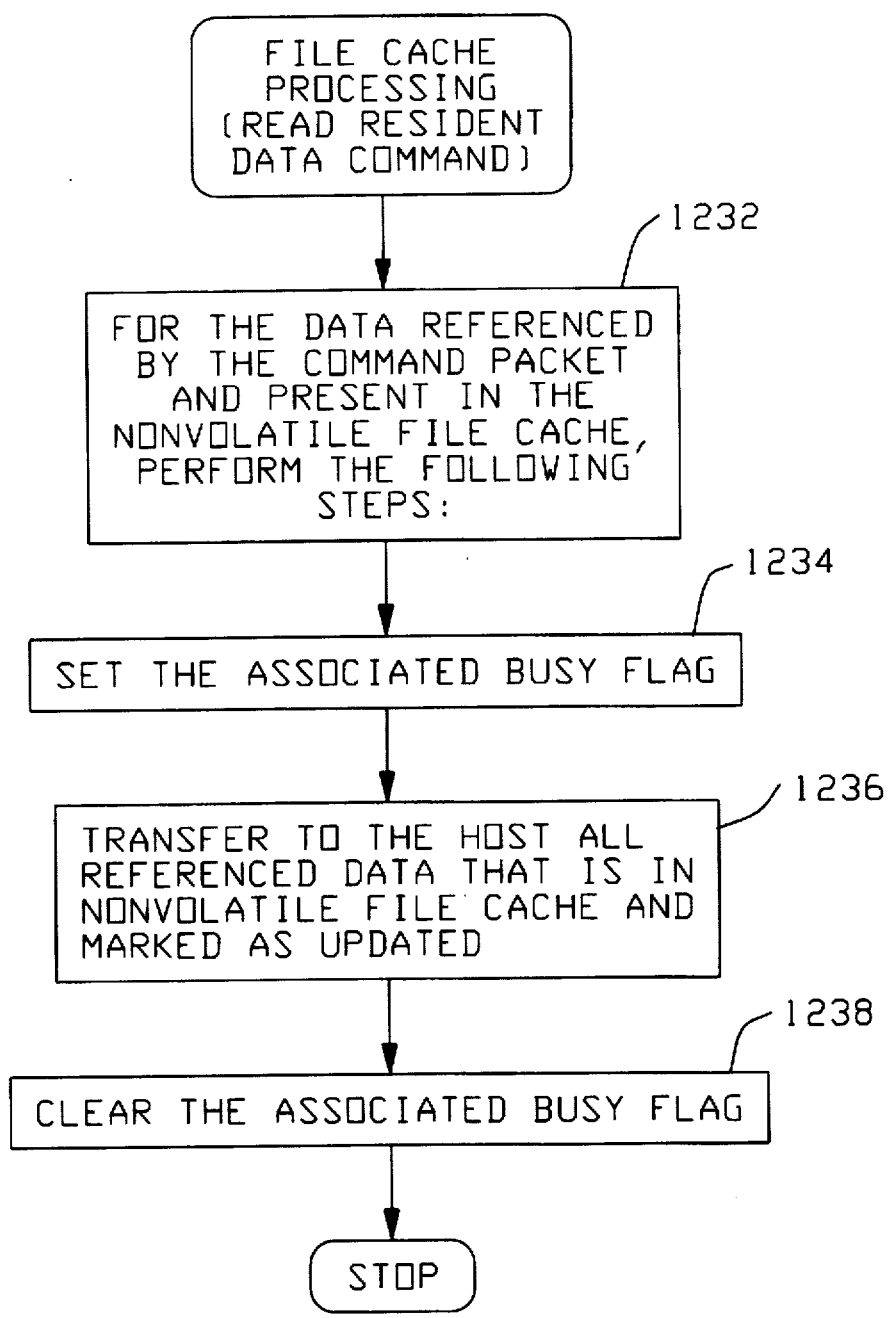
FIG. 38 is a flowchart of the general processing of the Nonvolatile File Cache in processing a Read Resident Data Command Packet.

FIG. 38 is a flowchart of the general processing of the Nonvolatile File Cache 102 in processing a Read Resident Data Command Packet 1222. Processing of a Read Resident Data command results in the specified data being read from the Cache 102 and returned to the Host 38.

If writes are occurring to the Nonvolatile Cache 102 as a result of the concurrent processing of transactions when the Read Resident Data command is issued, one of the following scenarios will occur:

1. For any portion of the requested data, a cache write request may obtain access to the referenced data prior to the Read Resident Data command. In this scenario, a Busy flag that is associated with the referenced data has been set by the cache write request. After the write request is complete, the Busy flag is cleared and the Read Resident Data command is allowed to proceed in reading the data. Thus, the query will receive consistent data.

2. A write request may arrive while the Read Resident Data command is in progress. In this case, the write request is not processed until the Read is complete. Thus, the query will receive data that is one update old.

3. A write request may arrive after the Read Resident Data command is complete. No waiting is required in this scenario, and the query will receive data that is one update old.

4. A write request references data that is not present in the Cache 102. In this scenario, the write request is forced to wait until the Read Resident Data command is complete.

Step 1232 specifies that for the data in the Nonvolatile File Cache 102 that is referenced by the Read Resident Data Command Packet 1222, Steps 1234–1238 are to be performed. Step 1234 sets the Busy flag that is associated with the referenced data. This ensures that no writes will occur while the data is being transferred from the Cache 102 to the Host 38. At Step 1236, all the data that is referenced by the command, present in the Cache 102, and marked as updated is transferred to the Host. After the data transfer is complete, the Busy flags are cleared at Step 1238. Processing of the command is then complete.

Having described an exemplary embodiment of the invention in the drawings and accompanying description, those skilled in the art will recognize that various modifications to the exemplary embodiment could be made without departing from the scope and spirit of the claims set forth below:

We claim:

1. A data processing system, comprising:

storage means for storing a database including data signals comprising one or more selectable database portions;

transaction processing means for processing transactions by referencing first selected portions of said database and for modifying as updated portions ones of said first selected portions of said database;

database cache means coupled to said transaction processing means and to said storage means for caching said first selected portions of said database;

file cache means coupled to said database cache means and to said storage means for storing said first selected portions and for receiving said updated portions;

query processing means coupled to said storage means and to said file cache means for receiving second selected portions of said database from said storage means, for receiving said updated portions from said file cache means, for merging said updated portions with said second selected portions of said database to create updated query data, and for performing said query against said updated query data concurrently with said transaction processing means processing transactions.

2. The data processing system of claim 1, wherein said storage means includes a plurality of direct access data storage devices, and said database is stored on said plurality of direct access storage devices.

3. A system for performing concurrent processing of database queries and transactions against a single copy of a database, comprising:

a host data processing system;

a memory system coupled to said host data processing system;

a database management system operable on said host data processing system;

a plurality of direct access storage devices coupled to said host data processing system via a plurality of input-output channels, wherein the database is stored on said plurality of direct access storage devices;

a transaction processor coupled to said memory system to process transactions related to first selectable portions of the database, and to update modified ones of said first selectable portions of the database;

a database cache established in said memory system to cache said first selectable portions of the database for said transaction processor;

a file cache coupled to said database cache to store said first selectable portions;

a query buffer established in said memory system and coupled to said file cache to receive from said file cache said modified ones of said first selectable portions to merge with second selectable portions of the database received from ones of said plurality of direct access storage devices to create updated query data; and a query processor coupled to said query buffer to process queries against said updated query data concurrently with said transaction processor processing transactions.

4. The system of claim 3, further comprising:

input-output control coupled to said plurality of direct access storage devices; and full-file-read control coupled to said input-output control and coupled to said database management system for issuing multiple concurrent read requests to said plurality of direct access storage devices.

5. The system of claim 4, wherein said full-file-read control includes a physical read control, wherein said physical read control issues multiple concurrent read requests to said plurality of direct access storage devices for reading said second selectable portions of the database without regard to logical relative addresses of said second selectable portions.

6. The system of claim 4, wherein said full-file-read control includes a logical read control, wherein said logical read control issues multiple concurrent read requests to said plurality of direct access storage devices for reading said second selectable portions of the database and returns said second selectable portions to said database management system in logical relative address order of said second selectable portions.

7. The system of claim 4, further comprising:

a physical read control within said full-file-read control, wherein said physical read control issues multiple concurrent read requests to said plurality of direct access storage devices for reading said second selectable portions of the database without regard to logical relative addresses of said second selectable portions;

a logical read control within said full-file-read control, wherein said logical read control issues multiple concurrent read requests to said plurality of direct access storage devices for reading said second selectable portions of the database and returns said segments to said database management system in logical relative address order of said second selectable portions; and selection means within said database management system for selectively activating either said physical read control or said logical read control in response to a request from an application program.

8. The system of claim 4, further comprising a query buffer manager interfaced with said full-file-read control and interfaced with said database management system, wherein said query buffer manager coordinates writing data read from said plurality of direct access storage devices to said query buffer in parallel with reading said query buffer by said database management system.

9. The system of claim 8, wherein said full-file-read control includes input-output component management control and said input-output component management control limits the said multiple read requests to a predetermined number for a particular input-output component.

10. The system of claim 8, wherein said input-output component management control includes direct access storage device management control, wherein said direct access storage device management control limits said multiple read requests to a predetermined number for each of said plurality of direct access storage devices.

11. The system of claim 8, further comprising a plurality of channel adapters coupled to said plurality of input-output processors and coupled to said plurality of direct access storage devices, wherein said input-output component control includes channel management control that limits said multiple read requests to a predetermined number for each of said plurality of channel adapters.

12. The system of claim 8, wherein said input-output component control includes input-output processor management control that limits said multiple read requests to a predetermined number for each of said plurality of input-output processors.

13. A system for performing concurrent processing of database queries and transactions against a single copy of a database, comprising:

a host data processing system having a memory system;

a database management system operable on said host data processing system;

a database storage subsystem for storing the database;

a transaction processor coupled to said memory system to process transactions related to first selectable portions of the database and to modify as updated database signals ones of said first selectable portions of the database;

a database cache established in said memory system to cache said first selectable portions of the database for said transaction processor;

a nonvolatile cache coupled to said memory system to provide nonvolatile storage of said first selectable portions of the database;

a query buffer established in said memory system to receive from said nonvolatile cache said updated database signals and to receive from said database storage subsystem second selectable portions of the database and to temporarily store as query data signals said updated database signals and said second selectable portions of the database; and a query processor coupled to said query buffer for processing queries by referencing said query data signals concurrently with said transaction processor processing transactions.

14. The system of claim 13, wherein said database storage subsystem includes a plurality of direct access storage devices coupled to said host via a plurality of input-output channels and the database is stored on said plurality of direct access storage devices.

15. The system of claim 14, further comprising:

input-output control coupled to said plurality of direct access storage devices; and full-file-read control coupled to said input-output control and coupled to said database management system for issuing multiple concurrent read requests to said plurality of direct access storage devices.

16. The system of claim 15, wherein said full-file-read control includes a physical read control, wherein said physical read control issues multiple concurrent read requests to said plurality of direct access storage devices for reading said second selectable portions of the database without regard to logical relative addresses of said second selectable portions.

17. The system of claim 15, wherein said full-file-read control includes a logical read control, wherein said logical read control issues multiple concurrent read requests to said plurality of direct access storage devices for reading said second selectable portions of the database and returns said segments to said database management system in logical relative address order of said second selectable portions.

18. The system of claim 15, further comprising:

a physical read control within said full-file-read control, wherein said physical read control issues multiple concurrent read requests to said plurality of direct access storage devices for reading said second selectable portions of the database without regard to logical relative addresses of said second selectable portions;

a logical read control within said full-file-read control, wherein said logical read control issues multiple concurrent read requests to said plurality of direct access storage devices for reading said second selectable portions of the database and returns said second selectable portions to said database management system in logical relative address order of said second selectable portions; and a selection control within said database management system to selectively activate either said physical read control or said logical read control in response to predetermined request signals provided by an application program.

19. The system of claim 15, further comprising a query buffer manager interfaced with said full-file-read control and interfaced with said database management system, wherein said query buffer manager coordinates writing data read from said plurality of direct access storage devices to said query buffer in parallel with reading said query buffer by said database management system.

20. The system of claim 19, wherein said full-file-read control includes input-output component management control and said input-output component management control limits the said multiple read requests to a predetermined number for a particular input-output component.

21. The system of claim 19, wherein said input-output component management control includes direct access storage device management control, wherein said direct access storage device management control limits said multiple read requests to a predetermined number for each of said plurality of direct access storage devices.

22. The system of claim 19, further comprising a plurality of channel adapters coupled to said plurality of input-output processors and coupled to said plurality of direct access storage devices, wherein said input-output component control includes channel management control that limits said multiple read requests to a predetermined number for each of said plurality of channel adapters.

23. The system of claim 19, wherein said input-output component control includes input-output processor management control that limits said multiple read requests to a predetermined number for each of said plurality of input-output processors.

24. A system for performing concurrent processing of database queries and transactions by referencing a single copy of a database, comprising:

a host data processing system having a memory;

a database management system operable on said host;

a plurality of direct access storage devices coupled to said host via a plurality of input-output channels, wherein the database is stored on said plurality of direct access storage devices;

a transaction processor coupled to said memory to perform transactions related to first selectable portions of the database and to update as modified database signals ones of said first selectable portions of the database;

a database cache established in said memory to store said first selectable portions of the database for said transaction processor;

a nonvolatile file cache coupled to said memory to store said first selectable portions and to receive from said database cache said modified database signals;

a query buffer established in said memory to receive from said nonvolatile file cache said modified database signals and to receive from said plurality of input-output processors second selectable portions of the database, said query buffer to temporarily store as query data said modified database signals and said second selectable portions of the database;

a query processor coupled to said memory to perform queries using said query data;

a set of empty buffers established in said query buffer;

a plurality of input-output processors coupled to said memory, wherein each of said input-output processors has write access to said memory and said query buffer is addressable by said plurality of input-output processors;

a full-file-read control coupled to said plurality of input-output processors, wherein said full-read-control issues multiple read requests to said plurality of direct access storage devices whereby said second selectable portions of the database are read from said plurality of direct access storage devices in parallel and written to said empty buffers in parallel; and a query buffer manager interfaced with said full-file-read control and interfaced with said database management system, wherein said query buffer manager coordinates writing said second selectable portions of the database from said plurality of direct access storage devices to said query buffer in parallel with reading said query data from said query buffer by said database management system, wherein said query buffer manager includes a first designation system to designate an empty buffer as a full buffer when said empty buffer has been filled with data, whereby said full buffer may be read by said database management system; and a second designation system to designate a full buffer as an empty buffer after data in said full buffer has been read by said database management system, whereby said empty buffer may be written by said plurality of input-output processors while another full buffer is read by said database management system.

25. The system of claim 24, wherein said full-file-read control includes a physical read control, wherein said physical read control issues multiple concurrent read requests to said plurality of direct access storage devices to read said second selectable portions of the database without regard to logical relative addresses of said second selectable portions.

26. The system of claim 24, wherein said full-file-read control includes a logical read control, wherein said logical read control issues multiple concurrent read requests to said plurality of direct access storage devices to read said second selectable portions of the database and returns said second selectable portions to said database management system in logical relative address order of said second selectable portions.

27. The system of claim 24, further comprising:

a physical read control within said full-file-read control, wherein said physical read control issues multiple concurrent read requests to said plurality of direct access storage devices to read said second selectable portions of the database without regard to logical relative addresses of said second selectable portions;

a logical read control within said full-file-read control, wherein said logical read control issues multiple concurrent read requests to said plurality of direct access storage devices to read said second selectable portions of the database and returns said second selectable portions to said database management system in logical relative address order of said second selectable portions; and a selection system within said database management system to selectively activate either said physical read control or said logical read control in response to request signals from an application program.

28. The system of claim 24, wherein said full-file-read control includes input-output component management control and said input-output component management control limits the said multiple read requests to a predetermined number for a particular input-output component.

29. The system of claim 28, wherein said input-output component management control includes direct access storage device management control, wherein said direct access storage device management control limits said multiple read requests to a predetermined number for each of said plurality of direct access storage devices.

30. The system of claim 28, further comprising a plurality of channel adapters coupled to said plurality of input-output processors and coupled to said plurality of direct access storage devices, wherein said input-output component control includes channel management control that limits said multiple read requests to a predetermined number for each of said plurality of channel adapters.

31. The system of claim 28, wherein said input-output component control includes input-output processor management control that limits said multiple read requests to a predetermined number for each of said plurality of input-output processors.

32. In a data processing system having multiple instruction processors, a memory coupled to each of the multiple instruction processors, and a plurality of direct access storage devices that are accessible to each of the multiple instruction processors via a plurality of input output processors and a plurality of input-output channels, wherein the input-output processors have read and write access to the memory, the data processing system further having a file cache coupled to the memory and capable of accessing the plurality of direct access storage devices, a method for concurrent processing of transactions and queries by referencing a database that is stored on the plurality of direct access storage devices, comprising the steps of:

establishing in the memory a database cache for cached storage of first selectable portions of the database for processing transactions;

processing transactions by referencing said first selectable portions, and updating in said database cache modified ones of said first selectable portions;

writing said modified ones of said first selectable portions from said database cache to the file cache;

distinguishing whether a database access request is a transaction or a query, wherein a query references queried portions of the database;

establishing a query buffer in the memory into which to write said queried portions of the database;

issuing a plurality of read requests to said plurality of direct access storage devices, wherein said plurality of read requests address said queried portions of the database;

receiving said modified ones of said first selectable portions from the file cache and merging said modified ones of said first selectable portions with said queried portions of the database to create updated queried portions;

writing in parallel said updated queried portions of the database to an empty area of said query buffer; and searching by a first instruction processor in parallel with said writing step said updated queried portions in an area of said query buffer that contains said updated queried portions.

33. In a data processing system having multiple instruction processors, a memory coupled to each of the instruction processors, a plurality of direct access storage devices that are accessible to each of the instruction processors via a plurality of input-output channels and a plurality of input output processors, and a nonvolatile cache coupled to the memory, a method for concurrent processing of transactions and queries by accessing a database by a database management system, comprising the steps of:

establishing a database cache in the memory for cached storage of portions of the database referenced by transactions;

distinguishing whether a database access request is a transaction or a query, wherein said query references queried portions of the database;

establishing a query buffer in the memory into which to write said queried portions of the database;

caching in the nonvolatile cache said portions of the database referenced by transactions, and updating as modified portions selectable ones of said portions of the database referenced by transactions; and processing a query by performing steps (a) through (d);
- (a) reading from direct access storage device said queried portions of the database;
- (b) receiving said modified portions from the nonvolatile cache and merging said modified portions with said queried portions of the database to create updated queried portions;
- (c) writing said updated queried portions of the database to said query buffer;
- (d) searching said updated queried portions of the database in said query buffer according to said query.

34. In a data processing system having multiple instruction processors, a memory coupled to each of the instruction processors, a plurality of direct access storage devices that store a database and that are accessible to each of the instruction processors via a plurality of input-output channels and a plurality of input output processors, each of the instruction processors capable performing a database access request to the database wherein the database access request is either a transaction or a query, and a nonvolatile cache coupled to the memory, a method for concurrent processing of transactions and queries by referencing the database by a database management system, comprising the steps of:

processing a transaction to reference first selectable portions of the database wherein said processing updates as modified portions ones of said first selectable portions of the database;

establishing a database cache in the memory to cache said first selectable portions of the database including said modified portions;

distinguishing whether a database access request is a transaction or a query, wherein the query references queried portions of the database;

establishing a query buffer in the memory into which to write said queried portions of the database;

caching in the nonvolatile cache said first selectable portions of the database including said modified portions;

processing a query by performing steps (a) through (e);
- (a) reading from direct access storage device said queried portions of the database;
- (b) writing said queried portions of the database to said query buffer;
- (c) reading from the nonvolatile cache said modified portions of the database present in the nonvolatile cache;
- (d) merging said modified portions with said queried portions from said writing step to create updated queried portions, wherein said modified portions of the database are ones of said queried portions which have been updated during said processing step and not written to said direct access storage device; and
- (e) searching said updated queried portions of the database in said query buffer according to said query.

35. In a data processing system having multiple instruction processors, a memory coupled to each of the instruction processors, and a plurality of direct access storage devices that are accessible to each of the instruction processors via a plurality of input output processors and a plurality of input-output channels, wherein the input-output processors have read-write access to the memory, a system for concurrent processing of transactions and queries against a database that is stored on the plurality of direct access storage devices, comprising:

transaction program control operable on the plurality of instruction processors to process transactions against first selectable portions of the database, and to modify as updated portions ones of said first selectable portions;

a database cache that is established in the memory to store said first selectable portions of the database;

a nonvolatile cache coupled to said database cache to store said first selectable portions of the database including said updated portions, a database management system operable on the plurality of processors to provide access to the database, wherein said database management system includes
distinction means to distinguish whether a database access request is a transaction or a query, wherein a query references queried portions of the database;

a query buffer established in the memory into which to write said queried portions of the database;

input-output control coupled to the input-output processors to issue a plurality of read requests to said plurality of direct access storage devices to read said queried portions of the database, whereby the plurality of input-output processors write in parallel said queried portions of the database to an empty area of said query buffer;

merge control coupled to the memory and to said nonvolatile cache to merge said queried portions of the database with said updated portions received from said nonvolatile cache to form said updated query portions; and search means operable on the plurality of instruction processors and operable in parallel with the plurality of input-output processors for searching an area in said query buffer that contains said updated queried portions.

* * * * *